(12) United States Patent
Nix

(10) Patent No.: US 12,542,660 B2
(45) Date of Patent: *Feb. 3, 2026

(54) SYSTEMS AND METHODS FOR "MACHINE-TO-MACHINE" (M2M) COMMUNICATIONS BETWEEN MODULES, SERVERS, AND AN APPLICATION USING PUBLIC KEY INFRASTRUCTURE (PKI)

(71) Applicant: Network-1 Technologies, Inc., New York, NY (US)

(72) Inventor: John A. Nix, Evanston, IL (US)

(73) Assignee: Network-1 Technologies, Inc., New Canaan, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/438,147

(22) Filed: Feb. 9, 2024

(65) Prior Publication Data

US 2024/0323005 A1 Sep. 26, 2024

Related U.S. Application Data

(63) Continuation of application No. 18/111,669, filed on Feb. 20, 2023, now Pat. No. 11,973,864, which is a (Continued)

(51) Int. Cl.
*H04L 9/08* (2006.01)
*G06F 21/35* (2013.01)
(Continued)

(52) U.S. Cl.
CPC ............ *H04L 9/0861* (2013.01); *G06F 21/35* (2013.01); *G06F 21/445* (2013.01); *H04J 11/00* (2013.01);
(Continued)

(58) Field of Classification Search
CPC .................. H04W 12/40; G06F 21/445; G06F 2221/2115; H04L 9/0841; H04L 9/0816; H04L 9/32; H04L 63/0272; H04L 63/045
See application file for complete search history.

(56) References Cited

U.S. PATENT DOCUMENTS

| 5,216,715 A | 6/1993 | Markwitz |
| 5,642,420 A | 6/1997 | Kuroda et al. |

(Continued)

FOREIGN PATENT DOCUMENTS

| AU | 2019246774 | 10/2019 |
| CA | 2775853 A1 | 12/2012 |

(Continued)

OTHER PUBLICATIONS

U.S. Appl. No. 18/435,042, filed Feb. 7, 2024, Pending—Ready for Examination.

(Continued)

*Primary Examiner* — David J Pearson
(74) *Attorney, Agent, or Firm* — Amster, Rothstein & Ebenstein LLP

(57) ABSTRACT

Methods and systems are provided for supporting efficient and secure "Machine-to-Machine" (M2M) communications using a module, a server, and an application. A module can communicate with the server by accessing the Internet, and the module can include a sensor and/or an actuator. The module, server, and application can utilize public key infrastructure (PKI) such as public keys and private keys. The module can internally derive pairs of private/public keys using cryptographic algorithms and a first set of parameters. A server can authenticate the submission of derived public keys and an associated module identity. The server can use a first server private key and a second set of parameters to (i) send module data to the application and (ii) receive module instructions from the application. The server can use (Continued)

a second server private key and the first set of parameters to communicate with the module.

20 Claims, 17 Drawing Sheets

Related U.S. Application Data continuation of application No. 17/647,812, filed on Jan. 12, 2022, now Pat. No. 11,606,204, which is a continuation of application No. 16/593,561, filed on Oct. 4, 2019, now Pat. No. 11,258,595, which is a continuation of application No. 16/036,506, filed on Jul. 16, 2018, now Pat. No. 10,530,575, which is a continuation of application No. 15/583,968, filed on May 1, 2017, now Pat. No. 10,057,059, which is a continuation of application No. 15/010,905, filed on Jan. 29, 2016, now Pat. No. 9,641,327, which is a continuation of application No. 14/055,606, filed on Oct. 16, 2013, now Pat. No. 9,276,740.

(51) Int. Cl.

| | | |
|---|---|---|
| *G06F 21/44* | (2013.01) | |
| *H04J 11/00* | (2006.01) | |
| *H04L 9/00* | (2022.01) | |
| *H04L 9/14* | (2006.01) | |
| *H04L 9/30* | (2006.01) | |
| *H04L 9/32* | (2006.01) | |
| *H04L 9/40* | (2022.01) | |
| *H04L 12/28* | (2006.01) | |
| *H04L 67/04* | (2022.01) | |
| *H04W 4/70* | (2018.01) | |
| *H04W 8/08* | (2009.01) | |
| *H04W 12/02* | (2009.01) | |
| *H04W 12/033* | (2021.01) | |
| *H04W 12/04* | (2021.01) | |
| *H04W 12/06* | (2021.01) | |
| *H04W 12/069* | (2021.01) | |
| *H04W 12/40* | (2021.01) | |
| *H04W 40/00* | (2009.01) | |
| *H04W 52/02* | (2009.01) | |
| *H04W 76/27* | (2018.01) | |
| *H04W 80/04* | (2009.01) | |
| *H04W 84/12* | (2009.01) | |
| *H04W 88/12* | (2009.01) | |

(52) U.S. Cl.
CPC ............ *H04L 9/006* (2013.01); *H04L 9/0816* (2013.01); *H04L 9/0841* (2013.01); *H04L 9/085* (2013.01); *H04L 9/088* (2013.01); *H04L 9/0894* (2013.01); *H04L 9/14* (2013.01); *H04L 9/30* (2013.01); *H04L 9/3066* (2013.01); *H04L 9/32* (2013.01); *H04L 9/321* (2013.01); *H04L 9/3239* (2013.01); *H04L 9/3247* (2013.01); *H04L 9/3249* (2013.01); *H04L 9/3263* (2013.01); *H04L 12/2854* (2013.01); *H04L 63/0272* (2013.01); *H04L 63/0435* (2013.01); *H04L 63/0442* (2013.01); *H04L 63/045* (2013.01); *H04L 63/061* (2013.01); *H04L 63/0807* (2013.01); *H04L 63/123* (2013.01); *H04L 63/166* (2013.01); *H04L 67/04* (2013.01); *H04W 4/70* (2018.02); *H04W 8/082* (2013.01); *H04W 12/02* (2013.01); *H04W 12/033* (2021.01); *H04W 12/04* (2013.01); *H04W 12/06* (2013.01); *H04W 12/069* (2021.01); *H04W 12/40* (2021.01); *H04W 40/005* (2013.01); *H04W 52/0216* (2013.01); *H04W 52/0235* (2013.01); *H04W 52/0277* (2013.01); *H04W 76/27* (2018.02); *H04W 80/04* (2013.01); *G06F 2221/2105* (2013.01); *G06F 2221/2107* (2013.01); *G06F 2221/2115* (2013.01); *H04L 63/0464* (2013.01); *H04L 2209/24* (2013.01); *H04L 2209/72* (2013.01); *H04L 2209/805* (2013.01); *H04W 84/12* (2013.01); *H04W 88/12* (2013.01); *Y02D 30/70* (2020.08)

(56) References Cited

U.S. PATENT DOCUMENTS

| | | |
|---|---|---|
| 5,664,017 A | 9/1997 | Gressel et al. |
| 5,852,665 A | 12/1998 | Gressel et al. |
| 5,995,625 A | 11/1999 | Sudia et al. |
| 6,038,322 A | 3/2000 | Harkins |
| 6,256,733 B1 | 7/2001 | Thakkar et al. |
| 6,721,886 B1 | 4/2004 | Uskela |
| 6,804,357 B1 | 10/2004 | Ikonen et al. |
| 6,842,628 B1 | 1/2005 | Arnold et al. |
| 7,203,844 B1 | 4/2007 | Oxford |
| 7,921,292 B1 | 4/2011 | Pauker et al. |
| 7,957,532 B2 | 6/2011 | Chen et al. |
| 8,127,142 B2 | 2/2012 | Cuppett |
| 8,352,739 B2 | 1/2013 | Park et al. |
| 8,434,139 B1 | 4/2013 | Ortiz, Jr. |
| 8,452,017 B2 | 5/2013 | Sherkin |
| 8,522,013 B2 | 8/2013 | Zhang et al. |
| 8,526,606 B2 | 9/2013 | Muthaiah |
| 8,555,067 B2 | 10/2013 | Schell et al. |
| 8,577,337 B2 | 11/2013 | O'Leary |
| 8,590,028 B2 | 11/2013 | Saxena et al. |
| 8,782,774 B1 | 7/2014 | Pahl et al. |
| 8,843,179 B2 | 9/2014 | Li et al. |
| 8,924,715 B2 | 12/2014 | Schell et al. |
| 8,948,386 B2 | 2/2015 | Campagna et al. |
| 8,965,366 B1 | 2/2015 | Somayajula et al. |
| 9,002,018 B2 | 4/2015 | Wilkins et al. |
| 9,020,479 B1 | 4/2015 | Somayajula et al. |
| 9,253,643 B2 | 2/2016 | Pattar et al. |
| 9,270,653 B2 | 2/2016 | Maria |
| 9,332,129 B2 | 5/2016 | Li et al. |
| 9,408,012 B2 | 8/2016 | Li et al. |
| 9,572,016 B2 | 2/2017 | Cormier et al. |
| 9,596,078 B2 | 3/2017 | Nix |
| 9,628,981 B2 | 4/2017 | Park et al. |
| 9,674,690 B2 | 6/2017 | Lee et al. |
| 9,698,981 B2 | 7/2017 | Nix |
| 9,794,775 B2 | 10/2017 | Huber et al. |
| 9,800,993 B2 | 10/2017 | Lee et al. |
| 9,807,605 B2 | 10/2017 | Gao et al. |
| 9,923,724 B2 | 3/2018 | Lee et al. |
| 10,057,059 B2 * | 8/2018 | Nix .................... H04L 63/0272 |
| 10,169,587 B1 | 1/2019 | Nix |
| 10,530,575 B2 * | 1/2020 | Nix ...................... H04L 63/061 |
| 10,621,352 B2 | 4/2020 | Nix |
| 11,258,595 B2 * | 2/2022 | Nix ................... H04W 52/0277 |
| 11,606,204 B2 * | 3/2023 | Nix ...................... H04L 63/045 |
| 11,973,864 B2 * | 4/2024 | Nix .......................... H04L 9/30 |
| 2001/0029581 A1 | 10/2001 | Knauft |
| 2002/0018569 A1 | 2/2002 | Panjwani et al. |
| 2003/0003895 A1 | 1/2003 | Wallentin et al. |
| 2003/0211842 A1 | 11/2003 | Kempf et al. |
| 2004/0162472 A1 | 8/2004 | Berson et al. |
| 2004/0179684 A1 | 9/2004 | Appenzeller et al. |
| 2004/0221163 A1 | 11/2004 | Jorgensen et al. |
| 2005/0008159 A1 | 1/2005 | Grilli et al. |
| 2005/0021875 A1 | 1/2005 | Bouthemy et al. |
| 2005/0050323 A1 | 3/2005 | Mizrah |
| 2005/0058294 A1 | 3/2005 | Chen et al. |
| 2005/0120202 A1 | 6/2005 | Cuellar et al. |
| 2005/0138353 A1 | 6/2005 | Spies et al. |
| 2005/0193199 A1 | 9/2005 | Asokan et al. |
| 2005/0246282 A1 | 11/2005 | Naslund et al. |

(56) References Cited

U.S. PATENT DOCUMENTS

| | | |
|---|---|---|
| 2005/0278787 A1 | 12/2005 | Naslund et al. |
| 2006/0021063 A1 | 1/2006 | Hori |
| 2006/0056355 A1 | 3/2006 | Love et al. |
| 2006/0059344 A1 | 3/2006 | Mononen |
| 2006/0095771 A1 | 5/2006 | Appenzeller et al. |
| 2006/0129848 A1 | 6/2006 | Paksoy et al. |
| 2006/0206710 A1 | 9/2006 | Gehrmann |
| 2006/0281442 A1 | 12/2006 | Lee et al. |
| 2007/0101400 A1 | 5/2007 | Freeman et al. |
| 2007/0158439 A1 | 7/2007 | Conner et al. |
| 2007/0206799 A1 | 9/2007 | Wingert et al. |
| 2008/0016230 A1 | 1/2008 | Hollmanns et al. |
| 2008/0022089 A1 | 1/2008 | Leedom |
| 2008/0031204 A1 | 2/2008 | Sood |
| 2008/0044032 A1 | 2/2008 | Lou et al. |
| 2008/0107083 A1 | 5/2008 | Shirota et al. |
| 2008/0114978 A1 | 5/2008 | Lehtoviorta et al. |
| 2008/0130879 A1 | 6/2008 | Heinonen et al. |
| 2008/0165698 A1 | 7/2008 | Dalsgard et al. |
| 2008/0307218 A1 | 12/2008 | Logvinov |
| 2009/0028341 A1 | 1/2009 | Hamachi |
| 2009/0041110 A1 | 2/2009 | Malladi |
| 2009/0060197 A1 | 3/2009 | Taylor et al. |
| 2009/0077643 A1 | 3/2009 | Schmidt et al. |
| 2009/0113203 A1 | 4/2009 | Tsuge et al. |
| 2009/0116642 A1 | 5/2009 | Yang et al. |
| 2009/0125996 A1 | 5/2009 | Guccione et al. |
| 2009/0132806 A1 | 5/2009 | Blommaert et al. |
| 2009/0183541 A1 | 7/2009 | Sadighi et al. |
| 2009/0191857 A1 | 7/2009 | Horn et al. |
| 2009/0209232 A1 | 8/2009 | Cha et al. |
| 2009/0217348 A1 | 8/2009 | Salmela et al. |
| 2009/0268909 A1 | 10/2009 | Girao et al. |
| 2009/0274306 A1 | 11/2009 | Nolte |
| 2009/0282246 A1 | 11/2009 | Gunther |
| 2009/0313472 A1 | 12/2009 | Guccione et al. |
| 2010/0031042 A1 | 2/2010 | Di Crescenzo et al. |
| 2010/0062808 A1 | 3/2010 | Cha et al. |
| 2010/0093347 A1 | 4/2010 | Hahn et al. |
| 2010/0098253 A1 | 4/2010 | Delerablee |
| 2010/0166167 A1 | 7/2010 | Karimi-Cherkandi et al. |
| 2010/0195833 A1 | 8/2010 | Priestley et al. |
| 2010/0199334 A1 | 8/2010 | Ehrensvard et al. |
| 2010/0223461 A1 | 9/2010 | Drader et al. |
| 2010/0275028 A1 | 10/2010 | Takashima |
| 2011/0016321 A1 | 1/2011 | Sundaram et al. |
| 2011/0035584 A1 | 2/2011 | Meyerstein et al. |
| 2011/0035604 A1 | 2/2011 | Habraken |
| 2011/0055553 A1 | 3/2011 | Lee et al. |
| 2011/0158411 A1 | 6/2011 | Medvinsky et al. |
| 2011/0167272 A1 | 7/2011 | Kolesnikov |
| 2011/0213959 A1 | 9/2011 | Bodi et al. |
| 2011/0237281 A1 | 9/2011 | Busropan et al. |
| 2011/0268022 A1 | 11/2011 | Xu |
| 2011/0269422 A1 | 11/2011 | Xu et al. |
| 2011/0269461 A1 | 11/2011 | Xu et al. |
| 2011/0269472 A1 | 11/2011 | Xu et al. |
| 2011/0270747 A1 | 11/2011 | Xu et al. |
| 2011/0291803 A1 | 12/2011 | Bajic et al. |
| 2011/0314287 A1 | 12/2011 | Escott et al. |
| 2012/0011360 A1 | 1/2012 | Engels et al. |
| 2012/0011362 A1 | 1/2012 | Lambert |
| 2012/0023336 A1 | 1/2012 | Natarajan |
| 2012/0030461 A1 | 2/2012 | Willey et al. |
| 2012/0033613 A1 | 2/2012 | Lin et al. |
| 2012/0072732 A1 | 3/2012 | Canard et al. |
| 2012/0084568 A1 | 4/2012 | Sarikaya et al. |
| 2012/0087493 A1 | 4/2012 | Chidambaram et al. |
| 2012/0089568 A1 | 4/2012 | Manley et al. |
| 2012/0108205 A1 | 5/2012 | Schell et al. |
| 2012/0117635 A1 | 5/2012 | Schell et al. |
| 2012/0159153 A1 | 6/2012 | Shim et al. |
| 2012/0170451 A1 | 7/2012 | Viswanathan et al. |
| 2012/0190354 A1 | 7/2012 | Merrien et al. |
| 2012/0214444 A1 | 8/2012 | McBride et al. |
| 2012/0260086 A1 | 10/2012 | Haggerty et al. |
| 2012/0260090 A1 | 10/2012 | Hauck et al. |
| 2012/0260095 A1 | 10/2012 | Von Hauck et al. |
| 2012/0263298 A1 | 10/2012 | Suh et al. |
| 2012/0278490 A1 | 11/2012 | Sennett et al. |
| 2012/0300932 A1 | 11/2012 | Cambridge et al. |
| 2012/0331292 A1 | 12/2012 | Haggerty et al. |
| 2012/0331298 A1 | 12/2012 | Xu et al. |
| 2013/0007442 A1 | 1/2013 | Mao et al. |
| 2013/0012168 A1 | 1/2013 | Rajadurai et al. |
| 2013/0028184 A1 | 1/2013 | Lee et al. |
| 2013/0091556 A1 | 4/2013 | Horn et al. |
| 2013/0114810 A1 | 5/2013 | Kobayashi et al. |
| 2013/0117824 A1 | 5/2013 | Naslund et al. |
| 2013/0122864 A1 | 5/2013 | Haggerty et al. |
| 2013/0149996 A1 | 6/2013 | King et al. |
| 2013/0157673 A1 | 6/2013 | Brusilovsky |
| 2013/0165073 A1 | 6/2013 | Madsen |
| 2013/0165075 A1 | 6/2013 | Rishy-Maharaj et al. |
| 2013/0166915 A1 | 6/2013 | desai et al. |
| 2013/0173747 A1 | 7/2013 | Kim et al. |
| 2013/0173926 A1 | 7/2013 | Morese et al. |
| 2013/0179962 A1 | 7/2013 | Arial et al. |
| 2013/0182586 A1 | 7/2013 | Paladugu et al. |
| 2013/0183932 A1 | 7/2013 | Lemilainen et al. |
| 2013/0212637 A1 | 8/2013 | Guccione et al. |
| 2013/0227646 A1 | 8/2013 | Haggerty et al. |
| 2013/0231087 A1 | 9/2013 | O'Leary |
| 2013/0283047 A1 | 10/2013 | Merrien et al. |
| 2013/0294602 A1 | 11/2013 | Huxham et al. |
| 2013/0305345 A1 | 11/2013 | Bugenhagen |
| 2013/0322621 A1 | 12/2013 | Yoon et al. |
| 2013/0331063 A1 | 12/2013 | Cormier et al. |
| 2013/0340040 A1 | 12/2013 | Park et al. |
| 2013/0344864 A1 | 12/2013 | Park et al. |
| 2014/0003604 A1 | 1/2014 | Campagna et al. |
| 2014/0040628 A1 | 2/2014 | Fort et al. |
| 2014/0049653 A1 | 2/2014 | Leonard et al. |
| 2014/0053241 A1 | 2/2014 | Norman et al. |
| 2014/0073375 A1 | 3/2014 | Li et al. |
| 2014/0082358 A1 | 3/2014 | Nakhjiri et al. |
| 2014/0082359 A1 | 3/2014 | Nakhjiri et al. |
| 2014/0082538 A1 | 3/2014 | Nakhjiri et al. |
| 2014/0082539 A1 | 3/2014 | Nakhjiri et al. |
| 2014/0087790 A1 | 3/2014 | Babbage et al. |
| 2014/0101444 A1 | 4/2014 | Lee et al. |
| 2014/0108801 A1 | 4/2014 | McBride et al. |
| 2014/0115335 A1 | 4/2014 | Jorden et al. |
| 2014/0120874 A1 | 5/2014 | Kang et al. |
| 2014/0122878 A1 | 5/2014 | Cho et al. |
| 2014/0140507 A1 | 5/2014 | Park et al. |
| 2014/0140509 A1 | 5/2014 | Chastain et al. |
| 2014/0143534 A1 | 5/2014 | Chastain et al. |
| 2014/0143826 A1 | 5/2014 | Sharp et al. |
| 2014/0161113 A1 | 6/2014 | Cui et al. |
| 2014/0165155 A1 | 6/2014 | Zhang |
| 2014/0192976 A1 | 7/2014 | Yoon et al. |
| 2014/0219447 A1 | 8/2014 | Park et al. |
| 2014/0219448 A1 | 8/2014 | Froels et al. |
| 2014/0235210 A1 | 8/2014 | Park et al. |
| 2014/0237101 A1 | 8/2014 | Park |
| 2014/0244994 A1 | 8/2014 | Yu |
| 2014/0273913 A1 | 9/2014 | Michel et al. |
| 2014/0281483 A1 | 9/2014 | Vigliaturo et al. |
| 2014/0287725 A1 | 9/2014 | Lee |
| 2014/0308991 A1 | 10/2014 | Lee et al. |
| 2014/0329502 A1 | 11/2014 | Lee et al. |
| 2014/0337937 A1 | 11/2014 | Truskovsky et al. |
| 2014/0351403 A1 | 11/2014 | Lein et al. |
| 2014/0357229 A1 | 12/2014 | Lee et al. |
| 2015/0012743 A1 | 1/2015 | Holtmanns et al. |
| 2015/0017910 A1 | 1/2015 | Li et al. |
| 2015/0071139 A1 | 3/2015 | Nix |
| 2015/0089214 A1 | 3/2015 | Dupre |
| 2015/0092590 A1 | 4/2015 | Zhu et al. |
| 2015/0095514 A1 | 4/2015 | Yu |
| 2015/0095648 A1 | 4/2015 | Nix |
| 2015/0106616 A1 | 4/2015 | Nix |
| 2015/0113275 A1 | 4/2015 | Kim et al. |

(56) References Cited

U.S. PATENT DOCUMENTS

| | | |
|---|---|---|
| 2015/0121066 A1 | 4/2015 | Nix |
| 2015/0121495 A1 | 4/2015 | Gao et al. |
| 2015/0143125 A1 | 5/2015 | Nix |
| 2015/0163056 A1 | 6/2015 | Nix |
| 2015/0215126 A1 | 7/2015 | Ashdown |
| 2015/0222604 A1 | 8/2015 | Ylonen |
| 2015/0222619 A1 | 8/2015 | Hughes et al. |
| 2015/0281964 A1 | 10/2015 | Seo et al. |
| 2015/0350881 A1 | 12/2015 | Weiss et al. |
| 2016/0014112 A1 | 1/2016 | Gunning et al. |
| 2016/0057725 A1 | 2/2016 | Suh |
| 2016/0088096 A1 | 3/2016 | Quiriconi et al. |
| 2016/0127132 A1 | 5/2016 | Lee et al. |
| 2016/0149903 A1 | 5/2016 | Suh |
| 2016/0294829 A1 | 10/2016 | Angus |
| 2017/0206532 A1 | 7/2017 | Choi |
| 2019/0313246 A1 | 10/2019 | Nix |
| 2019/0332774 A1 | 10/2019 | Nix |
| 2019/0356482 A1 | 11/2019 | Nix |
| 2020/0162247 A1 | 5/2020 | Nix |
| 2020/0162269 A1 | 5/2020 | Nix |
| 2020/0226258 A1 | 7/2020 | Nix |
| 2020/0280436 A1 | 9/2020 | Nix |
| 2021/0126801 A1 | 4/2021 | Nix |
| 2021/0184842 A1 | 6/2021 | Nix |
| 2021/0194681 A1 | 6/2021 | Nix |
| 2021/0211279 A1 | 7/2021 | Nix |
| 2021/0218560 A1 | 7/2021 | Nix |

FOREIGN PATENT DOCUMENTS

| | | |
|---|---|---|
| CA | 2965119 | 10/2014 |
| CA | 2969829 | 12/2014 |
| CA | 3110641 A1 | 10/2019 |
| CA | 3110468 A1 | 11/2019 |
| DE | 19803936 A1 | 8/1999 |
| EP | 1981 224 | 10/2008 |
| EP | 14868381.6 | 12/2014 |
| EP | 3766222 A1 | 1/2021 |
| GB | 1608573 | 10/2014 |
| GB | 2100530 | 10/2014 |
| GB | 2518976 A | 4/2015 |
| HK | 17101082.8 | 10/2014 |
| HK | 17106540.3 | 12/2014 |
| KR | 10-2013-0026352 A | 3/2013 |
| KR | 10-2013-0026958 A | 3/2013 |
| KR | 20130026351 A | 3/2013 |
| WO | 2011138238 A1 | 11/2011 |
| WO | 2013027085 A1 | 2/2013 |
| WO | 2013/048084 A2 | 4/2013 |
| WO | 2013066077 A1 | 5/2013 |
| WO | 2019178312 A1 | 9/2019 |
| WO | 2019209598 A1 | 10/2019 |
| WO | 2019222319 A1 | 11/2019 |
| WO | 2019246206 A1 | 12/2019 |
| WO | 2020006162 A1 | 1/2020 |
| WO | 2020061023 A1 | 3/2020 |
| WO | 2020123959 A1 | 6/2020 |
| WO | 2020223319 A1 | 11/2020 |
| WO | 2021007235 A1 | 1/2021 |
| WO | 2021087221 A1 | 5/2021 |

OTHER PUBLICATIONS

U.S. Appl. No. 18/587,462, filed Feb. 26, 2024, Pending—Ready for Examination.

U.S. Appl. No. 18/433,683, filed Feb. 6, 2024, Pending—Ready for Examination.

U.S. Appl. No. 18/416,534, filed 204-01-18, Pending—Ready for Examination.

U.S. Appl. No. 18/433,664, filed Feb. 6, 2024, Pending—Ready for Examination.

U.S. Appl. No. 18/229,907, filed Aug. 3, 2023, Notice of Allowance mailed Aug. 1, 2024.

U.S. Appl. No. 18/111,669, filed Feb. 20, 2023, U.S. Pat. No. 11,973,864.

U.S. Appl. No. 17/647,812, filed Jan. 13, 2022, U.S. Pat. No. 11,606,204.

U.S. Appl. No. 17/547,990, filed Dec. 10, 2021, U.S. Pat. No. 11,736,283.

U.S. Appl. No. 17/304,922, filed Jun. 28, 2021, U.S. Pat. No. 11,736,283.

U.S. Appl. No. 17/249,242, filed Feb. 24, 2021, U.S. Pat. No. 11,973,863.

U.S. Appl. No. 16/879,325, filed May 20, 2020, U.S. Pat. No. 11,082,218.

U.S. Appl. No. 16/843,107, filed Apr. 8, 2020, U.S. Pat. No. 11,283,603.

U.S. Appl. No. 16/721,153, filed Dec. 19, 2019, U.S. Pat. No. 11,539,681.

U.S. Appl. No. 16/593,561, filed Oct. 4, 2019, U.S. Pat. No. 11,258,595.

U.S. Appl. No. 16/453,682, filed Jun. 26, 2019, U.S. Pat. No. 11,233,780.

U.S. Appl. No. 16/271,455, filed Feb. 8, 2019, U.S. Pat. No. 10,594,679.

U.S. Appl. No. 16/271,428, filed Feb. 8, 2019, U.S. Pat. No. 10,523,432.

U.S. Appl. No. 16/201,401, filed Nov. 27, 2018, U.S. Pat. No. 10,700,856.

U.S. Appl. No. 16/200,118, filed Nov. 26, 2018, U.S. Pat. No. 10,498,530.

U.S. Appl. No. 16/110,804, filed Aug. 23, 2018, U.S. Pat. No. 10,382,422.

U.S. Appl. No. 16/036,506, filed Jul. 16, 2018, U.S. Pat. No. 10,530,575.

U.S. Appl. No. 15/983,957, filed May 18, 2018, U.S. Pat. No. 10,177,911.

U.S. Appl. No. 15/973,012, filed May 7, 2018, U.S. Pat. No. 10,250,386.

U.S. Appl. No. 15/972,914, filed May 7, 2018, U.S. Pat. No. 10,652,017.

U.S. Appl. No. 15/928,848, filed Mar. 22, 2018, U.S. Pat. No. 10,084,768.

U.S. Appl. No. 15/010,905, filed Jan. 29, 2016, U.S. Pat. No. 9,641,327.

U.S. Appl. No. 15/680,758, filed Aug. 18, 2017, U.S. Pat. No. 10,187,206.

U.S. Appl. No. 15/162,292, filed May 23, 2016, U.S. Pat. No. 10,362,012.

U.S. Appl. No. 14/751,119, filed Jun. 25, 2015, U.S. Pat. No. 9,961,060.

U.S. Appl. No. 15/457,700, filed Mar. 13, 2017, U.S. Pat. No. 9,998,281.

U.S. Appl. No. 15/583,968, filed May 1, 2017, U.S. Pat. No. 10,057,059.

U.S. Appl. No. 15/043,293, filed Feb. 12, 2016, U.S. Pat. No. 9,998,280.

U.S. Appl. No. 15/642,088, filed Jul. 5, 2017, U.S. Pat. No. 10,003,461.

U.S. Appl. No. 15/130,146, filed Apr. 15, 2016, U.S. Pat. No. 9,742,562.

U.S. Appl. No. 15/162,302, filed May 23, 2016, U.S. Pat. No. 9,698,981.

U.S. Appl. No. 14/789,255, filed Jul. 1, 2015, U.S. Pat. No. 9,596,078.

U.S. Appl. No. 14/139,419, filed Dec. 23, 2013, U.S. Pat. No. 9,351,162.

U.S. Appl. No. 14/136,711, filed Dec. 20, 2013, U.S. Pat. No. 9,300,473.

U.S. Appl. No. 14/099,329, filed Dec. 6, 2013, U.S. Pat. No. 9,100,175.

U.S. Appl. No. 14/084,141, filed Nov. 19, 2013, U.S. Pat. No. 9,319,223.

(56) References Cited

OTHER PUBLICATIONS

U.S. Appl. No. 14/064,618, filed Oct. 28, 2013, U.S. Pat. No. 9,118,464.
U.S. Appl. No. 14/055,606, filed Oct. 16, 2013, U.S. Pat. No. 9,276,740.
U.S. Appl. No. 14/039,401, filed Sep. 27, 2013, U.S. Pat. No. 9,288,059.
U.S. Appl. No. 14/023,181, filed Sep. 10, 2013, U.S. Pat. No. 9,350,550.
Search Report issued in UK Application No. GB2108534.5 dated Jul. 7, 2021.
ANSI X9.63 Overview, Key Agreement and Key Transport Using Elliptic Curve Cryptography, Simon Blake-Wilson, Certicom (2000).
TLS 1.3 Wish List Presentation, IETF 87 (Eric Rescorla), dated Aug. 1, 2013.
European Patent Office Communication with European Search Report and European Search Opinion issued in EP 21182424.8 dated Oct. 12, 2021.
European Patent Office Communication with European Search Report and European Search Opinion issued in EP 21182451.1 dated Oct. 12, 2021.
European Patent Office Communication with European Search Report and European Search Opinion issued in EP 21182432.1 dated Oct. 12, 2021.
Cakulev et al., "An EAP Authentication Method Based on Identity-Based Authenticated Key Exchange," Aug. 2012, pp. 1-32.
Gollmann, "Authentication—Myths and Misconceptions," Progress in Computer Science and Applied Logic, vol. 20, 2001, pp. 203-225.
Tin et al., "Provably Secure Mobile Key Exchange: Applying the Canetti-Krawczyk Approach," Information Security Research Centre, Queensland University of Technology, Australia, 2003, pp. 166-179.
Hegland et al., "A Framework for Authentication in NBD Tactical Ad Hoc Networks," IEEE Communications Magazine, Oct. 2011, pp. 64-71.
Nicholson et al., "Mobile Device Security Using Transient Authentication," IEEE Transactions on Mobile Computing, vol. 5, No. II, Nov. 2006, pp. 1489-1502.
Schwaiger et al., "Smart Card Security for Fieldbus Systems," 2003, pp. 398-406.
Csmg, Reprogrammable SIMs: Technology, Evolution and Implications, Sep. 25, 2012, pp. 1-95.
GlobalPlatform Inc., GlobalPlatform Card Specification, Version 2.2.1, Jan. 2011, pp. 1-303.
GlobalPlatform Inc., GlobalPlatform Card Security Upgrade for Card Content Management, Card Specification v 2.2.—Amendment E, Version 1.0, Nov. 2011, pp. 1-35.
GSM Association, Embedded SIM Task Force Requirements and Use Cases, Version 1.0, Feb. 21, 2011, pp. 1-38.
Kirk H.M. Wong et al., A Dynamic User Authentication Scheme for Wireless Sensor Networks, Proceedings of the IEEE International Conference on Sensor Networks, Ubiquitous, and Trustworthy Computing (SUTC'06), pp. 1-8, 2006.
Pierre E. Abi-Char, et al., A Fast and Secure Elliptic Curve Based Authenticated Key Agreement Protocol For Low Power Mobile Communications, The 2007 International Conference on Next Generation Mobile Applications, Services and Technologies (NGMAST 2007), pp. 1-6.
Jun Shao, et al., An Improved Deniable Authentication Protocol, Department of Computer Science and Engineering, Shanghai Jiao Tong University, Shanghai 200030, People's Republic of China, pp. 1-3. 2006.
Chris Foresman, Embedded SIM could cause carrier conflict for Apple, Nov. 19, 2010, pp. 1-2.
Embedded UICC Remote Provisioning Discussion, Source: Rogers Wireless, 3GPP/SA3-LI#46, Quebec City, Canada, Jul. 17-19, 2012, p. 1-39.
GSMA Launches Embedded SIM Initiative To Support the Connected Future, Nov. 18, 2010, p. 1-4.

Chang-Seop Park, On Certificate-Based Security Protocols for Wireless Mobile Communication Systems, Dankook University, IEEE Network September/Oct. 1997, pp. 50-55.
M. Prasad, et al., Secure Authentication Key Agreement Protocol for Long Term Evolution—Advanced, Research Scholar, Associate Professor, Department of Computer Science & Engineering, Pondicherry Engineering College, Puducherry, India, Elsevier, 2012, pp. 158-162.
Eun-Jun Yoon, et al., Secure Deniable Authentication Protocol Based on ElGamal Cryptography, 2008 International Conference on Information Security and Assurance, pp. 36-39.
Pietre-Cambacedes et al., Cryptographic key management for SCADA systems—issues and perspectives, 2008 International Conference on Information Security and Assurance, IEEE, pp. 156-161.
Bender et al., Evolution of SIM provisioning towards a flexible MCIM provisioning in M2M vertical industries, 16th International Conference on Intelligence in Next Generation Networks, IEEE, 2012, pp. 57-64.
Park et al., Secure Profile Provisioning Architecture for Embedded UICC, 2013 International Conference on Availability, Reliability and Security, IEEE, 2013, pp. 297-303.
Appenzeller et al., Identity-Based Encryption Architecture and Supporting Data Structures RFC 5408, 2009, pp. 1-30.
Baugher et al., Group Key Management Architecture, RFC Draft, 2001, pp. 1-20.
Ben Saied, Yosra; Olivereau, Alexis; Laurent, Maryline; "A Distributed Approach for Secure M2M Communications", 5th International Conference on New Technologies, Mobility and Security (NTMS), May 7-10, 2012, pp. 1-7.
Boyen et al., Anonymous Hierarchical Identity-Based Encryption (Without Random Oracles), 2006.
Boyen et al., Identity-Based Cryptography Standard (IBCS) #1: Supersingular Curve Implementations of the BF and BBI Cryptosystems, RFC 5091, 2007, pp. 1-63.
Harney et al., Group Key Management Protocol (GKMP) Architecture, 1994, pp. 1-19.
Kiltz et al., CCA2 Secure IBE: Standard Model Efficiency through Authenticated Symmetric Encryption, 2008.
Krylov, What is Kerberos Authentication?, 2003, pp. 1-4.
Martin, Introduction to Identity-Based Encryption, ISBN-13 978-1-59693-238-8, 2008.
Merrian-Webster, Network, 2014.
Park et al., A New Practical Identity-Based Encryption System, 2003, pp. 1-27.
Park et al., Secure Profile Provisioning Architecture for Embedded UICC, 2013 IEEE, pp. 297-303.
Shih, Jie-Ren; Hu, Yongbo; Hsiao, Ming-Chun; Chen, Ming-Shing; Shen, Wen-Chng; Yang, Bo-Yin; Wu, An-Yeu; Cheng, Chen-Mou; "Securing M2M with Post-Quantum Public-Key Cryptography", IEEE Journal on Emerging and Selected Topics in Circuits and Systems, Mar. 7, 2013, pp. 106-116.
Voltage Security, The Identity-Based Encryption Advantage, 2015.
Yang et al., Identity-Based Key Agreement and Encryption for Wireless Sensor Networks, IJCSNS International Journal of Computer Science and Network Security, vol. 6, No. 5B, May 2006, pp. 182-189.
Youngblood, An Introduction to Identity-based Cryptography, 2005.
Zhu et al., Public Key Cryptography for Initial Authentication in Kerberos (PPKINIT), RFC 4556, 2006, pp. 1-42.
International Search Report for PCT/US2014/068544 dated Feb. 13, 2015.
T. Pornin, Deterministic Usage of the Digital Signature Algorithm (DSA) and Elliptic Curve Digital Signature Algorithm ECDSA), Internet Engineering Task Force RFC 6979, Aug. 2013, pp. I-79.
GSMA, Fast Dormancy Best Practices Version 1.0, Jul. 27, 2011, TS.18, pp. 1-23.
N. Chu et al., EXALTED: Expanding LTE for Devices, European Commission for Information Society and Media, Oct. 31, 2012, pp. 1-141.
J. Huang et al., A Close Examination of Performance and Power Characteristics of 4G LTE Networks, Mobisys' 12, Jun. 25-29, 2012, pp. 1-14.

(56) References Cited

OTHER PUBLICATIONS

F. Qian et al, TOP: Tail Optimization Protocol for Cellular Resource Allocation, 18th IEEE International Conference on Network Protocols (ICNP), 2010, Oct. 5-8, 2010, pp. 285-298.
ETSI, Machine-to-Machine communications (M2M), mia, dla, and mid interfaces, TS 102.921 v1.1.1, Feb. 2012, pp. 1-538.
C. Downey, Migrating Legacy M2M Systems to the Cloud, http://www.ecnmag.com/articles/2013/02/migrating-legacy-m2m-systems-cloud, Feb. 2013, pp. 1-2.
A. Wander et al, Energy Analysis of Public-Key Cryptography on Small Wireless Devices, Sun Microsystems Laboratories, pp. 1-16. 2005.
V. Martinez et al, A Survey of the Elliptic Curve Integrated Encryption Scheme, Journal of Computer Science and Engineering, vol. 2, Aug. 2010, pp. 7-13.
ETSI, UMTS;LTE; SIM/USIM Internal and External Interworking Aspects, TR 131900 v.10.0.0, May 2011, pp. 1-41.
International Search Report and Written Opinion for PCT/US2014/062435 mailed Feb. 6, 2015.
Wikipedia, RSA (algorithm), http://en.wikipedia.org/wiki/RSA_(algorithm), Sep. 9, 2013, pp. 1-12.
Wikipedia, Elliptic Curve Cryptography, http://en.wikipedia.org/wiki/Elliptic_curve_cryptography, Sep. 9, 2013, pp. 1-8.
L. Larzon, The Lightweight User Datagram Protocol (UDP-Lite), Internet Engineering Task Force RFC 3828, Jul. 2004, pp. 1-12.
Wikipedia, Digital Signature, http://en.wikipedia.org/wiki/Digital_signature, Sep. 9, 2013, pp. 1-10.
D. Cooper, Internet X.509 Public Key Infrastructure Certificate and Certificate Revocation List (CRL) Profile, Internet Engineering Task Force RFC 5280, pp. 1-133, 2008.
J. Jonsson et al, Public-Key Cryptography Standards (PKCS) #1: RSA Cryptography Specifications Version 2.1, Internet Engineering Task Force RFC 3447, Feb. 2003, pp. 1-72.
D. McGrew et al, Fundamental Elliptic Curve Cryptography Algorithms, Internet Engineering Task Force RFC 6090, Feb. 2011, pp. 1-34.
Wikipedia, Elliptic Curve Diffie-Hellman, http://en.wikipedia.org/wiki/Elliptic_curve_Diffie%E2%80%93Hellman, Sep. 24, 2013, pp. 1-2.
ETSI, Smart Cards; Embedded UICC; Requirements Specification, TS 103 383 v12.1.0, Jun. 2013, pp. 1-20.
3GPP, 3rd Generation Partnership Project; Technical Specification Group Services and System Aspects; 3GPP System Architecture Evolution (SAE); Security architecture, 3GPP TS 33.401 V12.9.0 (Sep. 2013) pp. 1-75.
3GPP, 3rd Generation Partnership Project; Technical Specification Group Core Network and Terminals; Non-Access- Stratum (NAS) protocol for Evolved Packet System (EPS); Stage 3, 3GPP TS 24.301 v12.2.0, Sep. 2013 pp. 1-6, 63-100.
ETSI, Smart Cards; UICC-Terminal Interfaces; Physical and Logical Characteristics, TS 102 221 v11.0.0, Jun. 2012, pp. 1-181.

* cited by examiner

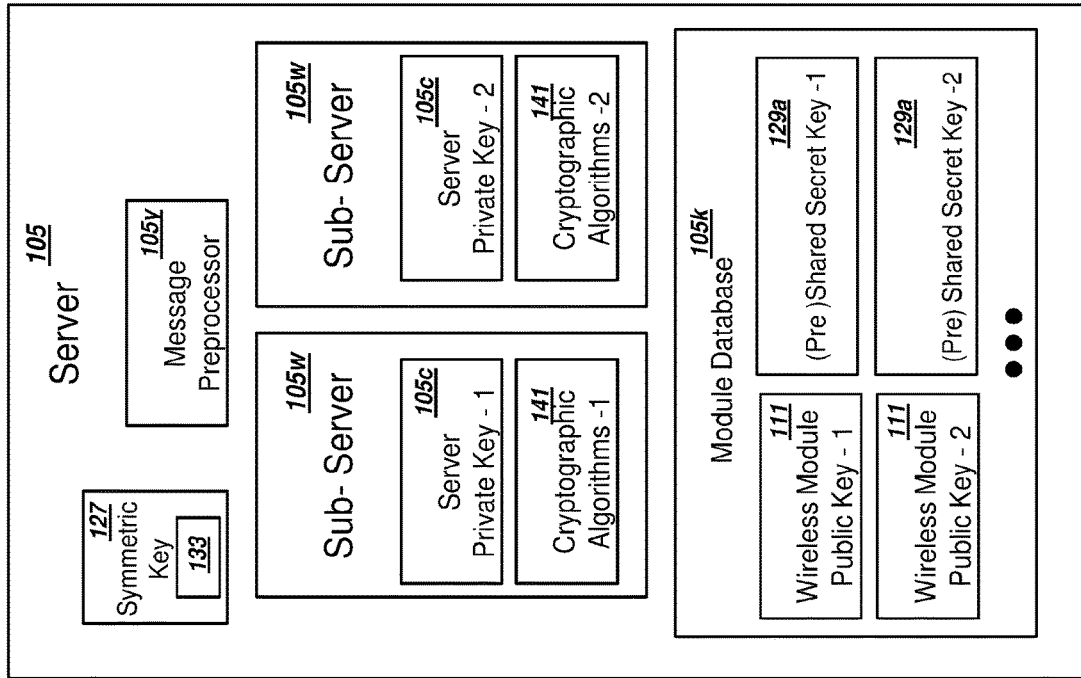
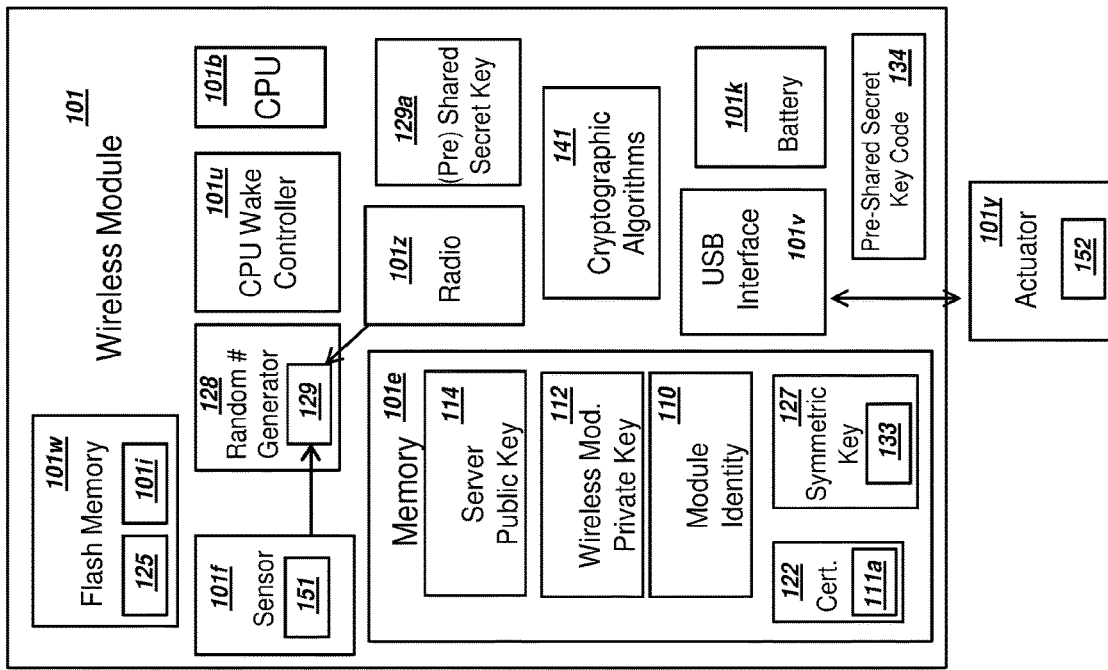

Figure 1h 283 bit Elliptic Curve Key with SHA 256 Signature ( "..." is long text removed)

```
                Certificate:
                  Data:
                    Version: 3 (0x2)
                    Serial Number: 1234931064 (0x499c6c20)
                    Signature Algorithm: SHA-256 ECDSA-256.                          110
                    Issuer: OU=JNIX, CN=server01
                    Validity
       126            Not Before: Feb 01 20:15:24 2009 GMT
                      Not After : Jul 01 20:15:24 2019 GMT
                    Subject: C=US, ST=Illinois, L=Chicago, O=Module Provider, OU=1122AABBFF00
       111a         CN=456
                    Subject Public Key Info:
                      Public Key Algorithm: id-ecPublicKey
                        EC Public Key:
                          pub:
                            a7:a0:8a:0e:27:8f:8f:67:7f:05:36:0c:7e:f4:18:
       111              ...
                            67:60:2d:57:87:8d:cd:0b:e1:f5:3f:ac:aa:81:ea:
       126          ASN1 OID: sect283r1
                    X509v3 extensions:
                      X509v3 Subject Key Identifier:
                        8D:F4:51:AB:B9:41:1F:FC:73:B3:DB:77:45:96:15:54:1A:52:85:25
  122               X509v3 Authority Key Identifier:
                        keyid:FC:99:74:45:56:10:F1:87:AD:EA:56:70:67:A2:26:0E:3D:9E:D6:66
                        DirName:/OU=JNIX/CN=server41
                        serial:49:9C:6A:ED
                      X509v3 CRL Distribution Points:
                        Full Name:
                          URI:URI:http://www.inchargesys.com/ca/crl/ics_root_ca.crl
                      X509v3 Key Usage:
                        Digital Signature
                    Signature Algorithm: ECDSA with SHA256
                        83:08:20:2a:79:e3:c3:60:b0:2f:c2:89:d4:a2:b7:57:3e:b6:
       123            ...
                        05:ce:d3:e4:34:cf:d2:e1:e3:c3:60:b0:2f:c2:25
                  -----BEGIN CERTIFICATE-----
                  BggqgRzXYwzjCCAYKgAwIBAgIESZxsIDKnnjw2CwL8KJ1K
                  ...
                  EBAQUAMCIxDTALMIIBegwggK3Vz62JQ==
                  -----END CERTIFICATE-----
```

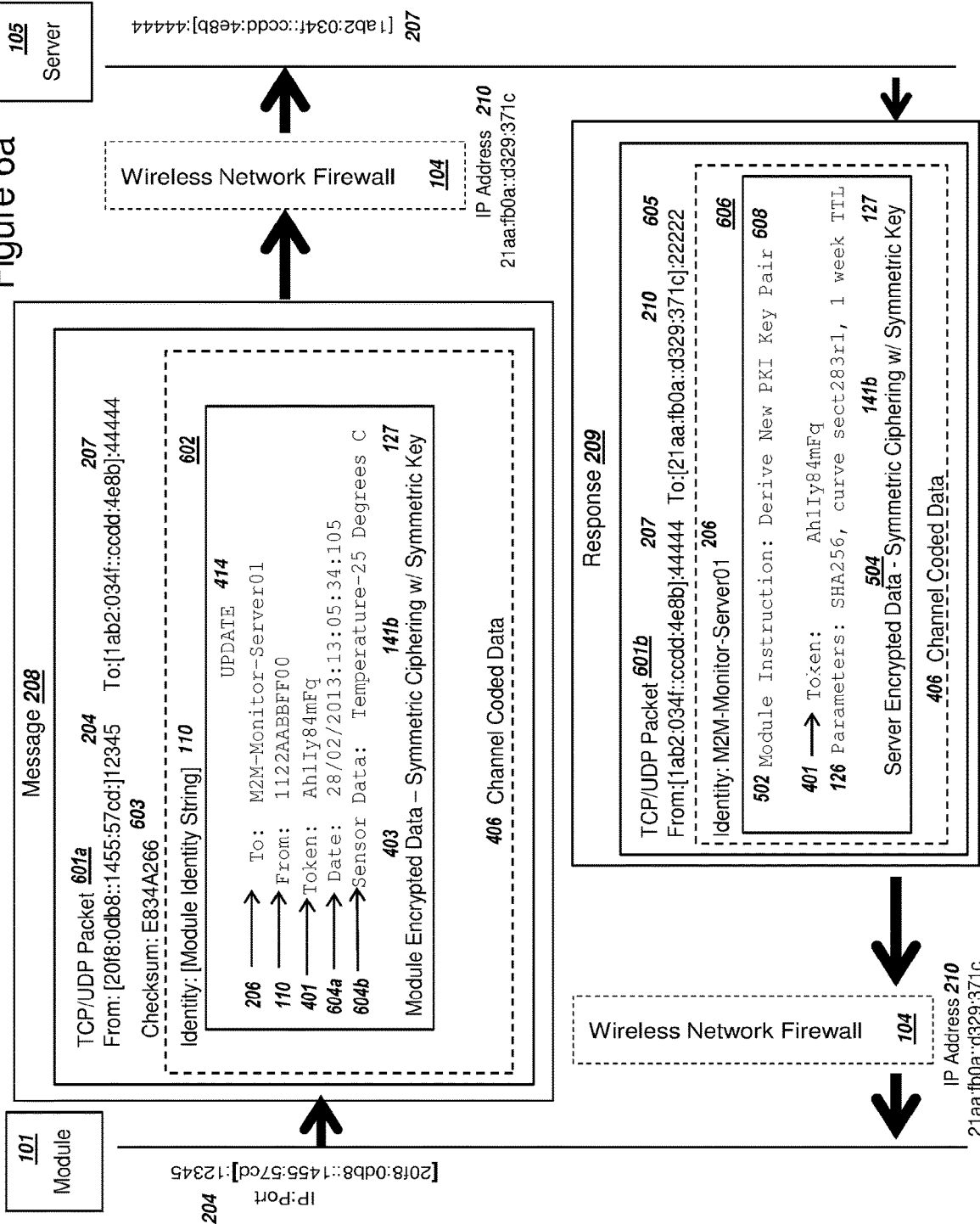

SYSTEMS AND METHODS FOR "MACHINE-TO-MACHINE" (M2M) COMMUNICATIONS BETWEEN MODULES, SERVERS, AND AN APPLICATION USING PUBLIC KEY INFRASTRUCTURE (PKI)

CROSS-REFERENCE TO RELATED APPLICATIONS

This is a continuation of U.S. patent application Ser. No. 18/111,669, filed Feb. 20, 2023, which is a continuation of U.S. patent application Ser. No. 17/647,812, filed on Jan. 12, 2022, U.S. patent application Ser. No. 16/593,561, filed Oct. 4, 2019, now U.S. Pat. No. 11,258,595, which is a continuation of U.S. patent application Ser. No. 16/036,506 filed Jul. 16, 2018, now U.S. Pat. No. 10,530,575, which is a continuation of U.S. patent application Ser. No. 15/583,968 filed May 1, 2017, now U.S. Pat. No. 10,057,059, which is a continuation of U.S. patent application Ser. No. 15/010,905 filed Jan. 29, 2016, now U.S. Pat. No. 9,641,327, which is a continuation of U.S. patent application Ser. No. 14/055,606 filed Oct. 16, 2013, now U.S. Pat. No. 9,276,740, each of which is fully incorporated by reference herein.

The subject matter of this application is related to the subject matter of U.S. patent application Ser. No. 14/023,181, filed Sep. 10, 2013, which issued as U.S. Pat. No. 9,350,550, in the name of John Nix, entitled "Power Management and Security for Wireless Modules in 'Machine-to-Machine' Communications," which is hereby incorporated by reference in its entirety.

The subject matter of this application is also related to the subject matter of U.S. patent application Ser. No. 14/039,401, filed Sep. 27, 2013, which issued as U.S. Pat. No. 9,288,059 in the name of John Nix, entitled "Secure PKI Communications for 'Machine-to-Machine' Modules, including Key Derivation by Modules and Authenticating Public Keys," which is hereby incorporated by reference in its entirety.

BACKGROUND

Technical Field

The present methods and systems relate to communications between wireless modules and a network, and more particularly, to efficient methods and systems for supporting secure, efficient, and flexible communications using Internet Protocol networks, where a server can communicate with both a "machine-to-machine" modules and an application.

Description of Related Art

The combination of "machine-to-machine" (M2M) communications and using low-cost sensors, Internet connections, and processors is a promising and growing field. Among many potential benefits, M2M technologies allow the remote monitoring of people, assets, or a location where manual monitoring is not economic, or costs can be significantly reduced by using automated monitoring as opposed to manual techniques. Prominent examples today include vending machines, automobiles, alarm systems, and remote sensors. Fast growing markets for M2M applications today include tracking devices for shipping containers or pallets, health applications such as the remote monitoring of a person's glucose levels or heartbeat, monitoring of industrial equipment deployed in the field, and security systems. Many M2M applications leverage either wired Internet connections or wireless connections, and both types of connections continue to grow rapidly. M2M applications may also be referred to as "the Internet of things".

M2M communications can provide remote control over actuators that may be connected to a M2M device, such as turning on or off a power switch, locking or unlocking a door, adjusting a speed of a motor, or similar remote control. A decision to change or adjust an actuator associated with an M2M device can utilize one or a series of sensor measurements. An M2M device may also be referred to as a "wireless module" or also simply a module. As one example, if a building or room is too cold, then temperature can be reported to a central server by an M2M device and the server can instruct the M2M device to turn on a switch that activates heat or adjusts a thermostat. As the costs for computer and networking hardware continue to decline, together with the growing ease of obtaining either wired or wireless Internet access for small form-factor devices, the number of economically favorable applications for M2M communications grows.

Many M2M applications can leverage wireless networking technologies. Wireless technologies such as wireless local area networks and wireless wide area networks have proliferated around the world over the past 15 years, and usage of these wireless networks is also expected to continue to grow. Wireless local area network (LAN) technologies include WiFi and wireless wide area network (WAN) technologies include 3rd Generation Partnership Project's (3GPP) 3rd Generation (3G) Universal Mobile Telecommunications System (UMTS) and 4th Generation (4G) Long-term Evolution (LTE), LTE Advanced, and the Institute of Electrical and Electronics Engineers' (IEEE) 802.16 standard, also known as WiMax. The use of wireless technologies with "machine-to-machine" communications creates new opportunities for the deployment of M2M modules in locations without fixed-wire Internet access, but also creates a significant new class of problems that need to be solved. First, many wireless wide-area networking standards were designed and optimized for mobile phones, which may be continuously connected to the network during the day (i.e. non-sleeping hours for most subscribers while they may charge phones at night), in order to receive inbound phone calls and messages. In this case, the radio may be in an idle state but utilizing discontinuous reception, but the radio is still active and drawing power in order to receive and process incoming signaling from the network such as a Public Land Mobile Network (PLMN). A need exists in the art to make wireless M2M communications efficient in order to conserve battery life and radio-frequency spectrum resources.

Since the packets transmitted and received by a wireless module will likely traverse the public Internet for many applications, a need exists in the art to (i) prevent eavesdropping at intermediate points along the path of packets transmitted and received, (ii) allow endpoints to verify the identity of the source of packets received. A need exists in the art for a wireless module and a monitoring server to leverage established public key infrastructure (PKI) techniques and algorithms. A need exists in the art for communication to be secured without requiring the established, but relatively processing, bandwidth, and energy intensive security protocols, such as IPSec, Transport Layer Security (TLS), and Secure Socket Layer (SSL). The establishment of theses links requires extra overhead in the form of packet handshakes and/or key exchanges at levels including the network and transport layer of the traditional Open Systems Interconnection (OSI) model. M2M applications frequently require small, periodic messages sent between a wireless module and a monitoring server, where the wireless module sleeps between the messages. M2M applications may leverage wired modules as well which also sleep between messages. During relatively long periods of sleep such as 30 minutes or more, the a wireless or wired network with intermediate firewalls will often tear down the network and/or transport layer connections, which means the wireless module would need to re-negotiate or reestablish the secure tunnels each time the wireless module wakes and seeks to send a relatively small message to a server. A need exists in the art for supporting established security protocols with an external application, without requiring them to be implemented on a module due to the relatively long periods of sleep and other complexities from inactivity in the module.

Next, a need exists in the art for the communication between a module and a monitoring server to be highly energy and bandwidth efficient in order to reduce energy consumption over the operating lifetime of a module. A limiting factor for a wireless module for M2M applications deployed or installed into the field is the lifetime of the battery of the wireless module. If the transmission techniques for the wireless module are not energy efficient, the system will require more frequent manual intervention for the replacement or recharging of batteries. If the battery becomes sufficiently low, then communication with the wireless module will be lost, or the frequency would have to be reduced for sensor measurements sent by the wireless module or actuator commands sent by a monitoring server. The energy saving techniques for transmitting and receiving data should leverage established Internet protocols, in order to utilize the public Internet, in addition to the need for secure communications noted above. For wired modules operating for years or decades, a significant cost will be the power consumed from land-line power.

Further, a need exists in the art for the secure, energy efficient communications that support Internet protocols to support intermediate firewalls that may exist along the path of packets sent and received by both a wireless module and a monitoring server. Without support for communication through an intermediate firewall, packets may be blocked by the firewall and the M2M application would not properly function in this case. A need exists in the art for techniques of secure and energy-efficient communications between modules and monitoring servers to support a wide variety of manufacturers of modules and M2M applications. Currently, there are dozens of manufacturers and form-factors of modules, and this diversity will continue to increase for the foreseeable future. By leveraging standards such as the Internet and PKI technologies, an efficient, secure, and highly scalable system of communicating could support the wide variety of modules.

In addition, the utilization of PKI technologies in modules can increase security, but a number of technical challenges must be addressed. These challenges increase if a deployed module required updated private/public key pairs after operation begins. The typical paradigm of "swapping out a SIM card" (which also depend on a pre-shared secret key Ki embedded in the card) with mobile phones may not be applicable or cost effective with modules, where swapping out the SIM card could be burdensome. A need exists in the art to allow for a deployed module to securely and automatically begin using new private and public keys (i.e. without human intervention such as swapping out a SIM card). Newer PKI technologies may offer a wide variety of algorithms for ciphering with public keys, and a need exists in the art for the utilization of new public and private keys to support the wide variety of algorithms, even after a module has been installed. In other words, a system should preferably both be highly secure and also flexible enough to adopt new security keys and standards. A need exists in the art for a scalable and secure method of associating a module identity with a module public key, when the module begins utilizing a new public key. A need exists in the art for a module to efficiently be able to utilize multiple public/private key pairs at the same time, such as with different service providers or different applications simultaneously.

Another desirable feature is for an M2M module to efficiently and securely communicate with applications. Applications can include a web-based interface for users to view status or input settings for a plurality of modules, and the modules may be associated with an M2M service provider. However, a set of PKI algorithms, keys, and communication protocols within used by the module for efficient communications module may not be directly compatible with an application. As one example, the application on a web server may prefer to use a transport layer security (TLS) protocol with transmission control protocol (TCP) datagrams, while for energy efficiency and to conserve battery life, an M2M module may prefer to use user datagram protocol (UDP). A need exists in the art for an intermediate server to securely translate secure communications to/from a module into secure communication from/to an application. As another example, it would be desirable for a module to support elliptic key cryptography (ECC), while the application may support RSA-based cryptography, and therefore a need exists in the art for a server to securely translate between the two cryptographic methods, thereby allowing the M2M module to communicate with the application.

And other needs exist in the art as well, as the list recited above is not meant to be exhaustive but rather illustrative.

SUMMARY

Methods and systems are provided for secure and efficient communication using a server to communicate with modules and an application. The modules and application can support "Machine to Machine" communications. The methods and systems contemplated herein can also support other applications as well, including mobile phone handsets connecting to a wireless network. An objective of the invention is to address the challenges noted above for securing the deployment of modules that utilize PKI algorithms and keys, as well as increasing efficiency in order to reduce power consumption, including extending the battery life of a module, if present. More efficient communication can also conserve valuable radio-frequency spectrum, among other benefits. Using a server for secure and reliable communication of data between an application and a module can increase the value and usefulness of modules for a user.

An exemplary embodiment may take the form of methods and systems for a server to securely receive data from a module and forward the data to an application server, and an application may operate on the application server. The application can include a graphical user interface for a user to visually see reports and/or control modules. The module, server, and application can preferably include a set of cryptographic algorithms for use in sending and receiving data. The cryptographic algorithms can include asymmetric ciphering algorithms, symmetric ciphering algorithms, secure hash algorithms, digital signature algorithms, key pair generation algorithms, a key derivation function, and/or a random number generator.

The module can utilize the set of cryptographic algorithms to securely generate or derive a module private key and a module public key. The module private key and module public key can be generated either (i) upon initial use or installation of the module, or (ii) at a subsequent time after initial use such as when a new set of key pairs are required or are useful for continued operation of the module. After deriving the module public key and module private key, the module private key is preferably recorded in a secure or protected location in a nonvolatile memory within the module. The module may then utilize the recorded pre-shared secret key to authenticate with a server that also records or has access to the pre-shared secret key. The authentication could comprise either using message digest with the pre-shared secret key, or using the pre-shared secret key as a symmetric ciphering key, and the authentication may also utilize a second key derived by both the module and the server using the pre-shared secret key. After authentication, the server can authoritatively record the derived module public key with the module identity in a database. Thus, the use of a pre-shared secret key can ensure the submitted module public key is validly associated with the module and module identity. The module can be associated with a monitored unit and the module can use a sensor to collect data regarding the monitored unit. The module may also optionally include an actuator for controlling a state of the monitored unit, although the actuator may optionally be omitted.

The server can include a private key associated with the server and the derived public key associated with the module. The server public key can leverage established public key infrastructure (PKI) standards, such as X.509 v3 certificates and RSA or elliptic curve cryptography (ECC) algorithms and include a digital signature from a certificate authority. The server can use a module controller and an operating system plus a connection to the Internet to monitor a socket for incoming messages from a module. After receiving the module public key, including potentially after a period of sleep or dormancy by the module, the server can receive a message, where the message includes a module identity and a module encrypted data. The module encrypted data can include a server instruction, a security token, and additional data such as a sensor measurement. The server can decrypt the module encrypted data using the received module public key and extract plaintext data from the module encrypted data.

The server can establish a secure connection with the application server using a secure connection setup, which could comprise the initial handshake messages for a transport-layer security protocol such as transport layer security (TLS) or IPSec. The secure connection setup can include the transfer of a server public key and an application server public key. The server can send an application message to the application server using a secure connection data transfer, where the application message includes data received from the module such as a sensor measurement or sensor data. The server can use (i) an RSA-based asymmetric ciphering algorithm and first public key with the application server to securely transfer a first symmetric key to the application server, and (ii) an ECC-based asymmetric ciphering algorithm and second public key with the module to securely transfer a second symmetric key to the module. The server may also preferably use a transmission control protocol (TCP) with the application server and a user datagram protocol (UDP) with the module. The application message to the application server can include a server identity, an encrypted update instruction, and the sensor data. The sensor data may also include a sensor identity. The server can use a first Internet protocol address and port (IP:port) number for receiving the message from the module and a second IP:port number for sending the application message to the application server. The application server can record the sensor data in an application database for subsequent processing and analysis for a user or other business or commercial needs.

In another embodiment, the module may be deployed within a wireless network such as a 4G LTE network or a WiFi network. The module can change state between a sleep state and an active state, wherein the sleep state may utilize a few milliwatts or less and the active state, including transmission of radio signals, may utilize several hundred milliwatts of power or more. After being installed next to a monitored unit, the wireless module can wake from a sleep or dormant state, utilize a sensor to collect data associated with the monitored unit, connect to the wireless network and the Internet, and send the sensor data to a server. During an active period, the module can use a UDP IP:port number to both send a message to the server and receive a response to the server. The message as a UDP datagram can be a UDP Lite datagram and with a checksum only applied to the packet header. A UDP Lite datagram with sensor data can include channel coding for the body of the datagram to mitigate the effect of bit errors. Or, a regular UDP packet could be sent in multiple copies in order to provide forward error correction.

In another embodiment of the present invention, the application server may send an application message to the server using a secure connection data transfer. The application message could be encrypted using a first server public key and could include a module identity and a module instruction. The module instruction can include an actuator setting, and also optionally an actuator identity (since the module may include multiple actuators). The server can decrypt encrypted data within the application message and record the module identity and module instruction in memory or a module database. Since the module can transition between periods of sleep and active states to conserve power, after receiving the application message the server can wait until a next message is received from the module with the module identity before sending the module instruction in a response. After waiting for the next message, the server can send the module instruction to the module in a server encrypted data using a second server public key. The first and second server public keys can use different cryptographic algorithms that are not directly compatible (i.e. the first server public key could be RSA-based and the second server public key could be ECC-based).

In another embodiment, the server can securely send the module a set of parameters, where the set of parameters includes values to define an equation for an elliptic curve. The values could comprise constants and variables such that the module can calculate a new elliptic curve, and the elliptic curve can be different than standard, published curves. The set of parameters could be sent from the server to the module in a server encrypted data, where the server encrypted data was processed using any of (i) a first module public key, (ii) a symmetric key, and (iii) a shared secret key. The module can use the set of parameters, a random number generator, and a key generation function within a cryptographic algorithms in order to generate a new key pair, which could comprise a second module public key and a second module private key. The module can securely and/or authoritatively send the second module public key to the server, where the security includes the use of the first module public key and/or the shared secret key.

Continuing with this embodiment, after the server confirms the proper receipt of the second module public key in a response message, the server and the module can begin secure communications between them using the second module public key. By using this exemplary embodiment, security can be further increased with the server and module using an elliptic curve that can be unique, non-standard, or defined between them and security therefore increased. In this exemplary embodiment, the parameters to define the elliptic curve equation are sent securely to the module, so an observer along the flow of data could not observe the elliptic equation being used with a public key.

In yet another embodiment, the server can receive a first message with a module identity and a module encrypted data, where the first module encrypted data includes a first sensor measurement. The server can use a first module public key associated with a first module public key identity to decrypt the first module encrypted data. As one example, (a) the first module encrypted data could be ciphered with a symmetric key, and (b) the symmetric key could have been communicated using the first module public key (including using the first module public key to verify a module digital signature in a session where the symmetric key was transferred), and therefore (c) the module encrypted data could be encrypted using the first module public key. The server can also use a first server public key to decrypt the first module encrypted data, such as the symmetric key being derived using both the first module public key and the first server public key and a key derivation function within a cryptographic algorithms. The server can extract the first sensor measurement and send the data to an application server in an application message. The application message could be encrypted using a second server public key. The first and second server public keys can be different because they could each be associated with a different algorithm or defining equation.

Continuing with this embodiment, the server can send a module instruction and a set of parameters to the module, where the module is instructed to derive a new set of keys, and the module can subsequently derive a second module public key and a second module private key after receiving the module instruction. The module can then send the second module public key, a second module public key identity, and the module identity to the server. The server can receive a second module encrypted data that includes a second sensor data, where the second sensor data is encrypted using the second module public key. As one example, (a) the second module encrypted data could be ciphered with a symmetric key, and (b) the symmetric key could have been communicated using the second module public key (including using the second module public key to verify a module digital signature in a session where the symmetric key was transferred), and therefore (c) the module encrypted data could be encrypted using the second module public key. The server can extract the second sensor data using the second module public key. The server can use the second server public key to send a second application message with the second sensor data to the application server. Note that the module public key can change, but both (i) the second server public key used with the application server and also (ii) keys associated with the application server did not change. In this manner according to this embodiment, a module can derive a new public and private key while a server and application server can continue to communicate using existing public and private keys.

In another embodiment, the application server can use a module public key and an asymmetric ciphering algorithm to encrypt a module instruction. The application server can also include a digital signature of the module instruction using the application server private key. The encrypted module instruction and digital signature can be sent to a server in an application message, and the application message can also include an identity of the application server. The server can wait until a message is received from a module, and then send the encrypted module instruction and digital signature to the module in a response. The module can read receive the response, read the identity of the application server, select a public key of the application server, verify the digital signature of the module instruction, and decrypt the module instruction using the module private key. The module can then apply the module instruction and send a message with a confirmation. In this manner, the module may receive instructions from the application that are not decrypted by the server.

These as well as other aspects and advantages will become apparent to those of ordinary skill in the art by reading the following detailed description, with reference where appropriate to the accompanying drawings.

BRIEF DESCRIPTION OF THE DRAWINGS

Various exemplary embodiments are described herein with reference to the following drawings, wherein like numerals denote like entities.

FIG. 1e is a graphical illustration of the components within a module, in accordance with exemplary embodiments;

FIG. 1f is a graphical illustration of the components within a server, in accordance with exemplary embodiments;

FIG. 1h is an illustration of a certificate that includes a PKI public key, where the key comprises an elliptic curve cryptography (ECC) key, in accordance with exemplary embodiments;

FIG. 6a is a simplified message flow diagram illustrating an exemplary message received by a server, and an exemplary response sent from the server, in accordance with exemplary embodiments;

DETAILED DESCRIPTION OF EXEMPLARY EMBODIMENTS OF THE INVENTION

FIG. 1a

Figure 1A:
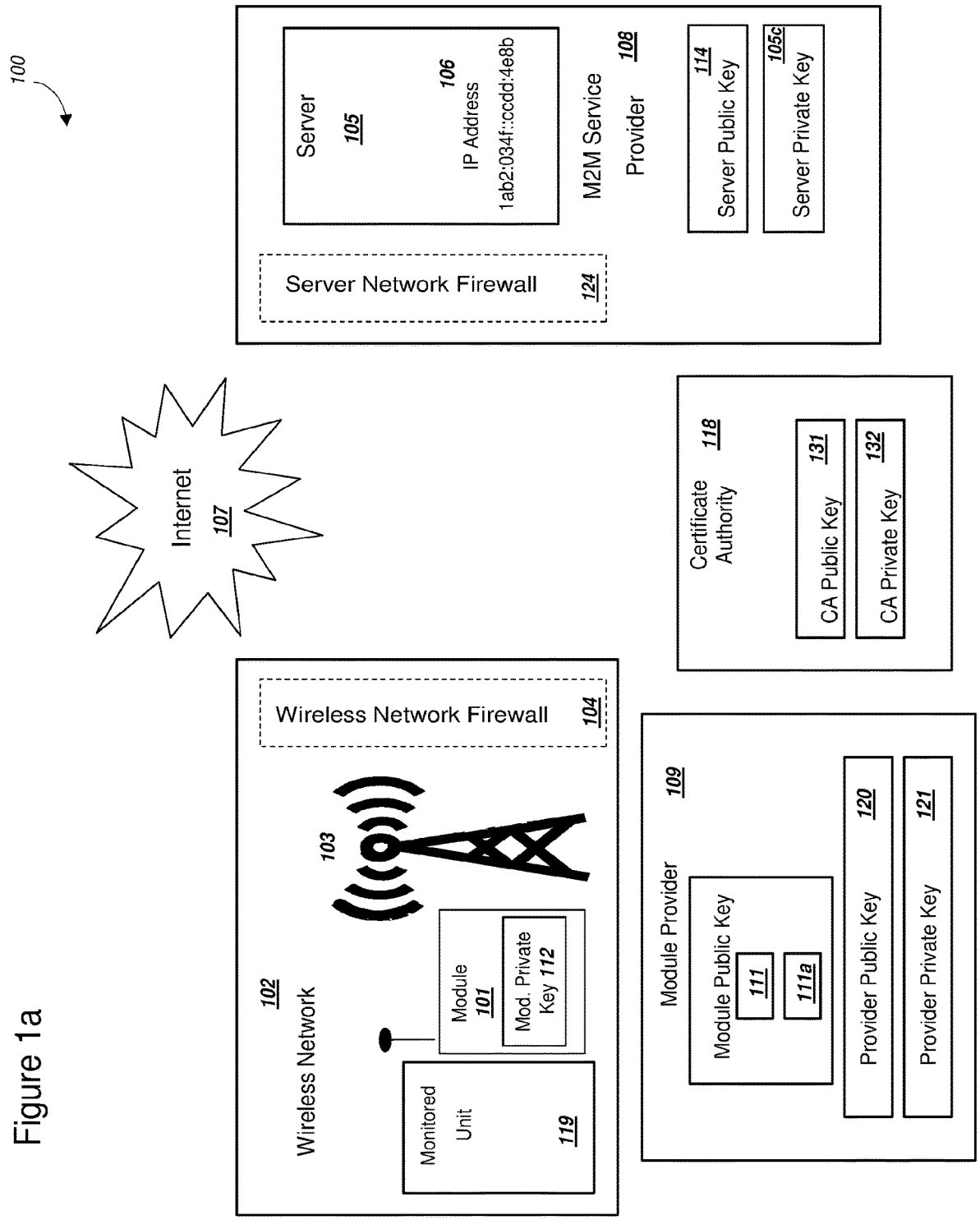
FIG. 1a is a graphical illustration of an exemplary system, where a server and a module connect to the Internet, in accordance with exemplary embodiments.

FIG. 1a is a graphical illustration of an exemplary system, where a server and a module connect to the Internet, in accordance with exemplary embodiments. The system 100 includes a module 101 operating within a wireless network 102. System 100 can also include a module provider 109, an Internet 107, and an M2M service provider 108, a certificate authority 118, and a monitored unit 119. M2M service provider 108 can include a server 105. System 100 is illustrated without specific packet transmissions between module 101 and M2M service provider 108. Examples of the communications and messages pertaining to the present invention will be illustrated in later Figures. As contemplated herein, machine-to-machine communications may comprise communication between a module 101 and a server 105, such that data can be transferred between the two with minimal manual intervention, although manual intervention can be required to set up system 100 and any occasional manual maintenance required. As contemplated herein, machine-to-machine communications may also be referred to as "the Internet of things" (IoT). Also note that module 101 may comprise a wireless module, such that module 101 can communicate with wireless network 102 using a radio and an antenna. Thus, either a wireless or a wired configuration for module 101 can be utilized in the present invention.

If module 101 operates as a wireless module, module 101 and wireless network 102 can communicate using a base station 103. Module 101 and wireless network 102 can utilize a variety of wireless technologies to communicate, including WiFi, WiMax, a 2nd generation wireless wide area network (WAN) technology such as General Packet Radio Services (GPRS) or Enhanced Data rates for GSM Evolution (EDGE), 3rd Generation Partnership Project (3GPP) technology such as 3G, 4G LTE, or 4G LTE Advanced, and other examples exist as well. A wired module 101 can connect to the Internet 107 via a wired connection such as an Ethernet, a fiber optic, or a Universal Serial Bus (USB) connection (not shown).

Generally, the communication techniques described herein can be independent of the network technologies utilized at the physical and data-link layers, so long as the underlying network provides access to the Internet 107 and supports Internet Protocols (IP). The Internet 107 can be an IPv4 or an IPv6 packet-switched based network that utilizes standards derived from the Internet Engineering Task Force, such as RFC 786 (User Datagram Protocol), RFC 793 (Transmission Control Protocol), and related protocols. The Internet 107 can be the public Internet comprising globally routable IP addresses, or a private network that utilizes private IP addresses. Although Internet 107 is illustrated as the globally routable public Internet in FIG. 1, Internet 107 could also be a private Internet that is (i) not globally routable and (ii) only accessible to authorized modules and servers. As one example of a private Internet 107, Internet 107 could use private IP addresses for nodes on the network, and in this case Internet 107 could be referred to as an intranet or private network. Alternatively, Internet 107 could be a private network layered on top of the publicly routable Internet via secured and encrypted connections. The specific numbers for IP addresses and port numbers shown in FIG. 1 and other figures are illustrative and any valid IP address or port number can be used, including an IPv4 and an IPv6 address.

When operating in a wireless network configuration, module 101 can access the Internet 107 via the wireless network 102. In the wireless network configuration, module 101 can be a wireless handset, a cellular phone, a smartphone, a tablet computer, a laptop, a computer with a radio, a tracking device, or a circuit board with a radio that accesses wireless network 102. Examples of wireless modules that utilize a wireless WAN such as 2G and 3G networking technologies include the Motorola® G24-1 and Huawei® MC323. Example manufacturers of wireless modules in 2012 include Sierra Wireless® and Telit®. In a wired configuration (not shown), module 101 can be a computer, security camera, security monitoring device, networked controller, etc. A more detailed depiction of exemplary components of a module 101 is included in FIG. 1b and FIG. 1e below. Module 101 could also comprise a "point of presence" payment terminal, such that a sensor associated with module 101 could collect payment information such as an account number from a credit card or similar payment card. Module 101 could communicate with the payment card via a magnetic reader or near-field wireless communications, and in this case the magnetic reader or antenna for near-field communications can function as a sensor. Module 101 could also operate as a "smartcard" such that an end user presents module 101 to merchants for payments.

Wireless network 102 may comprise either a wireless local area network (LAN) such as an 802.11 WLAN, Bluetooth, or Zigbee among other possibilities, and module 101 operating in wireless mode could communicate with a base station 103 of a wireless network 102 using a radio and an antenna. Wireless network 102 could operate as a Mode II device according to FCC Memorandum Opinion and Order (FC-12-36) and related white space regulation documents. If module 101 supports IEEE 802.15.4, then wireless network 102 could be a Zigbee network, an ISA100.11a standards-based network, or a 6LoWPAN network as described by IETF RFC 4944. Other possibilities exist as well for the wireless technology utilized by a wireless network 102 and module 101, operating in a wireless mode, without departing from the scope of the present invention.

Module 101 can collect data regarding a monitored unit 119 and periodically report status to an M2M service provider 108 or a server 105. Examples of a monitored unit 119 can include a vending machine, an alarm system, an automobile or truck, a standard 40-foot or 20-foot shipping container, or industrial equipment such as a transformer on an electrical grid or elevator in a building. Additional examples of a monitored unit 119 include can also include a pallet for shipping or receiving goods, an individual box of pharmaceuticals, a health monitoring device attached to a person such as a pacemaker or glucose monitor, and a gate or door for opening and closing. Other examples exist as well without departing from the scope of the present invention. Module 101 can utilize a sensor to measure and collect data regarding a parameter of monitored unit 119 such as temperature, physical location potentially including geographical coordinates from a Global Positioning System (GPS) receiver, radiation, humidity, surrounding light levels, surrounding RF signals, weight, vibration and/or shock, voltage, current, and/or similar measurements. If monitored unit 119 is a person or a health monitoring device associated with a person, then relevant health data could be recorded by module 101 in order to transmit to a M2M service provider 108, which could be associated with a health service such as a hospital, doctor's office, or a similar health service. Module 101 could also periodically record a picture, image, or video of or around monitored unit 119, using either visible or infrared light.

As illustrated in FIG. 1a, wireless network 102 may include a wireless network firewall 104 and M2M service provider 108 may include a server network firewall 124. These firewalls may be used to secure communication at the data link, network, transport, and/or application layers of communications using the Internet 107. Firewalls 104 and 124 could perform network address translation (NAT) routing or operate as symmetric firewalls, and selectively filter packets received through Internet 107 in order to secure system 100. The firewall functionality of firewalls 104 and 124 could be of many possible types, including a symmetric firewall, a network-layer firewall that filters inbound packets according to pre-determined rules, an application-layer firewall, or a NAT router, as examples. Although a single firewall 104 and 124 is illustrated in wireless network 102 and with M2M service provider 108, respectively, firewall 104 and 124 may each comprise multiple firewalls that operate in conjunction and the combined operation may be considered a single firewall 104 and 124, respectively. Firewall 104 and/or firewall 124 can include a firewall port binding timeout value 117 (illustrated in FIG. 2), which can represent the time allowed for an inbound packet from the Internet 107 to pass through firewall 104 or firewall 124 after module 101 or server 105, respectively, sends a packet out. Firewall port binding timeout value 117 may be determined on a per-protocol basis, such as an exemplary time of 60 seconds for UDP packets and 8 minutes for TCP packets, although other time values for a firewall port binding timeout value 117 are possible as well. Inbound packets from Internet 107 to module 101 may be dropped by firewall 104 after a time exceeding firewall port binding timeout value 117 has transpired since the last packet transmitted by module 101.

According to a preferred exemplary embodiment, module 101 may preferably record a module private key 112. As described in additional figures below, module 112 can generate a key pair comprising a module private key 112 and a module public key 111, where module private key 112 resides within module 101 and may not be shared or transmitted to other parties. Alternatively, the present invention also contemplates that module 101 does not derive its own module private key 112, and rather module private key 112 is securely loaded or transmitted to module 101. Module 101 may also be associated with a module provider 109. Module provider 109 could be a manufacturer or distributor of module 101, or may also be the company that installs and services module 101 or associates module 101 with monitored unit 119. Although not illustrated in FIG. 1a, module provider 109 could deliver module 101 to an end-user, where the end-user associates module 101 with monitored unit 119. Module provider 109 can record a module public key 111 and a certificate 122 (illustrated below in FIG. 1e and FIG. 1h) for module 101. Module public key 111 may be associated with a module public key identity 111a, which could be an identifier of module public key 111. Module 101 may utilize a plurality of module private keys 112 and module public keys 111 during the operation of a system 100, although the use of a plurality of keys may not be required in order to use some embodiments of the invention contemplated herein.

As discussed below, a module 101 may utilize multiple module public keys 111 over the lifetime of module 101 (including multiple corresponding module private keys 112), and module public key identity 111a can be used to select and/or identify the correct module public key 111. Module public key identity 111a could be a string or sequence number uniquely associated with module public key 111. As illustrated in FIG. 1a, module public key identity 111a may preferably not be included in the string or number comprising module public key 111, but rather associated with the string or number comprising module public key 111, and in this case the two together (module public key identity 111a and the string or number for module public key 111) may be used to refer to module public key 111 as contemplated herein.

The module public key 111 can optionally be signed by a certificate authority 118 in order to confirm the identity of module 101 and/or the identity of module provider 109. Alternatively, module provider 109 may have its own provider public key 120 and provider private key 121. Module provider 109 may have its provider public key 120 signed by a certificate authority 118 and recorded in a certificate 122 (with an exemplary certificate 122 illustrated in FIG. 1h below), and then module provider 109 could sign module public key 111. In this manner, module provider 109 can also function as a certificate authority 118 for module 101. Thus, the validity of module public key 111 could be checked with module provider 109, and the wireless module provider's 109 provider public key 120 could be checked against certificate authority 118. Other configurations for signing public keys and using certificates with public keys are possible as well without departing from the scope of the present invention.

Public keys and private keys as contemplated in the present invention, including module public key 111 and module private key 112 and additional keys described herein, may leverage established standards for Public Key Infrastructure (PKI). Public keys may be formatted according to the X.509 series of standards, such as X.509 v3 certificates, and subsequent or future versions, and these keys may be considered cryptographic keys. The keys can support standards such as the International Organization for Standardization (ISO) ISO/IEC 9594 series of standards (herein incorporated by reference) and the Internet Engineering Task Force (IETF) RFC 5280 titled "Internet X.509 Public Key Infrastructure Certificate and Certificate Revocation List (CRL) Profile" (herein incorporated by reference), including future updates to these standards.

Module public key 111 and module private key 112, as well as the other private and public keys described within the present invention, could be generated using standard software tools such as Openssl, and other tools to generate public and private keys exist as well. Public and private keys as contemplated herein could be recorded in a file such as a *.pem file (Privacy-enhanced Electronic Mail), a file formatted according to Basic Encoding Rules (BER), Canonical Encoding Rules (CER), or Distinguished Encoding Rules (DER), or as text or binary file. Other formats for public and private keys may be utilized as well, including proprietary formats, without departing from the scope of the present invention. As contemplated herein, a key may also comprise either a public key or a private key. A public key as contemplated herein may also be considered a certificate or a public certificate. A private key as contemplated herein may also be considered a security key or a secret key.

Other configurations besides the one illustrated in FIG. 1a are possible as well. Server 105 could reside within wireless network 102 in a data center managed by wireless network 102. Wireless network 102 could also operate as a module provider 109. Although a single module 101 and server 105 are illustrated in FIG. 1a, system 100 could comprise a plurality of each of these elements. Module 101 could also record sensor data pertaining to a plurality of monitored units 119. Module 101 could be mobile, such as physically attached to a truck or a pallet, and module 101 could connect to a series of different wireless networks 102 or base stations 103 as module 101 moves geographically. Other configurations are possible as well without departing from the scope of the present invention.

FIG. 1b

Figure 1D:
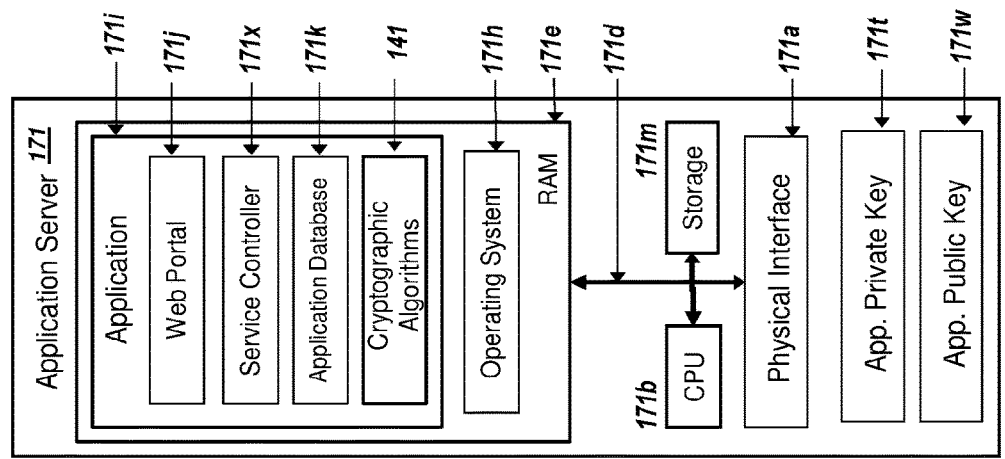
FIG. 1d is a graphical illustration of hardware, firmware, and software components for an application server, in accordance with exemplary embodiments.
Figure 1C:
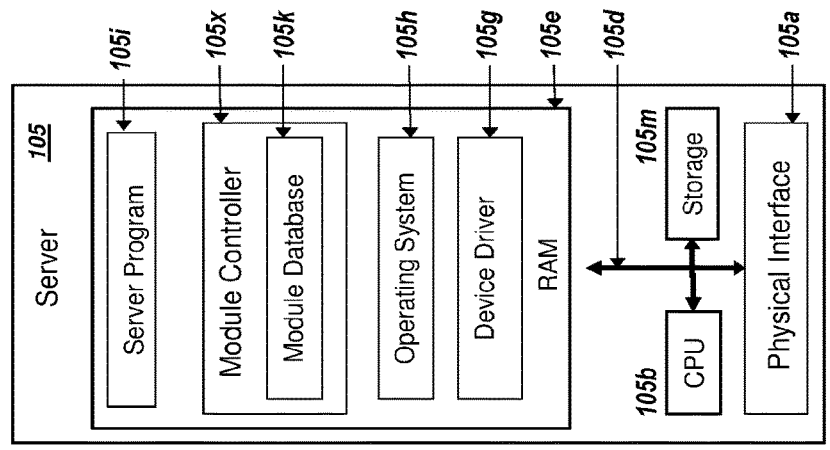
FIG. 1c is a graphical illustration of hardware, firmware, and software components for a server, in accordance with exemplary embodiments.
Figure 1B:
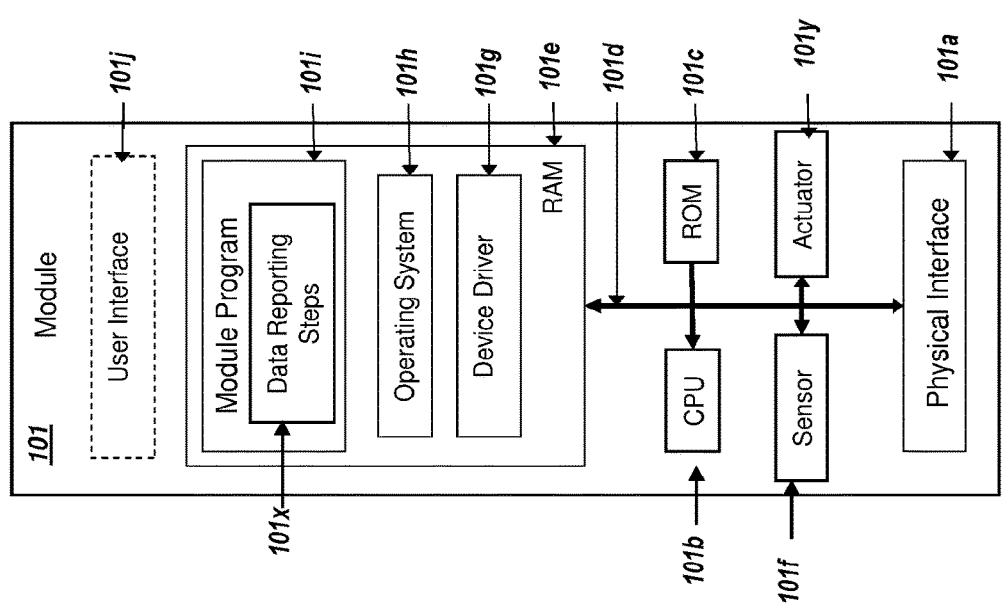
FIG. 1b is a graphical illustration of hardware, firmware, and software components for a module, in accordance with exemplary embodiments.

FIG. 1b is a graphical illustration of hardware, firmware, and software components for a module, in accordance with exemplary embodiments. FIG. 1b is illustrated to include many components that can be common within a module 101, and module 101 may also operate in a wireless configuration in order to connect with a wireless network 102. Module 101 may consist of multiple components in order to collect sensor data or control an actuator associated with a monitored unit 119. In a wireless configuration, the physical interface 101a of module 101 may support radio-frequency (RF) communications with networks including a wireless network 102 via standards such as GSM, UMTS, mobile WiMax, CDMA, LTE, LTE Advanced, and/or other mobile-network technologies. In a wireless configuration, the physical interface 101a may also provide connectivity to local networks such as 802.11 WLAN, Bluetooth, or Zigbee among other possibilities. In a wireless configuration, module 101 could use a physical interface 101a be connected with both a wireless WAN and wireless LAN simultaneously. In a wired configuration, the physical interface 101a can provide connectivity to a wired network such as through an Ethernet connection or USB connection.

The physical interface 101a can include associated hardware to provide the connections such as radio-frequency (RF) chipsets, a power amplifier, an antenna, cable connectors, etc., and additional exemplary details regarding these components are described below in FIG. 1e. Device driver 101g can communicate with the physical interfaces 101a, providing hardware access to higher-level functions on module 101. Device drivers 101g may also be embedded into hardware or combined with the physical interfaces. Module 101 may preferably include an operating system 101h to manage device drivers 101g and hardware resources within module 101. The operating systems described herein can also manage other resources such as memory and may support multiple software programs operating on module 101 or server 105, respectively, at the same time. The operating system 101h can include Internet protocol stacks such as a User Datagram Protocol (UDP) stack, Transmission Control Protocol (TCP) stack, a domain name system (DNS) stack, etc., and the operating system 101h may include timers and schedulers for managing the access of software to hardware resources. The operating system shown of 101h can be appropriate for a low-power device with limited memory and CPU resources (compared to a server 105). An example operating system 101h for module 101 includes Linux, Android® from Google®, Windows® Mobile, or Open AT® from Sierra Wireless®. Additional example operating systems 101h for module 101 include eCos, uC/OS, LiteOs, and Contiki, and other possibilities exist as well without departing from the scope of the present invention.

A module program 101i may be an application programmed in a language such as C, C++, Java, and/or Python, and could provide functionality to support M2M applications such as remote monitoring of sensors and remote activation of actuators. Module program 101i could also be a software routine, subroutine, linked library, or software module, according to one preferred embodiment. As contemplated herein, a module program 101i may be an application operating within a smartphone, such as an iPhone® or Android®-based smartphone, and in this case module 101 could comprise the smartphone. The application functioning as a module program 101i could be downloaded from an "app store" associated with the smartphone. Module program 101i can include data reporting steps 101x, which can provide the functionality or CPU 101b instructions for collecting sensor data, sending messages to server 105, and receiving responses from server 105, as described in the present invention.

Many of the logical steps for operation of module 101 can be performed in software and hardware by various combinations of sensor 101f, actuator 101y, physical interface 101a, device driver 101g, operating system 101h, module program 101i, and data reporting steps 101x. When module 101 is described herein as performing various actions such as acquiring an IP address, connecting to the wireless network, monitoring a port, transmitting a packet, sending a message, receiving a response, or encrypting or signing data, specifying herein that module 101 performs an action can refer to software, hardware, and/or firmware operating within module 101 illustrated in FIG. 1b performing the action. Note that module 101 may also optionally include user interface 101j which may include one or more devices for receiving inputs and/or one or more devices for conveying outputs. User interfaces are known in the art and generally are simple for modules such as a few LED lights or LCD display, and thus user interfaces are not described in detail here. User interface 101*j* could comprise a touch screen if module 101 operates as a smartphone or mobile phone. As illustrated in FIG. 1*b*, module 101 can optionally omit a user interface 101*j*, since no user input may be required for many M2M applications, although a user interface 101*j* could be included with module 101.

Module 101 may be a computing device that includes computer components for the purposes of collecting data from a sensor 101*f* or triggering an action by an actuator 101*y*. Module 101 may include a central processing unit (CPU) 101*b*, a random access memory (RAM) 101*e*, and a system bus 101*d* that couples various system components including the random access memory 101*e* to the processing unit 101*b*. The system bus 101*d* may be any of several types of bus structures including a memory bus or memory controller, a peripheral bus, and a local bus using any of a variety of bus architectures including a data bus. Note that the computer components illustrated for the module 101 in FIG. 1*b* may be selected in order to minimize power consumption and thereby maximize battery life, if module 101 includes a battery and is not attached to external power. In addition, the computer components illustrated for the module 101 in FIG. 1*b* may also be selected in order to optimize the system for both long periods of sleep relative to active communications and also may be optimized for predominantly uplink (i.e. device to network) communications with small packets or messages. The computer components illustrated for the module 101 in FIG. 1*b* may also be general-purpose computing components, and specialized components are not required in order to utilize many of the embodiments contemplated herein.

Module 101 may include a read-only memory (ROM) 101*c* which can contain a boot loader program. Although ROM 101*c* is illustrated as "read-only memory", ROM 101*c* could comprise long-term memory storage chipsets or physical units that are designed for writing once and reading many times. As contemplated within the present invention, a read-only address could comprise a ROM 101*c* memory address or another hardware address for read-only operations accessible via bus 101*d*. Changing data recorded in a ROM 101*c* can require a technician have physical access to module 101, such as removing a cover or part of an enclosure, where the technician can subsequently connect equipment to a circuit board in module 101, including replacing ROM 101*c*. ROM 101*c* could also comprise a nonvolatile memory, such that data is stored within ROM 101*c* even if no electrical power is provided to ROM 101*c*. Although not illustrated in FIG. 1*b*, but illustrated in FIG. 1*e* below, module 101 could also include a flash memory 101*w*. A primary difference between flash memory 101*w* and RAM 101*e* may be that reading and writing operations to flash memory 101*w* can be slower whereas reading and writing operations to RAM 101*e* may be faster, and faster reading and writing operations to memory may be required for processing sensor 101*f* signals and securely communicating with a server 105. For example, module program 101*i*, data reporting steps 101*x*, operating system 101*h*, or device driver 101*g* could be stored in flash memory 101*w* within module 101 when the module is powered off. These components and/or instructions could be moved from a flash memory 101*w* (not shown in FIG. 1*b* but shown in FIG. 1*e*) into RAM 101*e* when the module is powered on. In addition, portions of a RAM 101*e* can function as flash memory 101*w*, such that module program 101*i*, power control steps 101*x*, operating system 101*h*, or device driver 101*g* remain resident in random access memory even when the mobile module 101 is powered off, or powered off for the first time after module 101 is installed or becomes active in wireless network 102. Note that ROM 101*c* could be optionally omitted or included in a memory unit within CPU 101*b* (not shown).

Although the exemplary environment described herein employs ROM 101*c* and RAM 101*e*, it should be appreciated by those skilled in the art that other types of computer readable media which can store data that is accessible by a module 101, such as memory cards, subscriber identity module (SIM) cards, local miniaturized hard disks, and the like, may also be used in the exemplary operating environment without departing from the scope of the invention. The memory and associated hardware illustrated in FIG. 1*b* provide nonvolatile storage of computer-executable instructions, data structures, program modules, module program 101*i*, and other data for computer or module 101. Note the module 101 may include a physical data connection at the physical interface 101*a* such as a miniaturized universal serial bus adapter, firewire, optical, or other another port and the computer executable instructions such as module program 101*i*, data reporting steps 101*x*, operating system 101*h*, or device driver 101*g* can be initially loaded into memory such as ROM 101*c* or RAM 101*e* through the physical interface 101*a* before module 101 is given to an end user, shipped by a manufacturer to a distribution channel, or installed by a technician. In addition, the computer executable instructions such as module program 101*i*, data reporting steps 101*x*, operating system 101*h* or device driver 101*g* could be transferred wirelessly to module 101. In either case (wired or wireless transfer of computer executable instructions), the computer executable instructions such as module program 101*i*, data reporting steps 101*x*, operating system 101*h*, or device driver 101*g* could be stored remotely on a disk drive, solid state drive, or optical disk (external drives not shown).

A number of program modules may be stored in RAM 101*e*, ROM 101*c*, or possibly within CPU 101*b*, including an operating system 101*h*, device driver 101*g*, an http client (not shown), a DNS client, and related software. Program modules include routines, sub-routines, programs, objects, components, data structures, etc., which perform particular tasks or implement particular abstract data types. Aspects of the present invention may be implemented in the form of a module program 101*i* and/or data reporting steps 101*x* which are executed by the module 101 in order to provide remote monitoring using a sensor 101*f* and/or remote control using an actuator 101*y*. In addition, the module program 101*i* and/or data reporting steps 101*x* can include routines, sub-routines, and similar components to support secure and bandwidth and radio-frequency (RF) efficient communication with a server 105 utilizing the techniques described in the present invention. Further, the module program 101*i* and/or data reporting steps 101*x* can perform the various actions described in the present invention for the module 101 through instructions the module program 101*i* and/or data reporting steps 101*x* provide to the CPU 101*b*.

A user may enter commands and information into module 101 through an optional user interface 101*j*, such as a keypad, keyboard (possibly miniaturized for a mobile phone form-factor), and a pointing device. Pointing devices may include a trackball, an electronic pen, or a touch screen. A user interface 101*j* illustrated in FIG. 1*b* can also comprise the description of a user interface 101*j* within U.S. patent application Ser. No. 14/039,401, filed Sep. 27, 2013 in the name of John Nix, which is herein incorporated in its entirety.

The module 101, comprising a computer, may operate in a networked environment using logical connections to one or more remote computers, such as the server 105 illustrated in FIG. 1a. Server 105 can also function as a general purpose server to provide files, programs, disk storage, remote memory, and other resources to module 101 usually through a networked connection. Additional details regarding server 105 are provided in FIG. 1c below. Additional remote computers with which module 101 communicates may include another module 101 or mobile device, an M2M node within a capillary network, a personal computer, other servers, a client, a router, a network PC, a peer device, a base station 103, or other common network node. The server 105 or a remote computer typically includes many of the elements described above relative to the module 101, including a CPU, memory, and physical interfaces. It will be appreciated that the network connections shown throughout the present invention are exemplary and other means of establishing a wireless or wired communications link may be used between mobile devices, computers, servers, corresponding nodes, and similar computers.

The module program 101i and data reporting steps 101x operating within module 101 illustrated in FIG. 1b can provide computer executable instructions to hardware such as CPU 101b through a system bus 101d in order for a module 101 to (i) collect data from a sensor, (ii) change the state of an actuator 101y, and (iii) send or receive packets with a server 105, thus allowing server 105 to remotely monitor or control a monitored unit 119. The module program 101i and/or data reporting steps 101x can enable the module 101 to transmit or send data from sensor 101f or module 101 by recording data in memory such as RAM 101e, where the data can include sensor data, a destination IP:port number, a packet or packet header value, an encryption or ciphering algorithm and key, a digital signature algorithm and key, etc. The data recorded in RAM 101e can be subsequently read by the operating system 101h or the device driver 101g. The operating system 101h or the device driver 101g can write the data to a physical interface 101a using a system bus 101d in order to use a physical interface 101a to send data to a server 105 using the Internet 107. Alternatively, the module program 101i and/or data reporting steps 101x can write the data directly to the physical interface 101a using the system bus 101d.

The module program 101i and/or data reporting steps 101x, or operating system 101h can include steps to process the data recorded in memory such as encrypting data, selecting a destination address, or encoding sensor data acquired by (i) a sensor 101f or (ii) through a physical interface 101a such as a thermocouple, shock or vibration sensor, light sensor, or global positioning system (GPS) receiver, etc. The module 101 can use the physical interface 101a such as a radio to transmit or send the data from a sensor to a base station 103. For those skilled in the art, other steps are possible as well for a module program 101i or operating system 101h to collect data from a sensor 101f and send the data in a packet without departing from the scope of the present invention.

Conversely, in order for module 101 to receive a packet or response from server 105, the physical interface 101a can use a radio to receive data from a base station 103. The received data can include information from a server 105 and may comprise a datagram, a source IP:port number, a packet or header value, an instruction for module 101, an acknowledgement to a packet that module 101 sent, a digital signature, and/or encrypted data. The operating system 101h or device driver 101g can use a system bus 101d and CPU 101b to record the received data in memory such as RAM 101e, and the module program 101i or operating system 101h may access the memory in order to process the received data and determine the next step for the module 101 after receiving the data. Processing the received data could include deciphering or decrypting received data with a key, verifying a digital signature with a key, reading an instruction from a server 105, or similar transformations of the received data. The steps within this paragraph may also describe the steps a module program 101i or data reporting steps 101x can perform in order to receive a packet. For those skilled in the art, other steps are possible as well for a module program 101i, data reporting steps 101x, or module 101 to receive a packet or response from a server 105 without departing from the scope of the present invention.

Moreover, those skilled in the art will appreciate that the present invention may be implemented in other computer system configurations, including hand-held devices, netbooks, portable computers, multiprocessor systems, microprocessor based or programmable consumer electronics, network personal computers, minicomputers, mainframe computers, and the like. The invention may also be practiced in distributed computing environments, where tasks are performed by remote processing devices that are linked through a communications network. In a distributed computing environment, program modules may be located in both local and remote memory storage devices. In addition, the terms "mobile node", "mobile station", "mobile device", "M2M module", "M2M device", "networked sensor", or "industrial controller" can be used to refer to module 101 or its functional capabilities of (i) collecting sensor data regarding a monitored unit 119, (ii) changing state of an actuator 101y associated with monitored unit 119, and/or (iii) communicating the data associated with a monitored unit 119 with a wireless network 102. The function of module 101 and sensor 101f could be integrated, and in this case module 101 could also be referred to as a "sensor", "intelligent sensor", or "networked sensor". Further, the term "module" or "monitoring device" can be used to refer to the module program 101i when module program 101i provides functional capabilities such as reporting data from a sensor 101f to a server 105 or receiving instructions for an actuator 101y from a server 105. The device driver 101i, operating system 101i, and/or module program 101i could optionally be combined into an integrated system for providing the module 101 functionality. Other possibilities exist as well for the configuration or combination of components illustrated in FIG. 1b without departing from the scope of the present invention.

FIG. 1c

FIG. 1c is a graphical illustration of hardware, firmware, and software components for a server, in accordance with exemplary embodiments. The illustrated components for the server 105 in FIG. 1c include a central processing unit (CPU) 105b, a random access memory (RAM) 105e, a system bus 105d, storage 105m, an operating system 105h, and a module controller 105x. These elements can provide functions equivalent to the central processing unit (CPU) 101b, RAM 101e, system bus 101d, flash memory 101w, and an operating system 101h described above in FIG. 1b, respectively. In general, a server 105 can have higher-end components such as a larger CPU 105b and greater RAM 105e in order to support communications with a plurality of modules 101. Server 105 can comprise a general purpose computer such as a rack mounted server within a data center or rack, or could also comprise a desktop computer or laptop. Server 105 could also be a specialized computer, with hardware and software selected for supporting a plurality of modules 101 connecting and communicating simultaneously. Operating system 101*h* can comprise an operating system appropriate for a server such as Linux, Solaris®, or Windows® Server. Server 105 can preferably have a wired Ethernet connection with high bandwidth that is persistently connected to the Internet 107 illustrated in FIG. 1*a*, while the Internet 107 connection for module 101 may be transient as module 101 changes between sleep and active states. Module controller 105*x* can provide the server-side logic for managing communications and controlling module 101 using a module database 105*k*. Server program 105*i* can provide functionality for communicating with external servers or nodes, such as an application server 171 illustrated in FIG. 1*d*.

A module controller 101*x* and server program 105*i* may be applications programmed in a language such as C, C++, Java, or Python and could provide functionality to support M2M applications such as remote monitoring of sensors and remote activation of actuators. Module controller 105*x* and server program 105*i* could also be software routines, subroutines, linked libraries, or software modules, according to preferred embodiments. Many of the logical steps for operation of server 105, module controller 105*x*, and/or server program 105*i* can be performed in software and hardware by various combinations of physical interface 105*a*, system bus 105*d*, device driver 105*g*, and operating system 105*h*. When server 105 is described herein as performing various actions such as acquiring an IP address, monitoring a port, transmitting or sending a packet, receiving a message, or encrypting or signing a message, specifying herein that server 105 performs an action can refer to software, hardware, and/or firmware operating within server 105 performing the action.

The server 105 may also include a user interface 105*j* such as a display (not shown) which could also comprise any type of display devices such as a liquid crystal display (LCD), a plasma display, and an organic light-emitting diode (OLED) display, or a cathode ray tube (CRT). A user interface 105*j* for the server 105 may optionally be provided remotely such as (i) via a web browser or a secure terminal such as secure shell (SSH) with (ii) another computer operated by an administrator (not shown). A user or administrator may enter commands and information into server 105 through a user interface 105*j*, such as a keypad, keyboard, and a pointing device. Pointing devices may include a trackball, an electronic pen, or a touch screen. In addition, the server 105 may store computer executable instructions such as module controller 105*x* or server program 105*i* on storage 105*m*. Storage 105*m* may comprise a disk drive, a solid-state drive, an optical drive, or a disk array. Module controller 101*x* can manage communications with module 101 and may be downloaded and installed on the server 105. As noted previously and elsewhere herein, module program 101*i* and module controller 105*x* can preferably interoperate with each other in order to collect sensor data and control an actuator associated with a monitored unit 119.

The server program 105*i* and/or module controller 101*x* operating within server 105 illustrated in FIG. 1*c* can provide computer executable instructions to hardware such as CPU 105*b* through a system bus 105*d* in order to (i) receive a message from the module 101 and (ii) send a response, wherein the message can include sensor 101*f* data and the response can include an acknowledgement of the message and/or an instruction to the module 101. The module controller 105*x* can enable the server 105 to send a response to a message from module 101 by recording data associated with module 101 in memory such as RAM 105*e*, where the data can include an instruction from module 101, a destination IP:port number, a packet or packet header value, and the data can be processed using an encryption or ciphering algorithm or key, a digital signature algorithm or key, etc.

The server program 105*i* can enable (a) the server 105 to send a datagram, packet, or an application message to an application server 171 by (b) recording data associated (i) a with module 101 or (ii) other M2M service control information in memory such as RAM 105*e*, where the data can include information from module 101, a destination IP:port number, a packet or packet header value, and the information could be processed using an encryption or ciphering algorithm or key, a digital signature algorithm or key, etc. The operating system 105*h* or the device driver 105*g* can write the data from RAM 105*e* to a physical interface 105*a* using a system bus 105*d* and an Ethernet connection in order to send the data via the Internet 107 illustrated in FIG. 1*a*. Alternatively, the software program 105*i* and/or module controller 105*x* can write the data directly to the physical interface 105*a* using the system bus 105*d*.

The server 105 can utilize the physical interface 105*a* to receive data from a module 101 and/or application 171*i* using a local area network such as Ethernet, although the physical interface 105*a* of server 105 could also utilize a wireless connection. The server 105 can listen for data from the Internet 107 using port number and/or a TCP/UDP socket. The received data from a module 101 can be a message formatted according to an Internet packet or datagram or series of datagrams inside Ethernet packets and include information from a module 101 such as a source IP address and port number, an identity of the module, sensor data that may be encrypted, and/or a digital signature of the module. The received data from application 171*i* can comprise a series of datagrams formatted according to Internet Protocol and/or datagrams inside Ethernet packets. The received data or message from application 171*i* can include information regarding application 171*i* and/or server 105, such as a source IP address and port number associated with application 171*i* or application server 171, an identity of the server, actuator instructions or commands for a module 101 that may be encrypted, and a digital signature associated with the application 171*i*.

When server 105 receives messages or data, the operating system 105*h* or device driver 105*g* can record the received data from module 101 or application 171*i* via physical interface 105*a* into memory such as RAM 105*e*. The server program 105*i* or operating system 105*h* may subsequently access the memory in order to process the data received. The server program 105*i* and/or module controller 105*x*, or operating system 105*h* can include steps to process the data recorded in memory and received from the module 101 or application 171*i*, such as parsing the received packet, decrypting data, verifying a digital signature with a key, or decoding sensor data included in a message from the module.

The server 105 and/or server program 105*i* may communicate with application 171*i* by sending and receiving packets over a LAN or the Internet 107, using a physical interface 105*a* and a wired connection such as Ethernet or possibly a wireless connection as well. The server 105 can use the physical interface 105*a* such as an Ethernet connection to send and receive the data from the Internet 107. For those skilled in the art, other steps are possible as well for a server program 105*i* or operating system 105*h* within a server 105 to (i) send/receive a packet or message to/from a module 101 and (ii) send/receive a packet or message to/from an application 171*i* without departing from the scope of the present invention. Server program 105*i* and module controller 105*x* may optionally be combined within a server 105, or alternatively distributed across different physical computers and function in a coordinated manner using a network.

The device drivers 105*g*, operating systems 105*h*, and/or module controller 105*x* could also optionally be combined into an integrated system for providing the server 105 functionality. Although a single physical interface 105*a*, device-driver set 105*g*, operating system 105*h*, module controller 105*x*, server program 105*i*, and user interface 105*j* are illustrated in FIG. 1*c* for server 105, server 105 may contain multiple physical interfaces, device drivers, operating systems, software programs, module programs, and/or user interfaces. Server 105 may operate in a distributed environment, such that multiple computers operate in conjunction through a network to provide the functionality of server 105. Also, server 105 may operate in a "virtualized" environment, where server 105 shares physical resources such as a physical CPU 105*b* with other processes operating on the same computer. And other arrangements could be used as well, without departing from the invention.
FIG. 1*d*

FIG. 1*d* is a graphical illustration of hardware, firmware, and software components for an application server, in accordance with exemplary embodiments. Application server 171 can include application 171*i*. Application 171*i* can comprise a computer program or collection of computer programs, for managing a plurality of modules 101 using one or more servers 105. Application 171*i* can include a web portal 171*j*, service controller 171*x*, an application database 171*k*, and cryptographic algorithms 141. During operation, such as when application 171*i* processes data from/to modules 101 through server 105, application 171*i* may reside in RAM 171*e* within an application server 171. Application 171*i* and the associated computer programs may be recorded in storage 171*m* so that they may be loaded by operating system 171*h* upon the startup of application server 171. Web portal 171*j* can comprise a web server such as Apache and can provide a user interface for a remote user accessing application 171*i* via an Internet 107. The web portal 171*j* could include web pages for viewing reports from modules 101 and/or servers 105, and also inputting settings for modules 101 by a user. The web pages could include PHP, active server pages, or Java components, in addition to other elements. Data input and stored by application 171*i* can be recorded in application database 171*k*. The data could be inserted or queried using structured query language (SQL) statements. Cryptographic algorithms 141 which may comprise a suite of algorithms or subroutines that can be utilized for (i) deriving a pair of keys comprising a public key and a private key, (ii) encrypting data using public keys, (iii) decrypting data using private keys, (iv) processing secure hash signatures using private keys, and (v) verifying secure hash signatures using public keys, and related software, firmware, or subroutines for implementing a cryptographic system, and cryptographic algorithms 141 are also depicted and described in connection with FIG. 1*g* below.

Application 171*i* may be processed by an application server 171 using a CPU 171*b*. The illustrated components for the application server 171 in FIG. 1*d* include a central processing unit (CPU) 171*b*, a random access memory (RAM) 171*e*, a system bus 171*d*, storage 171*m*, an operating system 171*h*, and an application 171*i*. These elements can provide functions equivalent to the central processing unit (CPU) 105*b*, RAM 105*e*, system bus 105*d*, storage 105*m*, and an operating system 105*h* described above in FIG. 1*c*, respectively. Application server 171 can comprise a general purpose computer such as a rack mounted server within a data center or rack, or could also comprise a desktop computer or laptop. Application server 171 could also be a specialized computer, with hardware and software selected for supporting a plurality of servers 105 or modules 101 connecting and communicating simultaneously. Operating system 171*h* can comprise an operating system appropriate for a server such as Linux, Solaris®, or Windows® Server. Application server 171 can preferably have a wired Ethernet connection with high bandwidth that is persistently connected to the Internet 107.

An application 171*i* and/or service controller 171*x* may be an application programmed in a language such as C, C++, Java, or Python and could provide functionality to support M2M applications such as remote monitoring of sensors and remote activation of actuators. Application 171*i* can include a service controller 171*x*. Application 171*i* and/or service controller 171*x* could also be a software routine, subroutine, linked library, or software module, according to one preferred embodiment. Application 171*i* can include a service controller 171*x*, which can provide the functionality or CPU 171*b* instructions for the service controller 171*x* described in the present invention. Service controller 171*x* can include (i) logic for processing alarms from a module 101 (such as sending out and email or text message to a user), (ii) logic for adjusting actuator 101*y* settings based upon data from sensor 101*f*, (iii) accepting user input (possibly via web portal 171*j*) and then making an associated change in an actuator 101*y* setting. Service controller 171*x* can also accept input from external applications (not shown) in order to make decisions regarding module 101, sensor 101*f*, and/or actuator 101*y*.

Service controller 171*x* could be included within an enterprise resource planning (ERP) solution such as SAP® or Oracle® ERP. An external application (not shown) can communicate with the application server 171. As one example, a group of modules 101 could be installed within a manufacturing plant, and when a customer order was entered into the external application such as ERP, the service controller 171*x* could provide instructions for a group of modules 101 to server 105, such as changing actuators 101*y* to operate a production line. Other possibilities for service controller 171*x* exist as well without departing from the scope of the present invention. In general, service controller 171*x* can manage the overall function of a group of modules 101 through server 105. Service controller 171*x* may operate at the "user layer" and/or "application layer" of the traditional OSI model.

Many of the logical steps for operation of application server 171 or application 171*i* can be performed in software by various combinations of physical interface 171*a*, device driver 171*g*, operating system 171*h*, and module controller 105*i*, where application 171*i* communicates with module controller 105*i* over a network. Application 171*i* and module controller 105*i* can communicate using an application message 701 (illustrated in FIG. 7 below). When application 171*i* is described herein as performing various actions such as acquiring an IP address, monitoring a port, transmitting or sending a packet or message, or encrypting or signing a message, receiving a packet or message, specifying herein that application 171*i* and/or application server 171 performs an action can refer to software, hardware, and/or firmware operating within application server 171 performing the action. Application server 171 or application 171*i* can send or transmit a message, packet, or data using the steps depicted and described in connection with FIG. 1*c* for a server 105 to send or transmit a message, packet, or data. Application server 171 or application 171*i* can receive a message, packet, or data using the steps depicted and described in connection with FIG. 1*c* for a server 105 to receive a message, packet, or data. Application server 171 can utilize hardware components similar to server 105, such as storage 171*m* can be similar to storage 105*m*, CPU 171*b* can be similar to CPU 105*b*, and physical interface 171*a* can be similar to physical interface 105*a*. Application server 171 can use a system bus 171*d* to connect the hardware components shown within application server 171, and system bus 171*d* can be similar to system bus 105*d* depicted and described in connection with FIG. 1*c* above.

Application server 171 may also comprise a collection of individual computers, where the individual computers could be either centrally located or geographically dispersed, but the individual computers may function in a coordinated manner over a network to operate as an application server 171. In a similar manner, application 171*i* may be distributed across a plurality of computers, such as in a cloud computing configuration. Application server 171 may be a "virtualized" server, with computing resources shared with other processes operating on a computer.

FIG. 1*e*

FIG. 1*e* is a graphical illustration of the components within a module, in accordance with exemplary embodiments. FIG. 1*e* is illustrated to show a combination of components useful for leveraging the efficient and secure communication techniques described in the present invention. In addition to the components illustrated in FIG. 1*b* above, module 101 can include a battery 101*k*, a server public key 114, a wireless module private key 112, a connection to an actuator 101*y*, a USB interface 101*v*, a CPU wake controller 101*u*, a flash memory 101*w*, a symmetric key 127, a pre-shared secret key 129*a*, a random number generator 128, cryptographic algorithms 141, a radio 101*z*, and other components illustrated in FIG. 1*e*. Not all of the components illustrated in FIG. 1*e* are required for many exemplary embodiments, and some of the components illustrated in FIG. 1*e* may also be optionally omitted in exemplary embodiments.

The CPU 101*b* can comprise a general purpose processor appropriate for the low power consumption requirements of a module 101, and may also function as a microcontroller. In a preferred exemplary embodiment, the CPU 101*b* is responsible for maintaining a state machine for network and transport layer commands with an external network such as the wireless network 102 illustrated in FIG. 1*a*, where CPU 101*b* can manage the overall connection of radio 101*z* with a wireless network 102. CPU 101*b* can include additional elements not shown, such as registers, cache memory, an arithmetic logic unit (ALU), which performs arithmetic and logical operations, and a control unit (CU), which extracts instructions from memory and decodes and executes them, calling on the ALU when necessary.

The CPU 101*b* wake and dormant or sleep states may be controlled by a CPU wake controller 101*u* to put the module 101 in a dormant state in order to conserve (i) battery life in battery 101*k*, or (ii) power consumption if land-line power is available, when sensor measurements, actuator control, or radio communications are not needed. The CPU wake controller 101*u* could optionally be integrated into CPU 101*b*. The CPU wake controller 101*u* can also include a timer to periodically wake the CPU 101*b* in order to perform sensor measurements or communicate with a wireless network 102 or server 105. The flash memory 101*w* can be a non-volatile memory and may contain a bootloader program 125 and a module program 101*i*. Bootloader program 125 can comprise a software program or application that is initially read by CPU 101*b* upon power up of module 101 in order to configure interfaces and begin operations including loading module program 101*i*. Module program 101*i* is depicted and described in connection with FIG. 1*b* above. If module 101 operates as a payment card, then CPU wake controller 101*u* could wake CPU 101*b* when a radio 101*z* detects an RF signal from a payment terminal.

Note that CPU wake controller 101*u* can monitor sensor 101*f* in order to determine a wake condition for CPU 101*b*, wherein the CPU 101*b* remains dormant until sensor 101*f* reads a state that requires sending a message to a server 105. An example could be sensor 101*f* comprising a shock and vibration detector or a temperature measuring device such as a thermocouple, and other examples exist as well. The CPU wake controller 101*u* can leave CPU 101*b* in a dormant state until a certain threshold of shock and vibration or temperature is recorded by the sensor 101*f*, and in this manner battery 101*k* can be conserved so that CPU 101*b* wakes when a threshold sensor measurement or an alarm condition is reported. The exemplary certain threshold of shock and vibration or temperature recorded by the sensor 101*f* can also comprise an alarm condition. When CPU 101*b* is dormant, CPU wake controller 101*u* can monitor a voltage level output by sensor 101*f*, and once a threshold voltage level is read by CPU wake controller 101*u*, CPU wake controller 101*u* can change CPU 101*b* from the dormant state to an active state in order to run a module program 101*i*.

Even without an alarm condition, CPU wake controller 101*u* can periodically wake CPU 101*b* to collect sensor data, connect to an external network such as a wireless network 102, and send sensor data to server 105. CPU 101*b* can include one or more cores of the processor, where each core is an independent actual central processing unit, and the cores can be the units that read and execute program instructions. The instructions can be ordinary CPU instructions such as add, move data, and branch. The dormant state of CPU 101*b* can comprise a sleep state where a power level used by a core in the processor is less than 0.010 milliwatts during a one second measurement sample, such as when the power supply is essentially removed from the core but power is supplied to memory 101*e* in order to allow a rapid waking of the CPU 101*b* or core.

Sensor 101*f* could be a device to collect environmental data or data regarding a monitored unit 119. Sensor 101*f* could collect data such as temperature, humidity, pressure, visible light levels, radiation, shock and/or vibration, voltage, current, weight, pH levels, orientation/motion, or the presence of specific chemicals. Sensor 101*f* could also be a microphone. Sensor 101*f* could be a magnetic strip reader for credit cards and similar cards, or an antenna for either near-field RF communications, such as reading an RF identity tag. An antenna for a sensor 101*f* could also collect longer-range RF signals, such as reading long-range radio frequency identity tags. Sensor 101*f* could also collect biometric data such as heart rate, glucose levels, body temperature, or other health measurements and in this case monitored unit 119 could be a person. The sensor 101*f* can provide data to the CPU 101*b* in the form of analog or digital data, which can be communicated via a system bus 101*d* or physical interface 101*a* and other electrical interfaces are possible as well. A sensor measurement can comprise the analog or digital data collected by CPU 101b from sensor 101f. A sensor measurement can include processing of the analog or digital data input CPU 101b by sensor 101f, such as averaging over time, using mathematic formulas to convert the raw data from sensor 101f into a usable form. Module 101 may also collect sensor data or sensor values using a sensor 101f and CPU 101b, where the data or values are derived from electrical signals output by a sensor 101f. A sensor measurement can comprise the sensor data or sensor values. If module 101 comprises a "point of presence" payment terminal, then a sensor measurement could comprise data read from a payment card.

As contemplated herein, the terms "sensor measurement" and "sensor data" can be used interchangeably, and can also be considered functionally equivalent. Although a single sensor 101f is shown in FIG. 1e, a module 101 could include multiple sensors. Each of the multiple sensors 101f could include a sensor identity 151, which could comprise a number or string to identify the sensor 101f. Or, a sensor identity 151 could also be used with a single sensor 101f. In addition, although sensor 101f is shown as integrated into module 101, sensor 101f could be external to module 101, and connected via an external interface such as through a USB interface 101v or other wired or wireless configuration.

Note that sensor 101f could also connect to module 101 via a WiFi or similar wireless LAN connection such as Zigbee. Radio 101z within module 101 can operate as a WiFi base station (in addition to radio 101z connecting to a wireless network 102), and sensor 101f could contain its own radio and WiFi chipset, such that sensor 101f could send sensor data to module 101 via the WiFi connection (or other wireless LAN connection). In this manner, by utilizing WiFi to connect with sensor 101f, module 101 could connect with a plurality of sensors 101f located in a vicinity of module 101, such as within an exemplary 50 meters. In addition to the WiFi network described, sensor 101f and/or actuator 101y could connect with module 101 via any suitable wireless local area networking technology including, IEEE 802.11, IEEE 802.15.4, an ISA100.11a standards-based network, Bluetooth, and/or a 6LoWPAN.

Actuator 101y could be a device to control a parameter or state for a monitored unit 119, such as changing a voltage or current, activating a switch or relay, turning on or off a microphone or speaker, activating or deactivating a light, and other examples are well known in the art. Actuator 101y could also be a speaker. Actuator 101y could be controlled by module 101 via a digital or analog output from CPU 101b, which could also be transmitted or sent via system bus 101d or a physical interface 101a. Although actuator 101y is illustrated as external to wireless module 101 in FIG. 1e, actuator 101y could also be internal to module 101, and module 101 could include multiple actuators 101y.

Although a single actuator 101y is shown in FIG. 1e, a module 101 could include multiple actuators 101y. Each of the multiple actuators 101y could include an actuator identity 152, which could comprise a number or string to identify the actuator 101y. Or, an actuator identity 152 could also be used with a single actuator 101y. If module 101 comprises a "point of presence" payment terminal, then an actuator 101y could be a printer for printing a receipt. If module 101 comprises a payment card for end users to make payments to merchants, then actuator 101y could be an LED light that turns on upon submission of a payment. Sensors and actuators are well known to those of ordinary skill in the art, and thus are not described in additional detail herein.

Module 101 can include a Universal Serial Bus (USB) interface 101v, which could provide a general and standards-based interface for external connection to a wide variety of sensors 101f, actuators 101y, and external computers such as laptops or mobile phones. Module 101 could also obtain power or recharge a battery 101k through the USB interface 101v. Software programs or instructions to wireless module 101 could be provided locally through USB interface 101v, including the initial loading of a pre-shared secret key 129a and/or shared secret key 510 described in FIG. 5b below. Module program 101i, operating system 101h, or module private key 112 could be loaded into module 101 via USB interface 101v, another physical interface 101a, or radio 101z. In order to support a preferred small form factor of a module 101, the USB interface 101v could preferably utilize either a micro-USB or mini-USB physical interface, or future similar miniature USB interfaces related to these standard interfaces. Although a USB interface 101v is illustrated in FIG. 1e, alternative interfaces for external communication could be provided, such as a Joint Test Action Group (JTAG) connection, optical, or a proprietary interface such as a "Lightning" connection from Apple, Inc. USB interface 101v and similar hardware interfaces could also be optionally omitted. According to an exemplary embodiment, module 101 uses only a radio 101z to transmit and receive data externally to module 101.

In accordance with an exemplary embodiment, module 101 can comprise a wireless module and include a radio 101z. Note that the use of a radio 101z is not required for module 101, which could also obtain a connection to the Internet 107 via a wired line such as Ethernet. Although not illustrated, radio 101z could include antennas for reception and transmission of RF signals, and even multiple antennas could be used. Although a single radio 101z is illustrated in module 101, module 101 could also contain multiple radios 101z, such that a first radio 101z connects with a WiFi network or functions as a WiFi base station or WiFi client, a second radio 101z connects with a PLMN mobile network such as a wireless network 102, and a third radio 101z connects with a wireless network 102 operating in white-space spectrum, etc. Or, a single radio 101z could be utilized to connect with multiple wireless networks 102 operating in different frequencies with different RF modulation techniques and/or different RF standards.

Radio 101z could also comprise a software defined radio, such that radio 101z could be programmed to change RF protocols and modulation schemes without having to change hardware within a radio 101z. Thus, according to a preferred exemplary embodiment, module 101 can utilize a software defined radio for radio 101z in order allow module 101 to communicate with different wireless networks 102, including new or future standards for a wireless network 102, where the standard was not defined when module 101 was installed. In this manner, module 101 can continue to operate over an extended period such as years by upgrading the software defined radio in a radio 101z as standards used by a wireless network 102 changes, thereby reducing costs for changing a module 101 or a radio 101z within a module in a system 100.

Radio 101z can support wireless LAN standards such as WiFi, Bluetooth, and Zigbee, or similar wireless LAN standards. Radio 101z, if present in a module 101, could also support communication through "white space" spectrum white space spectrum recently approved for use by the Federal Communications Commission (FCC), and in this case radio 101z in module 101 could operate as a Mode I or Mode II device according to FCC Memorandum Opinion and Order (FC-12-36) and related white space regulation documents. Radio 101z illustrated in FIG. 1e can comprise a radio 101z depicted and described in connection with FIG. 1d of U.S. patent application Ser. No. 14/039,401, filed Sep. 27, 2013 in the name of John Nix, the contents of which are herein incorporated in their entirety.

Note that module 101 may also operate as a base station in a wireless LAN, such as an 802.11 base station. When module 101 operates a wireless LAN, radio 101z can function as either a client/node or a base station 103 to support communication from other wireless nodes in physical proximity, such as other nodes within an exemplary 50 meters. The other wireless nodes could comprise a sensor 101f and/or actuator 101y, and in this case a sensor could be referred to as a "networked sensor" and an actuator could be referred to as a "networked actuator". When radio 101z functions as a base station 103, module 101 can operate as a gateway, providing Internet access to these other nodes or modules 101 within the wireless LAN. Radio 101z can simultaneously function (i) as a base station in a wireless LAN, such as WiFi, and (ii) a client/subscriber on a wireless WAN such as a PLMN. Radio 101z can be selected to support multiple different wireless LAN technologies in addition to WiFi, such as the IEEE 802.15.4 standard or Bluetooth. If radio 101z supports IEEE 802.15.4, then wireless network 102 could be a Zigbee network, an ISA100.11a standards-based network, or a 6LoWPAN network as described by IETF RFC 4944.

In accordance with exemplary embodiments, module 101 can store module private key 112, server public key 114, and module identity 110, and a symmetric key 127 in memory/RAM 101e during operation, such as when CPU 101b is active and the module 101 is connected to a network such as a wireless network 102 during data transmissions. Module private key 112 preferably is recorded in nonvolatile memory such as flash memory 101w, so that module 101 has access to its private key 112 after the private key has been derived or loaded, including times when a battery 101k has been fully drained or removed from module 101 (if module 101 does not utilize a persistent power source such as land-line power). Module private key 112 and module identity 110 could be written into ROM 101c upon manufacture or distribution of module 101, although module 101 can also derive module private key 112 in accordance with exemplary embodiments and store the module private key 112 in a flash memory 101w.

The CPU 101b preferably moves module private key 112 and module identity 110 from nonvolatile memory into volatile memory, including possibly a cache memory within CPU 101b, before sending data through an Internet 107 illustrated in FIG. 1a, in order to speed computations. As a minimum, module private key 112 and module identity 110 will need to be loaded into registers of CPU 101b during computations or use of cryptographic algorithms 141 that require module private key 112 and/or module identity 110, and this move of the data into registers of CPU 101b constitutes a move or copy of module private key 112 and module identity 110 into volatile memory.

Symmetric key 127 can be a secure, shared private key for use with symmetric encryption or symmetric ciphering algorithms 141b (in FIG. 1g below). Symmetric key 127 can be derived by using module public key 111 and/or server public key 114, possibly through the use of a key derivation function 141f (also in FIG. 1g below). Symmetric key 127 can be used for both encryption and decryption with symmetric cryptographic algorithms 141b described in FIG. 1g below, where a shared secret key can be used to both encrypt/cipher and decrypt/decipher. Symmetric key 127 may also include an expiration time 133, such that symmetric key 127 may only be used by module 101 during a limited period of time, such symmetric key 127 remaining only valid for a day, or a week, or during a session (where the session comprises multiple messages and/or responses between a module 101 and a server 105), etc. Module 101 can also derive symmetric key 127 according the Elliptic Curve Integrated Encryption Scheme (ECIES) and/or ECDH 159, discussed in FIG. 1g below, using module public key 111, server public key 114, and a random number from random number generator 128. ECIES could be included in cryptographic algorithms 141. A summary of ECIES shared key derivation is described the Wikipedia article "Integrated Encryption Scheme" from Sep. 18, 2013 (herein incorporated by reference). Other possibilities for shared key derivation function using public keys are possible as well, including a Diffie-Hellman key exchange. Using a derived symmetric key from the exemplary key derivation function ECIES, module 101 could derive a second symmetric key 127 after the expiration time 133 of the first symmetric key 127 had transpired.

Note that a key derivation function using public keys is not required to generate a shared symmetric key 127, and alternatively a shared symmetric key 127 could be generated by any of module 101, server 105, module provider 109, or M2M service provider 108. If module 101 generates shared symmetric key 127 for symmetric ciphering 141b within a cryptographic algorithms 141, then module 101 can send shared symmetric key 127 to server 105 using an asymmetric ciphering depicted and described in connection with FIG. 4 below. In this case, module 101 preferably uses a random number generator 128 to generate a random number 128a (illustrated in FIG. 1g) for input into cryptographic algorithms 141, and the seed 129 in random number generator 128 could utilize data from a sensor 101f in order to generate a random number 128a with high entropy in the creation of symmetric key 127. In exemplary embodiments, random number 128a can also comprise a string output of random number generator 128, and thus random number 128a may be recorded in a format other than a number. Thus, the output of a random number generator 128 can comprise a string in addition to numbers, or the output of random number generator 128 could be a binary number or a series of binary numbers that could be encoded into a string. If server 105 or M2M service provider 108 generates the symmetric key 127, server 105 can send module 101 the symmetric key 127 securely using asymmetric ciphering 141a depicted and described in connection with FIG. 5a and FIG. 1g below.

Module identity 110 is preferably a unique identifier of module 101, and could comprise a number or string such as a serial number, an international mobile subscriber identity number (IMSI), international mobile equipment identity (IMEI), or an Ethernet media access control (MAC) address. According to an exemplary embodiment, module identity 110 can also comprise a serial number or string that is written into hardware of module 101 upon manufacturing or distribution of module 101. In this case, module identity 110 could be recorded in a read only memory 101c, where read only memory 101c could not be easily erased or otherwise tampered with. Or, module 101 could read module identity 110, which could be written into hardware by a manufacturer, distributor, or module provider 109, by using a device driver 101g that reads a hardware address containing the module identity 110 using the bus 101d. Module 101 can read the module identity 110 by accessing a read-only address using the bus 101d. In either case, module identity 110 may preferably be permanently or persistently associated with the physical hardware of module 101, which can be helpful for the security procedures contemplated herein. Module identity 110 can function as a basic identifier for services from M2M service provider 108, server 105, and/or application 171*i* in order to properly identify module 101 among a plurality of modules. Module private key 112 and module public key 111 could be unique to module 101 and uniquely associated with module identity 110, according to a preferred embodiment.

As contemplated herein, a module identity 110 can also have more than one use. A first module identity 110 could comprise a serial number for the physical hardware of module 101, as described in the paragraph above. A second module identity 110 could also comprise a session identifier, for data sessions between module 101 and server 105, where the session identifier can be uniquely associated by a server 105 to module 101. In the case where module identity 110 has more than one use, format, or representation, the module identity 110 associated with or written into hardware of module 101 (and potentially read from a read-only address in module 101) would preferably comprise the module identity 110 used in a certificate 122. Since a module 101 may utilize multiple module public keys 111 and module private keys 112 over its lifetime, a certificate 122 for module 101 can preferably include both (i) the module identity 110 (such as a serial number for the physical hardware of module 101) and (ii) a module public key identity 111*a* in order to specify the particular module public key 111 associated with certificate 122. The use of a module public key identity 111*a* in a certificate 122 is also described in FIG. 1*h* below. Since a module 101 may also have multiple public keys 111 for different purposes (such as one for creating digital signatures, another for asymmetric ciphering, another for use with a second wireless network 102, etc.), then module 101 may also potentially have multiple valid certificates 122 concurrently.

Further, as contemplated herein, a module identity 110 could also comprise more than one physical string or number, such as a first string when module 101 connects with a first M2M service provider 108 or first wireless network 102, and module identity 110 could comprise a second string when module 101 connects with a second M2M service provider 108 or second wireless network 102. The first M2M service provider 108 or first wireless network 102 may have a first requirement or specification for the format, length, structure, etc. of module identity 110, and the second M2M service provider 108 or second wireless network 102 may have a second requirement or specification for the format, length, structure, etc. of module identity 110.

Server public key 114 in module 101 could be obtained from downloading the key over the Internet 107, or optionally also written into nonvolatile memory of module 101 upon manufacture or distribution. Server public key 114 could be obtained using a domain name or Internet address that is recorded in nonvolatile memory upon the configuration of module 101, such as during installation or distribution, and module 101 could fetch the server public key 114 upon connecting to a wireless network 102 or other connection to the Internet 107. Server public key 114 can be the public key associated with server 105 or M2M service provider 108. Although a single server public key 114 is illustrated in FIG. 1*e*, module 101 could record a plurality of server public keys 114, where each server public key 114 is associated with a different server 105. Server public key 114 can optionally be signed by a certificate authority 118 in FIG. 1*a*, such that when module 101 communicates with server 105, module 101 can verify a signature 123 (shown in FIG. 1*h*) within a certificate 122 associated with server 105. Successful verification of the signature 123 can provide a high level of certainty that server 105 is properly identified and belongs to M2M service provider 108, as opposed to being an imposter or part of a "man in the middle" attack.

Module 101 may also contain cryptographic algorithms 141, which may comprise a suite of algorithms or subroutines that can be utilized for (i) deriving a pair of keys comprising a public key and a private key, (ii) encrypting data using public keys, (iii) decrypting data using private keys, (iv) processing secure hash signatures using private keys, and (v) verifying secure hash signatures using public keys, and related software, firmware, or subroutines for implementing a cryptographic system, including symmetric ciphering algorithms. Cryptographic algorithms 141 (also described below in FIG. 1*g*) could utilize publicly available software libraries within tools such as OpenSSL maintained by The OpenSSL Project (http://www.openssl.org/), libgecrypt maintained by The Free Software Foundation (http://www.gnu.org/software/libgecrypt/), and similar libraries such as libmcrypt and Crypto++. Note that cryptographic algorithms 141 could also use proprietary cryptographic libraries as well. In addition to implementing asymmetric encryption/ciphering, such as used with RSA and ECC cryptography, cryptographic algorithms 141 can provide symmetric ciphering where a shared private key is utilized to both encrypt and decrypt, such as with the Advanced Encryption Standard (AES) cipher suite.

As illustrated in FIG. 1*e*, module 101 may also contain a random number generator 128. Random number generator 128 may contain a seed 129. The creation of random numbers with a high degree of entropy may be important the use of cryptographic algorithms 141. However, obtaining random numbers with high entropy in module 101 with limited processing resources may be a challenge using conventional technology. Since much of the operation of module 101 requires a CPU 101*b* following a pre-determined series of steps, such as the programmatic steps in an operating system 101*h*, module program 101*i*, etc., the random number generator seed 129 should preferably be populated with data that is close to random "noise" and not subject to replay. According to a preferred exemplary embodiment, module 101 utilizes data input from sensor 101*f* and/or radio 101*z* into a seed 129 within a random number generator 128. As one example, the sensor data input into seed 129 could comprise the least significant digits of a sensor measurement or series of sensor measurements, where the least significant digits would otherwise be effectively considered "noise".

In this exemplary embodiment of using a sensor to collect a "noisy" signal for input into a random number generator 128 or seed 129, if sensor 101*f* comprised a temperature measuring device such as a thermocouple or thermistor with a stated accuracy of 0.1 degrees, module 101 could take a series of measurements with 0.0001 degree resolution and utilize the last two digits appended from a series of measurements for input into a seed 129 in order to generate a random number 128*a*. Random number generator 128 could also utilize data input from the other components illustrated in FIG. 1*e* in order to generate a random number 128*a*, where the data input from the other components comprise a signal with a high level of "noise" or high entropy. The seed 129 could comprise multiple seeds 129 or also a random number generator 128 could derive a random number 128*a* using input from other components illustrated in FIG. 1*e* and without using a seed 129.

Other possibilities exist as well, such as if sensor 101*f* was a camera, module 101 could take a series of pictures and process the image to input data from the image into a seed 129. Likewise, module 101 could utilize numerous radio-frequency (RF) measurements from radio 101z in order to populate seed 129, including "noise" measurements on unused frequencies, or other data received by a radio 101z, including apparently random RF data. Although not illustrated in FIG. 1e, module 101 preferably includes a timing source such as a clock, and the clock could also be utilized to input data into a seed 129. Data from radio 101z, a clock (not shown), and/or sensor 101f, and/or radio 101z could be combined in order to input data into a seed 129. Additional input into the seed 129 could include measurements or states within memory 101e and 101w, operating system 101h states and files, and reading data from hardware through a bus 101d. A state can comprise a list or set of constants, variables, values, and/or data at a point in time or over an interval of time.

A plurality of the data as a source for a random number seed 129 could be appended together into a "module random seed file" 139 (illustrated in FIG. 1g) with a combined series or list of states (i.e. a plurality of sensor 101f measurements, radio 101z measurements, clock times, memory 101e or memory 101w states, operating system 101h states, actuator 101y states, and/or hardware 101a or 101d states). Note that values or data for each of the elements listed in the previous sentence could be utilized in a "module random seed file" 139 instead of or in addition to a state. The "module random seed file" 139 can then be input into the secure hash algorithm 141c described in FIG. 1g below, and the output of the secure hash algorithm 141c could then be used in the input as a seed 129 within random number generator 128. Also, this combined data (including in the form of a "module random seed file" 139) could be utilized by random number generator 128 directly in order to process a random number 128a. Other possibilities exist as well without departing from the scope of the present invention.

Note that the term "public key" as contemplated herein includes a key that may be shared with other elements, where the other elements may not be under the direct control of the same entity that holds the corresponding private key. However, the term "public key" as used herein does not require that the public key is made available to the general public or is publicly disclosed. An additional layer of security may be maintained in the present invention by preferably only sharing public keys on a confidential basis with other entities. For example, module public key 111 may be created by module 101 when generating module private key 112, and module 101 may share module public key 111 with M2M service provider 108 in order to record module public key 111 in server 105, but module 101 could choose to not share module public key 111 with other entities, such as wireless network 102 or make a certificate 122 with module public key 111 available on the Internet 107. The benefits of confidentially sharing module public key 111 with server 105 are also further described in connection with FIG. 10 below.

Although a single public key and private key for (i) module 101 and (ii) server 105 are illustrated in FIG. 1e and also FIG. 1f below, respectively, both module 101 and server 105 may each utilize several different pairs of public keys and private keys. As one example, module 101 may record a first private key 112 used for creating a digital signature and a second private key 112 for decryption using asymmetric ciphering algorithms 141a. In this example, a server 105 could utilize a first module public key 111 to verify the digital signature, and a second module public key 111 could be utilized to encrypt messages sent to module 101. Similarly, either module 101 or server 105 may use private key 112 or 105c, respectively, to derive secondary shared keys such as a derived shared key 129b below. Thus, one key pair could be used with digital signatures, a second key pair used for asymmetric ciphering, and a third key pair to derive shared secret keys. Each of the three illustrated pairs of keys could comprise a set of keys, and each of the illustrated pairs of keys could also use a different set of parameters 126, although the parameters 126 for the various pairs of keys could also be the same.

In addition, module 101 could utilize a first set of keys to communicate with a first server 105 and a second set of keys to communicate with a second server 105. The first set of keys could use or be associated with a first set of parameters 126 and the second set of keys could use or be associated with a second set of parameters 126. Likewise, M2M service provider 108 illustrated in FIG. 1a could utilize a first pair of secondary private and public keys with a first server 105, and a second pair of secondary private and public keys with a second server 105. As contemplated herein, the term "private key" can also refer to secondary non-shared keys derived from a "parent" private key such as key 112 or key 105c, and the term "public key" can also refer to (i) secondary, shared keys derived using a private key such as key 112, or (ii) secondary, shared keys associated with a public key such as key 111. Other possibilities exist as well for a key to represent derived or associated keys without departing from the scope of the present invention.

According to exemplary embodiments, module 101 may also include a pre-shared secret key 129a. Pre-shared secret key 129a can comprise a secret key that is shared between module 101 and server 105 before module 101 begins (i) communicating with server 105 and/or a certificate authority 118, (ii) or utilizing PKI-based encryption and authentication to communicate with M2M service provider 108. As illustrated in FIG. 1f below, server 105 could also record the pre-shared secret key 129a, and a pre-shared secret key 129a can be associated with each module 101 using a module identity 110. A pre-shared secret key 129a could be a secure key comprising a string or number loaded into a nonvolatile memory 101w of module 101 by a manufacturer, distributer, installer, or end user of module 101. Pre-shared secret key 129a can be moved by CPU 101b from the nonvolatile memory 101w into a RAM 101e for further processing during the use of cryptographic algorithms 141.

Note that pre-shared secret key 129a can be different than a pre-shared secret key used with conventional technology such as SIM cards in PLMN networks, such as the key Ki, where the pre-shared secret key in a SIM card is designed to not be available for movement or loading into a RAM 101e for processing by CPU 101b. Alternatively, pre-shared secret key 129a could be derived using a second pre-shared secret key Ki within a SIM card, but then server 105 would need to be able to derive the same pre-shared secret key 129a, even though server 105 may not have pre-shared secret key Ki available. Although not shown in FIG. 1e, a module 101 may also include a SIM card that includes a pre-shared secret key 129a, wherein the pre-shared secret key 129a in a SIM card is different than pre-shared secret key Ki, since the pre-shared secret key in the SIM card cannot be moved into RAM 101e for processing with a cryptographic algorithms.

Pre-shared secret key 129a as illustrated in FIG. 1e can be loaded by a manufacturer, distributor, installer, or end user of module 101 using a physical interface 101a, such as (i) a USB interface 101v, or (ii) a local WiFi network if module 101 includes a WiFi client. Pre-shared secret key 129a may optionally be uniquely bound to module identity 110, such that another module 101 with a different module identity 110 could not utilize pre-shared secret key 129a. Or, pre-shared secret key 129a could be used by any module 101, but only used one time and thus a second module 101 could not utilize the exact same key within a pre-shared secret key 129a for authentication with server 105 at a subsequent time. Alternatively, pre-shared secret key 129a could be shared by a plurality of modules 101, and for example compiled into a module program 101i, such that multiple modules utilize the same pre-shared secret key 129a.

Pre-shared secret key 129a could be obtained by a distributor, installer, or end user of module 101 by (i) using a local computer to access a web page from a web portal 171j, where the web page can be user password protected, (ii) entering, submitting, or typing information including a module identity 110 into the web page, and subsequently (iii) downloading pre-shared secret key 129a from the web portal 171j. A different web server could be utilized besides the web portal 171j illustrated in FIG. 1d. The web server could be operated by an entity such as module provider 109, M2M service provider 108, or even certificate authority 118 (since pre-shared secret key 129a could be used to authenticate the submission of module public key 111). Note that the pre-shared secret key 129a could also be presented visually on a response web page to the submission, and the a manufacturer, distributor, installer, or end user could record the pre-shared secret key 129a visually presented on the response web page. Pre-shared secret key 129a could comprise a string of an exemplary set of characters or numbers such as 10-16 digits or characters, although other lengths for pre-shared secret key 129a could be possible as well.

According to a preferred exemplary embodiment, in order to obtain the pre-shared secret key 129a from a web page as described in the above paragraph, the distributor, installer, or end user of module 101 could read a pre-shared secret key code 134. Pre-shared secret key code 134 could be physically printed on module 101, such as next to a serial number printed on the enclosure of the device. Pre-shared secret key code 134 could be a unique and/or randomized string such as an exemplary 8 byte number or 10 character string (and other possibilities exist as well), where upon (a) successful submission to a web page of both the pre-shared secret key code 134 with a module identity 110, then (b) the release of pre-shared secret key 129a would be authorized for the distributor, installer, or end user of module 101. Pre-shared secret key 129a could be transmitted through a secure web session such as SSL or TLS from a web portal 171j to a computer operated by the distributor, installer, or end-user. The distributor, installer, or end-user could then load the pre-shared secret key 129a into the nonvolatile memory of the module using (i) a LAN connection such as WiFi to the module (and in this case radio 101z in module 101 could support an 802.11 type connection) or (ii) a USB interface 101v.

Pre-shared secret key 129a could be utilized by a module 101 (i) as a shared secret key 510 in FIG. 5b, or (ii) to derive a shared secret key 510 also recorded by a server 105 in FIG. 5b below. Note that module program 101i preferably includes a verification process for any pre-shared secret key 129a loaded by a distributor, installer, or end user, where a hash value or combination of the pre-shared secret key 129a and module identity 110 could be verified. As one example, the last few digits or characters in a pre-shared secret key 129a could comprise a checksum for a string comprising both module identity 110 and pre-shared secret key 129a, such that module 101 could calculate the checksum after entry of pre-shared secret key 129a, and module 101 can reject the pre-shared secret key 129a if the checksum failed. In this manner, or through the use of similar techniques, system 100 can be designed so that pre-shared secret key 129a can only reasonably be utilized by a correct module 101 with the correct module identity 110 for the pre-shared secret key 129a.

Since module 101 may have multiple module identities 110, a first module identity 110 could be used with a pre-shared secret key code 134 and printed on an enclosure of module 101, while a second and more secure (i.e. longer length or more randomized bits) module identity 110 could be used as a module identity 110 in a message 208 as described in FIG. 2 below. Note that when using the exemplary embodiment illustrated in FIG. 5b below, (x) the module identity 110 submitted with a web page and pre-shared secret key code 134 is preferably different than (y) an unencrypted module identity 110 within a message 208 illustrated in FIG. 6a and FIG. 6b. A module identity 110 submitted by a distributor, installer, or end user in a web page could preferably be easy to manually type into a web page, such as 10 or 12 decimal digits or characters, while an unencrypted module identity 110 within a message 208 could be significantly longer, such as 16 or 24 extended ASCI characters, and other possibilities exist as well without departing from the scope of the present invention.

Application server 171 running web portal 171j could (i) record a table of triplets including module identities 110, pre-shared secret key codes 134, and pre-shared secret keys 129a, and (ii) return via a web page the pre-shared secret key 129a upon a successful match and entry of the submitted pre-shared secret key code 134 and module identity 110. Once the pre-shared secret key 129a has been utilized to authenticate or verify a module public key 111 with a server 105 (such as using subsequent steps 517 in FIG. 5b below), then that particular pre-shared secret key 129a may be "discarded" and not used again for security purposes contemplated herein. After module 101 obtains an initial secure connection to server 105, using the techniques illustrated in FIG. 3 through FIG. 6b, then server 105 can securely send keys for use with future communication including a symmetric key 127 or other shared secret keys for authorizing any subsequent submission of a new module public key 111 with module identity 110 by module 101 in a step 517 illustrated in FIG. 5b.

Note that the use of a pre-shared secret key 129a and pre-shared secret key code 134 is also optional, such that a module program 101i could cipher of obfuscate the initial submission of a derived module public key 111 and module identity to a server 105, so that server 105 could be reasonably assured only a valid module 101 submitted the module public key 111. Alternatively, the module manufacturer could load the pre-shared secret key 129a in non-volatile memory such as flash 101w upon manufacturing, and in this case a distributor, installer, or end-user may not need to access or load the pre-shared secret key 129a. However, the steps for a distributor, installer, or end-user to read a pre-shared secret key code 134 and submit the code to a web portal 171j to obtain pre-shared secret key 129a may still be useful, such as if module 101 needs the equivalent of a "factory reset" after deployment, reconfiguration such as loading new firmware, or otherwise reset or returned to a default state.

Figure 1G:
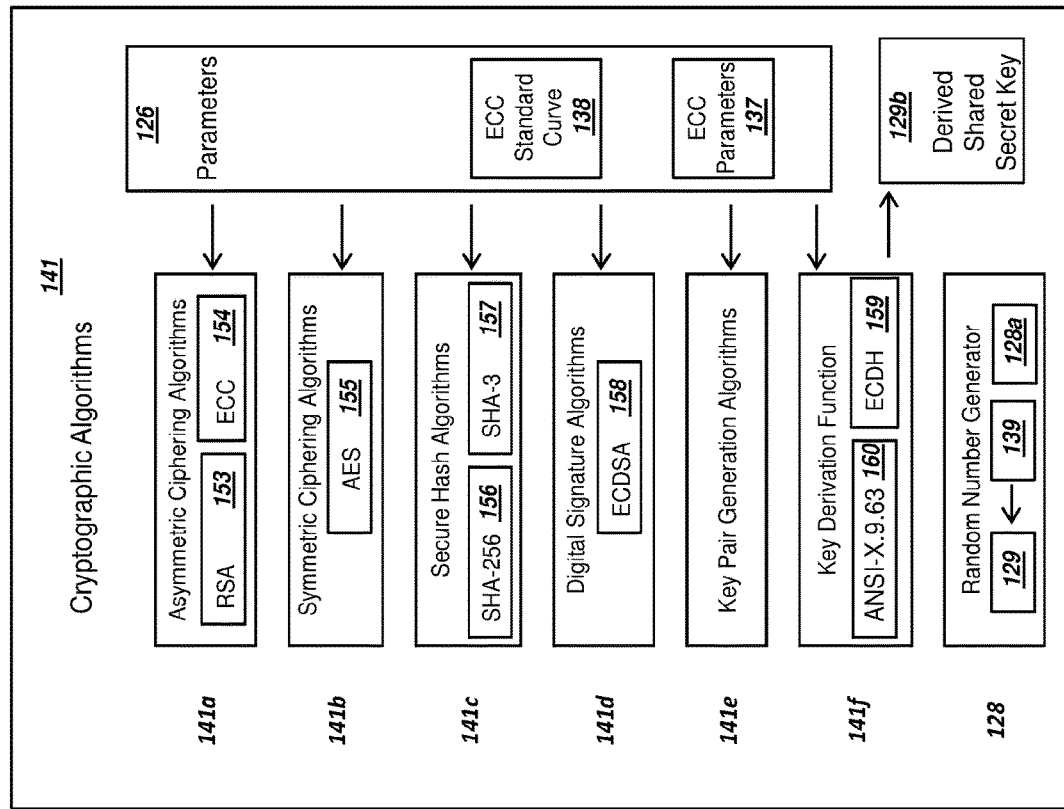
FIG. 1g is a graphical illustration of the components in a set of cryptographic algorithms, in accordance with exemplary embodiments.

Although (A) a pre-shared secret key 129a may be useful for sending module public key 111 to server 105 or other entities connected to the Internet 107, such as a certificate authority 118, (B) pre-shared secret key 129a could be used for other purposes as well, such as input into a key derivation function 141*f* shown in FIG. 1*g* so that module 101 and server 105 could obtain common derived shared secret keys 129*b*. In this case, a derived shared secret key 129*b* could be utilized as a shared secret key 510 depicted and described in connection with FIG. 5*b* below. In addition, after the first use of pre-shared secret key 129*a*, a manufacturer, distributor, installer, or end user may also upload a second pre-shared key 129*a* into module 101 at a future date, such as upon reconfiguration of a module 101.

According to a preferred exemplary embodiment, module 101 can derive its own module private key 112 and module public key 111, and utilize pre-shared secret key 129*a* in order to securely and/or authoritatively communicate the derived module public key 111 with server 105 and/or a certificate authority 118. The use of pre-shared secret key 129*a* can be particularly useful if module 101 has already been deployed with a monitored unit 119 and connects to server 105 though the Internet 107 for the very first time. Server 105 could preferably utilize pre-shared secret key 129*a* in order to confirm that a received module public key 111 and module identity 110 from module 101 authoritatively belong to module 101, as opposed to being an unauthorized or even fraudulent submission of module public key 111 and module identity 110.

Server 105 could utilize a pre-shared secret key 129*a* and the steps depicted and described in connection with FIG. 4 below in order to securely receive module public key 111 and module identity 110 from module 101, including the first time module 101 sends module public key 111 to server 105. As one example, pre-shared secret key 129*a* could be utilized as a symmetric ciphering 141*b* key, described in FIG. 1*g* below. After the first submission of module public key 111 to server 105, any subsequent submissions of new module public keys 111 derived by module 101 could either (i) continue to use the pre-shared secret key 129*a*, or (ii) use a symmetric key 127 derived after the first module public key 111 has been received. Securing the submission of module public key 111 with server 105, including both the first submission and subsequent submissions, is also depicted and described in connection with FIG. 5*b* below.
FIG. 1*f*

FIG. 1*f* is a graphical illustration of the components within a server, in accordance with exemplary embodiments. Server 105 can include a module database 105*k*, a sub-server 105*w*, and a message preprocessor 105*y*. In an exemplary embodiment, the elements illustrated within a server 105 in FIG. 1*f* may be stored in volatile memory such as RAM 105*e*, and/or storage 105*m*, and may also be accessible to a processor CPU 105*b*. In another exemplary embodiment, the module database 105*k*, sub-server 105*w*, and message processor 105*y* can comprise separate computers. Module database 105*k*, sub-server 105*w*, and message preprocessor 105*y* could represent either different processes or threads operating on a server 105, or physically separate computers operating in conjunction over a network to perform the functions of a server 105. Since server 105 can preferably support communications with a plurality of modules 101, server 105 can utilize module database 105*k* to store and query data regarding a plurality of modules 101, monitored units 119, and the overall M2M service. The server 105 can store a plurality of module public keys 111 associated with a plurality of devices in the module database 105*k*. The server 105 can use the module identity 110 of device 101, received in a message such as a UDP packet, to query the module database 105*k* and select the public key 111 or symmetric key 127 associated with the module 101.

Although not illustrated in FIG. 1*f*, module database 105*k* can also record a pre-shared secret key code 134, a set of parameters 126, and a module identity 110 for each module 101, along with the pre-shared secret key 129*a* shown in FIG. 1*f*. In addition, although not illustrated in FIG. 1*f*, module database 105*k* could store a symmetric key 127 for each module 101, if cryptographic algorithms 141 utilize a symmetric cipher 141*b* such as AES for communication with module 101. Examples of module database 105*k* could include MySQL, Oracle®, SQLite, hash tables, distributed hash tables, text files, etc. Module database 105*k* could reside within RAM 105*e* or storage 105*m*. Server 105 may also record a symmetric key 127, where the symmetric key 127 can be associated with an expiration time 133. Symmetric key 127 can also be recorded in a module database 105*k* or a sub-server 105*w*.

Message preprocessor 105*y* can process incoming packets and route them to an appropriate sub-server 105*w* using information contained in an incoming message, such as a module identity 110, a server identity 206 illustrated in FIG. 2 below, and/or a destination IP address. Message preprocessor 105*y* can include rules for processing and routing, such a dropping malformed incoming messages or incoming messages without correct cryptographic data. Message preprocessor 105*y* could also optionally be combined with a server firewall 124 in order to provide firewall functionality and security at the network layer. Message preprocessor 105*y* may preferably remain "silent" to incoming packets without proper cryptographic data contained in an incoming message, such as one example of a properly formatted message 208 illustrated in FIG. 6*a* below.

Sub-server 105*w* can include a server private key 105*c* and cryptographic algorithms 141. A plurality of sub-servers 105*w* can be utilized by a server 105 in order to support communication with a plurality of wireless modules 101. The server private key 105*c* and module public key 111 can be utilized by server 105 to secure communication with module 101, including the steps depicted and described in connection with FIG. 4 and FIG. 5*a* below. Cryptographic algorithms 141 may comprise a suite of algorithms or subroutines and can be utilized for (i) encrypting data using public keys, (ii) decrypting data using private keys, (iii) processing secure hash signatures using private keys, and (iv) verifying secure hash signatures using public keys.

A first sub-server 105*w* can process messages and responses with a first module 101 using a first set of security keys and algorithms, such as using RSA-based security, and a second sub-server 105*w* can process messages and responses with a second module 101 using a second set of security keys and algorithms, such as using ECC-based security. Consequently, message pre-processor 105*y* could route incoming messages to the appropriate sub-server 105*w* depending on the encryption algorithm used in the incoming message (which could be determined by message preprocessor 105*y* by querying the module database 105*k* using a module identity 110 in the incoming message 208). Sub-servers 105*w* may utilize separate server private keys 105*c*, or the sub-servers 105*w* can share a common private key 105*c*. Sub-servers 105*w* may utilize separate cryptographic algorithms 141, or the sub-servers 105*x* can share common cryptographic algorithms 141. Although separate sub-servers 105*w* are illustrated in FIG. 1*f*, the sub-servers may optionally be combined with a server 105, or omitted, with the corresponding server private key 105*c* and cryptographic algorithms 141 stored directly in a server 105.

Server 105 may also comprise a collection of individual computers, where the individual computers could be either centrally located or geographically dispersed, but the individual computers may function in a coordinated manner over a network to operate as a server 105. Server 105 may be a "virtualized" server, with computing resources shared with other processes operating on a computer.

FIG. 1g

FIG. 1g is a graphical illustration of the components in a set of cryptographic algorithms, in accordance with exemplary embodiments. As contemplated herein, communications between (i) a module 101 and a server 105, and (ii) between application 171i and server 105 can be secured by using cryptographic algorithms 141. The cryptographic algorithms 141 used by module 101, server 105, application server 171, and/or application 171i can comprise a set of steps, procedures, or software routines for accomplishing steps to cipher, decipher, sign, and verify messages, including the generation of public keys, private keys, and derived shared keys. Cryptographic algorithms 141 can be implemented in software operating on (i) module 101 in the form of a module program 101i, (ii) server 105 in the form of a module controller 105x, or (iii) application server 171 in the form of an application 171i. Example software for a cryptographic algorithms 141 includes the libraries within the openssl, libmcrypt, and/or and Crypto++ discussed in FIG. 1e. Other possibilities for the location of cryptographic algorithms within a module 101, server 105, or application 171i exist as well, including possibly module operating system 101h, server operating system 105h, and application server operating system 171h, respectively.

In addition, cryptographic algorithms 141 may be implemented in hardware or firmware on any of module 101, server 105, or application 171i. Note that module 101, server 105 and application 171i could each utilize a different set of cryptographic algorithms 141, although the sets of algorithms should preferably be fully interoperable (i.e. ciphering with a first symmetric ciphering algorithm 141b and a symmetric key 127 on module 101 could be deciphered by a second symmetric ciphering algorithm 141b on server 105 using the symmetric key 127, etc.). As illustrated in FIG. 1g, cryptographic algorithms 141 may comprise an asymmetric ciphering algorithm 141a, a symmetric ciphering algorithm 141b, a secure hash algorithm 141c, a digital signature algorithm 141d, a key pair generation algorithm 141e, a key derivation function 141f, and a random number generator 128.

Asymmetric ciphering algorithms 141a can comprise algorithms utilizing public key infrastructure (PKI) techniques for both (i) encrypting with a public key and (ii) decrypting with a private key. Example algorithms within asymmetric algorithms 141a include the RSA algorithms 153 and the Elliptic Curve Cryptography (ECC) algorithms 154, and other asymmetric algorithms could be utilized as well. For example, either the ECC algorithms 154 or RSA algorithms 153 can be used for encryption and decryption, including (i) encryption element 503 discussed below, as well as (ii) decryption element 413 discussed below. A set of parameters 126 can include input into asymmetric ciphering algorithms 141a, such as specifying key lengths, elliptic curves to utilize (if ECC), modulus (if RSA) or other parameters or settings required. As contemplated herein and described in additional detail below, the algorithms illustrated in FIG. 1g can perform both ciphering and deciphering, using the appropriate keys.

The use and application of RSA algorithms and cryptography are described within IETF RFC 3447 titled "Public-Key Cryptography Standards (PKCS) #1: RSA Cryptography Specifications Version 2.1", herein incorporated by reference, among other published standards for the use of RSA algorithms 153. The use of an RSA algorithm 153 for encryption and decryption, including with cryptographic algorithm and other description of encryption or decryption algorithms, can also be processed according to the description of the RSA algorithm according to the Wikipedia entry for "RSA (algorithm)" as of Sep. 9, 2013, which is incorporated by reference herein.

The use and application of ECC algorithms 154 for asymmetric ciphering algorithms 141a within cryptographic algorithms 141 are described within IETF RFC 6090 titled "Fundamental Elliptic Curve Cryptography Algorithms" (herein incorporated by reference), among other published standards using ECC. ECC algorithms 154 can also utilize elliptic curve cryptography algorithms to the Wikipedia entry for "Elliptic curve cryptography" as of Sep. 9, 2013, which is incorporated by reference herein. ECC algorithms 154 may utilized according to exemplary preferred embodiments in order to maintain high security with smaller key lengths, compared to RSA, thereby helping to comparably reduce the message lengths, radio frequency spectrum utilization, and processing power required by module 101. Thus, the use of ECC algorithms 154 within various steps requiring ciphering or digital signatures may help conserve battery life of module 101 while maintaining the objective of securing system 100. Note that as contemplated herein, other algorithms besides with ECC algorithms 154 and RSA algorithms 153 may be also be used in asymmetric algorithms 141a.

Cryptographic algorithms 141 may also include a set of symmetric ciphering algorithms 141b. Symmetric ciphering algorithms 141b can utilize a symmetric key 127 by one node such as a module 101 to encrypt or cipher data, and the encrypted data can be decrypted or deciphered by server 105 also using the symmetric key 127. Examples of symmetric ciphers include Advanced Encryption Standard 155 (AES), as specified in Federal Information Processing Standards (FIPS) Publication 197, and Triple Data Encryption Standard (Triple DES), as described in NIST Special Publication 800-67 Revision 1, "Recommendation for the Triple Data Encryption Algorithm (TDEA) Block Cipher (Revised January 2012)". Parameters 126 input into symmetric ciphering algorithms 141b can include symmetric key 127 length, such as the selection of 128, 192, or 256 bits with AES 155 symmetric ciphering, and parameters 126 could also select a symmetric ciphering algorithm in a collections of symmetric ciphering algorithms 141b. Other examples of symmetric ciphering algorithms 141b may be utilized as well within cryptographic algorithms 141. Also note that as contemplated herein, the term "symmetric ciphering" contemplates the use of a symmetric ciphering algorithm 141b in order to encrypt or cipher data with a symmetric ciphering algorithm 141b, and "asymmetric ciphering" contemplated the use of an asymmetric ciphering algorithm 141a to encrypt or cipher data with a public key, such as module public key 111 or server public key 114.

Cryptographic algorithms 141 may also include a set of secure hash algorithms 141c in order to compute and output a secure hash value or number based on a string or file input into the secure hash algorithms 141c. Example secure hash algorithms include SHA256 156 (also known as SHA-2) and SHA-3 157. SHA256 156 is specified in the National Institute of Standards and Technology (NIST) Federal Information Processing Standards Publication (FIPS PUB) 180-2 titled "Secure Hash Standard". SHA-3 157 is scheduled to be published in FIPS PUB 180-5. Parameters 126 input into secure hash algorithms 141c can include the selection of the length of the secure hash, such as using 224, 256, or 512 bits with either SHA-2 or SHA-3, and other possibilities exist as well.

Cryptographic algorithms 141 may also include a set of digital signature algorithms 141d, in order to sign and verify messages between (i) module 101 and server 105 or (ii) server 105 and application 171i. Digital signature algorithms 141d can also verify signatures such as comparing that (i) a first secure hash value in the form of a digital signature in a certificate (not shown) using a certificate authority public key 132 matches (ii) a second secure hash value in the certificate (not shown). Digital signature algorithms 141d can utilize algorithms in National Institute of Standards (NIST) "FIPS 186-4: Digital Signature Standard", or IETF RFC 6979 titled "Deterministic Usage of the Digital Signature Algorithm (DSA) and Elliptic Curve Digital Signature Algorithm (ECDSA)". The use of ECDSA algorithm 158 within a set of digital signature algorithms 141d may be preferred if keys such as module public key 111 and server public key 114 are based on elliptic curve cryptography. Other PKI standards or proprietary techniques for securely verifying digital signatures may be utilized as well in digital signature algorithms 141d. Parameters 126 input into digital signature algorithms 141d can include the selection of a secure hash algorithms 141c to utilize with digital signature algorithms 141d, or the algorithm to utilize, such as ECDSA shown or an RSA-based alternative for digital signatures is possible as well. Parameters input into digital signature algorithms 141d can also include a padding scheme for use with a digital signature algorithms 141d. Digital signature algorithms 141d could also include an RSA digital signature algorithm for use with RSA-based public and private keys.

Cryptographic algorithms 141 may also include key pair generation algorithms 141e, a key derivation function 141f, and a random number generator 128. Key pair generation algorithms 141e can be utilized by module 101, server 105, or application 171i to securely generate private and public keys. The key pair generation algorithms 141e can also use input from a parameters 126, such as the desired key lengths, or an ECC curve if the public key will support ECC algorithms 154. According to an exemplary preferred embodiment, module 101 can derive a pair of module public key 111 and module private key 112 using key pair generation algorithms 141e. Software tools such as openssl and libcrypt include libraries for the generation key pairs, and these and similar libraries can be used in a key pair generation algorithm 141e.

Key derivation function 141f can be used by module 101, server 105, and/or application 171i in order to determine a common derived shared secret key 129, using at least two respective public keys as input, and may also include the input of a private key. A key exchange to share a common symmetric key 127 can be performed using a key derivation function 141f and parameters 126. An exemplary algorithm within a key derivation function 141f can be the Diffie-Hellman key exchange, which is used by tools such as secure socket layer (SSL) with RSA algorithms 153. When using ECC algorithms 154, module 101 and server 105 can utilize Elliptic Curve Diffie-Hellman (ECDH) algorithms 159, and a summary of ECDH is included in the Wikipedia article titled "Elliptic Curve Diffie-Hellman" (http://en.wikipedia.org/wiki/Elliptic_curve_Diffie%E2%80%93Hellman" from Sep. 24, 2013, which is herein incorporated by reference. Other algorithms to derive a shared secret key 129b using public keys and a private key may also be utilized in a key derivation function 141f, such as the American National Standards Institute (ANSI) standard X-9.63 160.

Parameters 126 used with key derivation function 141f with elliptic curve cryptography can include a common base point G for two node using the key derivation function 141f and public keys. The base point G in a parameters 126 can be transmitted or sent from a module 101 to a server 105 in a message 208, and the base point G can be sent from a server 105 to a module 101 in a response 209, and other possibilities exist as well. Parameters 126 can also include other or additional information for using a key derivation function 141f in order to derive a commonly shared symmetric key 127.

Parameters 126 input into key pair generation algorithms 141e can include the type of asymmetric ciphering algorithms 141a used with the keys, the key length in bits, an elliptic curve utilized for ECC, a time-to-live for a public key that is derived, and similar settings. Additional parameters 126 for a public key can include a supported point formats extension, where the supported point formats extension could comprise uncompressed, compressed prime, or "compressed char2" formats, as specified in ANSI X-9.62. In other words, an ECC public key can have several formats and a set of parameters 126 can be useful to specify the format. Although a set of parameters 126 is illustrated in FIG. 1g as internal to cryptographic algorithms 141, parameters 126 could be recorded in other locations in a module 101 or a system 100. As one example, parameters 126 could be recorded in a server 105 and downloaded by module 101 using the Internet 107. The various algorithms within cryptographic algorithms 141 may utilize a random number generator 128, which is also depicted and described in connection with FIG. 1e above.

According to a preferred exemplary embodiment, parameters 126 can include values to define an elliptic curve and/or use ECC algorithms 154. The values could be constants or variables in a defining equation for an elliptic curve, or the parameters could simply name an existing, defined curve such as the standard named curve illustrated in parameters 126 in FIG. 1h. Parameters 126 could include a set of ECC parameters 137 for using elliptic curve cryptography in ECC algorithms 154, where the ECC parameters 137 can include the ECC parameters in section 3.3 of IETF RFC 6090, including: (i) a prime number p that indicates the order of a field Fp, (ii) a value "a" used in a curve equation, (iii) a value "b" used in the curve equation, (iii) a generator "g" of the subgroup, and (iv) an order "n" of the subgroup generated by "g". Further, the ECC parameters 137 could include values used for elliptic curve cryptography as specified in IETF RFC 5639 titled "Elliptic Curve Cryptography (ECC) Brainpool Standard Curves and Curve Generation", section 3: (i) a "p" value for the prime specifying the base field, (ii) "A" and "B" are coefficients for an equation such as $y^2 = x^3 + A*x + B \mod p$ defining the elliptic curve, (iii) "G"=(x,y) as the base point, i.e., a point in E of prime order, (iv) "q" as the prime order of the group generated by G, and (v) "h" as the cofactor of G in E, i.e., #E(GF(p))/q. Other possibilities exist as well for an ECC parameters 137 that can be used in a cryptographic algorithms. Parameters 126 could also include an ECC standard curve 138, which could comprise a name and/or values for a standardized curve, such as the list of named curves included in section 5.1.1 of IETF RFC 4492 titled "Elliptic Curve Cryptography (ECC) Cipher Suites for Transport Layer Security (TLS)."

As contemplated herein, a set of cryptographic algorithms 141 may operate using either strings or numbers, and parameters 126 could include either strings or numbers as well. The processing of cryptographic algorithms within a module 101 can take place within a CPU 101b, or module 101 could also process cryptographic algorithms in a cryptographic processing unit (not shown) connected to the system bus 101d. According to an exemplary embodiment, a module 101 or a server 105 could include a cryptographic processing unit (not shown) separate from the CPU 101b in order to speed cryptographic computations and/or reduce energy required for supporting the use of cryptography through a system 100. Alternatively, cryptographic algorithms can be implemented entirely in software within a module 101 and/or server 105.

FIG. 1h

FIG. 1h is an illustration of a certificate that includes a PKI public key, where the key comprises an elliptic curve cryptography key, in accordance with exemplary embodiments. Public and private keys in system 100 can utilize PKI techniques other than RSA, such as the elliptic curve cryptography (ECC) public key 111 illustrated in FIG. 1h. One benefit of using ECC is that an equivalent level of security can be obtained for a much smaller key length. Also, energy may be conserved using ECC algorithms 154 compared to RSA algorithms 153. An analysis of the energy conserved for ciphering, deciphering, signing, and verifying messages using ECC versus RSA is included in the paper titled "Energy Analysis of Public-Key Cryptography on Small Wireless Devices" by Wander et al (herein incorporated by reference). Smaller key lengths save bandwidth, memory, processing resources, and power, which are all valuable for a module 101 to conserve a battery 101k and usage of radio-frequency spectrum. For example, an ECC key length of 283 bits provides security similar to an RSA key length of approximately 2048 bits. Module public key 111 can comprise an ECC key in an X.509 certificate, as illustrated in FIG. 1h. Another benefit of using ECC algorithms 154 is that many different defining equations for elliptic curves could be utilized, and the defining equations could also be kept confidential, such that a defining equation for an elliptic curve used in ECC algorithms may optionally be omitted from a certificate 122. In this case, if a public key such as module public key 111 is recorded in a certificate 122, a name or identifying value for the elliptic curve used with a public key could be recorded in a certificate 122, but the underlying defining curve for an elliptic curve could remain confidential. The values to determine an elliptic curve defining equation could be stored in a parameters 126, and the defining equation could also optionally be disclosed.

Certificate 122 could include a signature 123, where signature 123 can be signed using ECC signature techniques, such as the Elliptic Curve Digital Signature Algorithm (ECDSA) 158 with a secure hash such as SHA256 156. In order to generate signature 123, the private key associated with either CA 118 or module provider 109 may also be an ECC-based private key. Note that the public key 111 in a certificate 122 could use a different asymmetric ciphering algorithm 141a than the algorithm used for signing, such that the public key 111 can be an ECC key, while the signature 123 could be generated with RSA algorithm 153 and/or key. Certificate 122 may also include parameters 126, where parameters 126 can specify an elliptic curve utilized with the module public key 111. Parameters 126 could also include the start and end times for the validity of either public key 111 or certificate 122. Other parameters 126 can be utilized in a certificate 122 as well, and a parameters 126 may specify values that are not included or external to a certificate 122.

Certificate 122 illustrated in FIG. 1h also illustrates an exemplary embodiment of the present invention. Over the lifetime of a module 101, which could be a decade or longer, multiple module public keys 111 may be utilized. The potential use of multiple different module public keys 111 include (i) the expiration of a certificate 122 (including expiration of a public key associated with a certificate authority used in signature 123), (ii) a need to change an elliptic curve specified in a parameters 126, (iii) adding a new public/private key pair for connection with a different wireless network 102, (iv) as increasing a key length utilized in a public/private key pair, (v) the transfer of ownership or control of module 101, and/or (vi) module 101 connecting to a new server that utilizes a different asymmetric ciphering algorithm (i.e. RSA instead of ECC). Other possibilities exist as well for reasons a module to derive a new module public key 111. Note that the multiple module public keys 111 may also be utilized concurrently, such that (i) a first module public key 111 in a first certificate 122 can be utilized with a first server 105, and (ii) a second module public key 111 (possibly derived using a different set of parameters 126 including using a different elliptic curve) can be utilized with a second server 105 and/or wireless network 102.

In either case of (i) module 101 using multiple module public keys 111 concurrently, or (ii) module 101 using different module public keys 111 in sequence, a certificate 122 can preferably include a module public key identity 111a to specify the module public key 111 utilized in a certificate 122. As illustrated in FIG. 1a, the module public key identity 111a could be included in the "Common Name" (CN) field, and the module identity 110 can be included in the "Organizational Unit" (OU) field. Alternatively, the module public key identity 111a and module identity 110 can be appended together and used in the CN field. In this manner and according to preferred exemplary embodiments, a module public key identity 111a is utilized with both a module identity 110 and a module public key 111 within a certificate 122. Also, as noted previously herein, the use of a certificate 122 may optionally be omitted, such that module 101 and server 105 share public keys without using certificates 122. The module identity 110, or a value associated with the module identity 110 can also be included in certificate 122, such as the "Common Name" (CN) field of a X.509 certificate 122, as illustrated in FIG. 1h.

Note that the use of a certificate 122 is not required for the format of a public or shared key, and the public keys could optionally omit a signature from a certificate authority 118. In this case, the public keys such as module public key 111 and/or server public key 114 could be recorded in the format of a string, without the additional fields illustrated in FIG. 1h. Server public key 114 may also be recorded in a certificate 122 with a signature 123 from a certificate authority 118. Other possibilities exist as well without departing from the scope of the present invention.

FIG. 1i

Figure 1I:
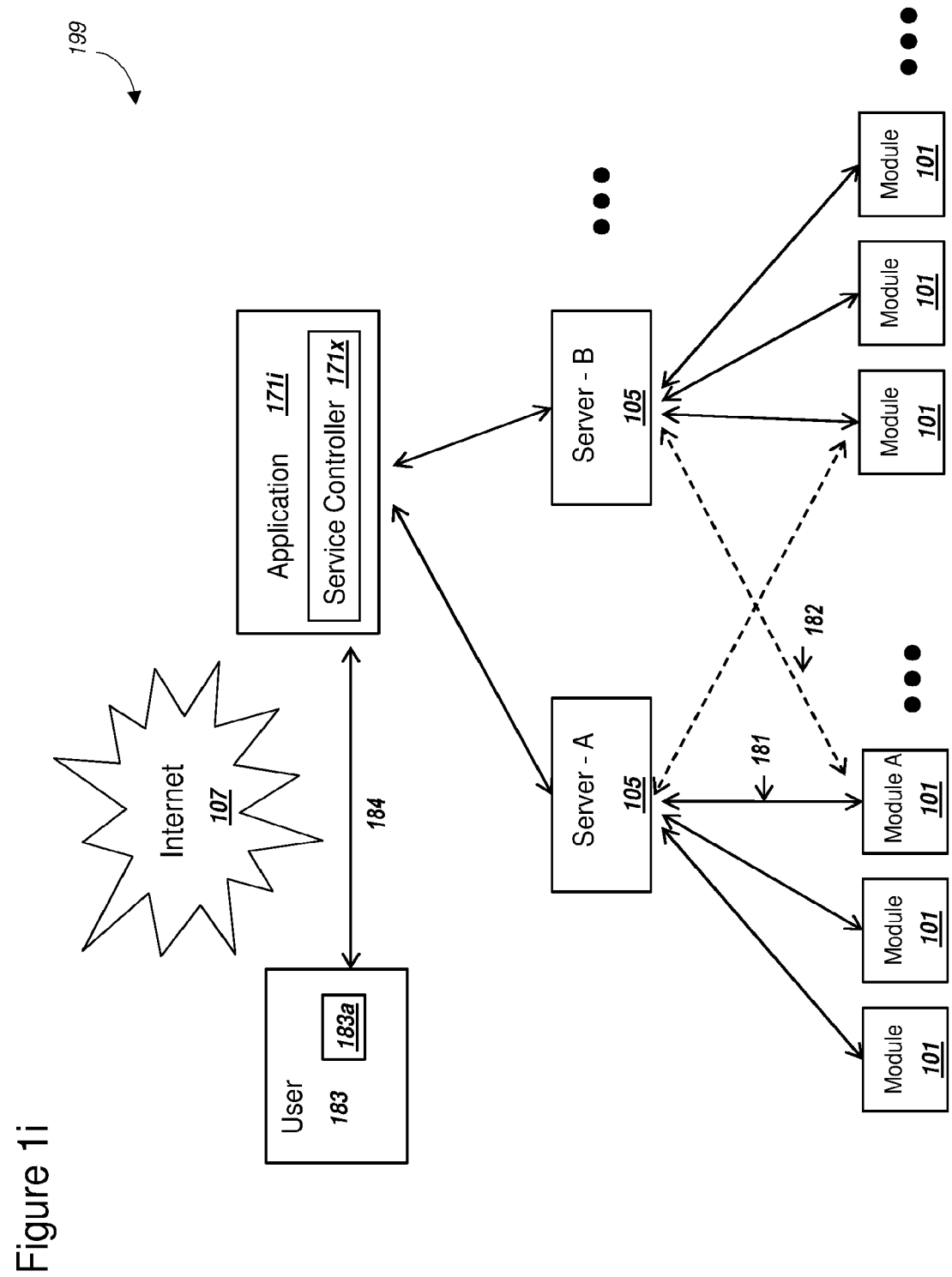
FIG. 1i is a graphical illustration of an exemplary system that includes a user, an application, a set of servers, and a set of modules, in accordance with exemplary embodiments.

FIG. 1i is a graphical illustration of an exemplary system that includes a user, an application, a set of servers, and a set of modules, in accordance with exemplary embodiments. System 199 illustrated in FIG. 1i can include a user 183, an application 171i, a set of servers 105, and a set of modules 101, which can communicate as illustrated using the Internet 107. Each of a server 105 A and server 105 B and additional servers can communicate with a plurality of modules. An application 171i can communicate with a plurality of servers 105. Although the servers 105 an application 171i in system 100 in FIG. 1i are illustrated as being separate, application 171i and server 105 may optionally be combined into a single node, such that the application 171i and server 105 operate as separate processes or programs on the same computer, or on a computer operating in a distributed environment such as a cloud configuration. In addition, even though a single application 171*i* and a single user 183 are illustrated in FIG. 1*i*, a system 199 could include multiple applications 171*i* and multiple users 183.

User 183 can comprise an individual, business manager, network engineer, systems administrator, other employee with functional responsibilities for a system 199 (or components within a system 199 or system 100) accessing application 171*i* using a computer with a user interface such as a web browser 183*a*. Application 171*i* could also send an email or text message to user 183 if an alarm condition is detected in system 199, such as if a sensor 101*f* measurement exceeds a prescribed threshold value. The web browser 183*a* could use a connection 184 to access a web portal 171*j* operating on application 171*i*. Connection 184 could include hypertext markup language (HTML) messages, and could be through a secure connection such as TLS or IPsec, although other possibilities exist as well to those of ordinary skill in the art. Any module 101, such as Module 101 A, could use the Internet 107 and establish a primary connection 181 with server 105 A, and also module 101 A could establish a backup connection 182 with server 105 B if the primary connection 181 is not available. Alternatively, any module 101, such as module 101 A, could communicate with more than one server 105 concurrently or in sequence, such that module 101 A communicates with both server 105 A and server 105 B. According to exemplary embodiments, during an active state between periods of sleep or being dormant, module 101 may communicate with more than one server 105, such as a first server 105 A and a second server 105 B. Other possibilities for a plurality of modules 101 to communicate with a plurality of servers 105 exist without departing from the scope of the present invention.

FIG. 2

Figure 2:
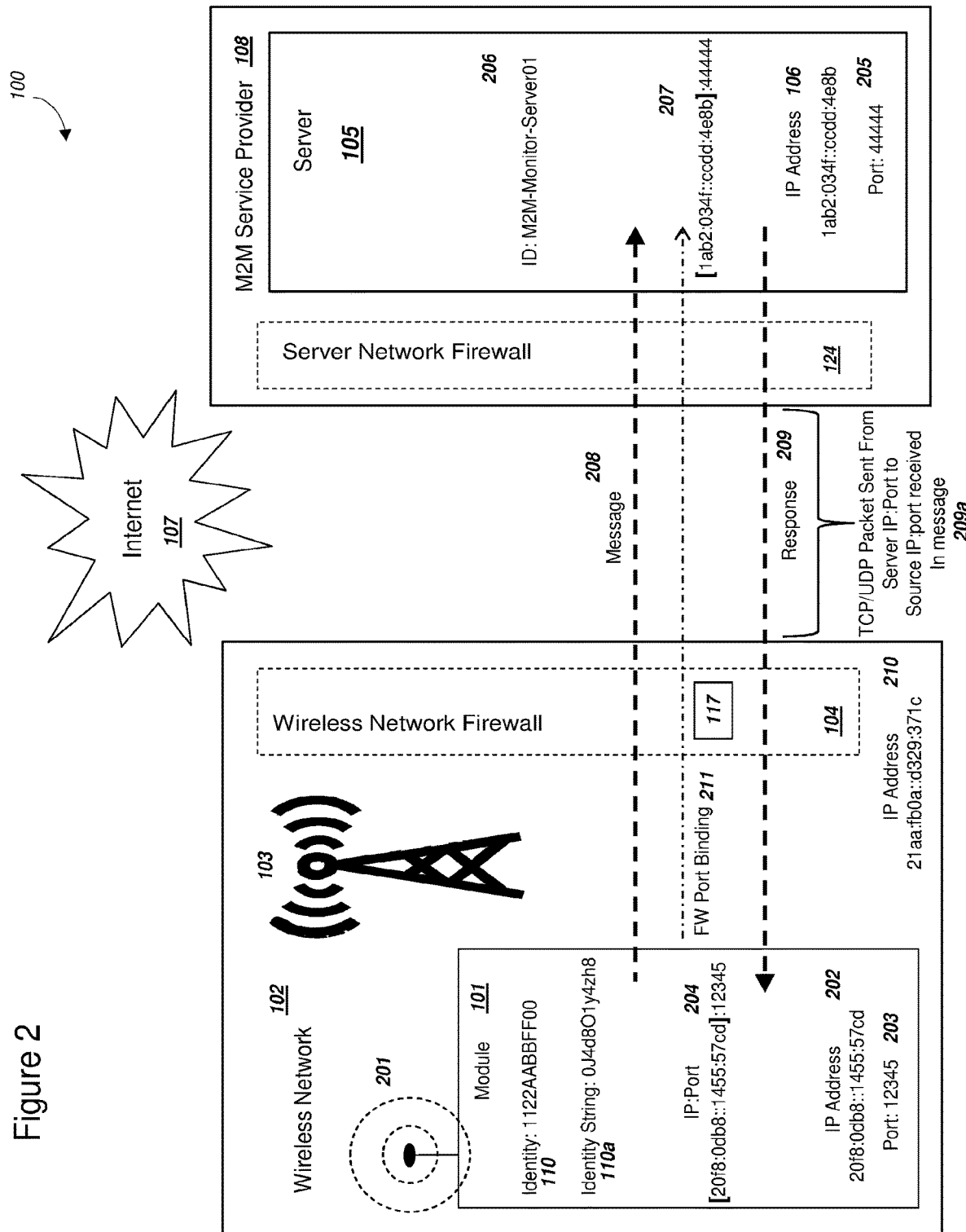
FIG. 2 is a graphical illustration of an exemplary system, where a module sends a message to a server, and where the server responds to the message, in accordance with exemplary embodiments.

FIG. 2 is a graphical illustration of an exemplary system, where a module sends a message to a server, and where the server responds to the message, in accordance with exemplary embodiments. Module 101 as depicted and described in FIG. 2 can operate as a wireless module 101, although a wired connection to the Internet 107 could alternatively be utilized. System 100 as illustrated in FIG. 2 includes RF signals 201, module IP address 202, port number 203, module IP:port 204, server port number 205, server ID 206, server IP:port number 207, message 208, response 209, wireless network firewall address 210, and firewall port binding packet 211. Many of the elements illustrated within system 100 in FIG. 2 are also depicted and described in connection with FIG. 2 of U.S. patent application Ser. No. 14/039,401 (the contents of which are hereby incorporated by reference in their entirety). As contemplated herein, a wireless module 101 can comprise a module 101, or in other words a wireless module 101 may be a module 101 that is wireless. Functions described as being performed by a wireless module 101 may also be performed by a wired module 101 (where connection to a wired network would be used instead of connection to a wireless network 102). Also as contemplated herein and illustrated in FIG. 2, the wording "module 101 sends a message 208" can also be considered equivalent to "server 105 receives a message 208". Likewise, the wording "server 105 sends a response 209" can be considered equivalent to "module 101 receives a response 209".

A wireless module 101 can wake from a dormant state in order perform (i) remote and automated monitoring and (ii) control functions such as collecting a sensor 101*f* measurement, communicating with server 105, and controlling an actuator 101*y*. If module 101 is connected to land-line power or a long-lasting external power source such solar power, then module 101 may remain in an active state and bypass a dormant state, although transmitting RF signals 201 may preferably only be utilized when communicating with wireless network 102 or sending data to and receiving data from server 105. Upon waking from the dormant state and starting communication with a server 105, a wireless module 101 can begin transmitting RF signals 201 to base station 103. The wireless module can acquire an IP address 202 from the wireless network 102. IP address 202 is illustrated as being an IPv6 address, but IP address 202 could also be an IPv4 address. IP address 202 could also be a subset of IPv6 addresses such as the last 32 or 64 bits in a full 128 bit IPv6 address, and wireless network 102 could append the beginning 96 or 64 bits, respectively, of the IPv6 address when wireless module 101 sends packets to the Internet 107.

In order to transmit or send data from wireless module 101 to server 105, a wireless module 101 can use module program 101*i* to collect data from a sensor 101*f* in order to update server 105. Module program 101*i* can request a port number 203 from operating system 101*h* in order to have a source IP:port for sending data using IP protocols such as TCP and UDP. The terminology "IP:port" as described herein refers to combining an IP address with a port number. Wireless module IP address 202 and port number 203 can be combined to form IP:port number 204. IP:port number 204 can be utilized as a source IP:port number for packets transmitted from wireless module 101, as well as a destination IP:port number for packets received by wireless module 101, when communicating with server 105.

In order to utilize Internet 107, module 101 may also need a destination IP address and port number in order to send packets to server 105. Before sending data to server 105, wireless module 101 preferably retrieves server IP address 106 and server port number 205 from RAM 101*e*. Server IP address 106 could be recorded in RAM 101*e* via (i) a DNS query using server name 206 or (ii) queries to M2M service provider 108 or wireless network 102. CPU 101*b* may copy server IP address 106 and server port number 205 from nonvolatile memory into volatile memory such as a register for processing to send a packet to server 105. Server name 206 could also be a server identity. (A) Server IP address 106 or server name 206 and (B) server port number 205 could be recorded in a nonvolatile memory such as flash memory 101*w* so that wireless module 101 can store the proper destination of packets transmitted or sent even when wireless module is dormant or shutdown, which avoids the processing and bandwidth requirements of obtaining server IP address 106 and server port number 205 every time the wireless module 101 wakes from the dormant or shutdown state. Server IP address 106 and server port number 205 can be combined into a server IP:port number 207.

After collecting data from a sensor, module 101 can send a packet from IP:port 204 to IP:port 207, and the packet could comprise a message 208 that may include the data from a sensor 101*f*. Note that message 208 does not need to include sensor data, and message could potentially be a periodic registration message or keep-alive message. As contemplated herein, the term "sensor measurement" can refer to data associated with or derived from a sensor 101*f*. A sensor measurement, can comprise a string containing data regarding a parameter of a monitored unit 119 and collected by a sensor 101*f*. The sensor measurement as sent in a message 208 can also represent a string (alphanumeric, binary, text, hexadecimal, etc.), where the string comprises a transformation or processing of sensor data collected by a CPU 101*b*, such including formatting, compressing, or encrypting, encoding, etc. of sensor data.

In order to minimize bandwidth and time required for RF signals 201 to be active, module 101 can send the message 208 as a single UDP datagram in accordance with a preferred exemplary embodiment. The single UDP datagram in this embodiment can preferably be the only packet sent from module 101 to server 105 or M2M service provider 108 during a wake state for the module 101 when the radio 101*z* is active and transmitting, such as in a radio resource control (RRC) connected state. In other words, according to this preferred exemplary embodiment, the message 208 sent by module 101 can preferably be the only message or packet sent by the wireless module to the server 105 between dormant periods of module 101. By sending message 208 as a single UDP datagram, both a battery 101*k* is conserved and utilization of valuable RF spectrum is reduced. Message 208 could also comprise a series of associated UDP messages.

Also, as contemplated herein, message 208 could comprise a related series of packets, so that message 208 could comprise multiple datagrams. As one example, if TCP is utilized as the transport protocol for message 208, then the series of TCP messages including the initial handshake, one or more packets of payload data, and the closing of the connection could together comprise message 208. As another example, if UDP or UDP Lite is utilized for the transport protocol, and payload data exceeds a maximum transmission unit (MTU) size for the UDP packet and the payload data is spread across multiple packets, then the multiple packets would comprise a message 208. Further, a related series of packets comprising a message 208 could be identified by using the same source port number for module 101. In addition, a related series of packets comprising a first message 208 could be identified as a series of packets sent by module 101 before receiving a response 209 from a server, and packets sent after receiving a response 209 could comprise a second message 208. Other possibilities for a message 208 to comprise multiple packets or datagrams may exist without departing from the scope of the present invention.

The UDP datagram for message 208 could also be formatted according to the UDP Lite protocol, as specified in IETF RFC 3828, which is also incorporated by reference herein. The term "UDP Lite" described in the present invention may also refer to any connectionless protocol widely supported on Internet 107 where checksums may be partially disabled, thereby supporting the transfer of bit errors within a datagram. The advantages of UDP over TCP is that UDP can be quickly sent, while TCP requires a "handshake" with the server which requires more time and bandwidth, which would utilize more energy from battery 101*k*. Weak or "noisy" RF signals between wireless module 101 and wireless network 102 may degrade or slow TCP transmissions, resulting in unwanted and unnecessary retransmission of individual TCP messages in the standard TCP "handshake" and connection close procedures. Also, the sensor data from a sensor 101*f* may be relatively small, such as a dozens of bytes in an exemplary embodiment, and UDP can provide significantly less signaling overhead than TCP, especially with small messages for the duration of the session. However, some M2M applications may prefer or require TCP and in this case message 208 can be formatted according to TCP. Thus, according to an exemplary embodiment, both message 208 and response 209 can be TCP messages. In this exemplary embodiment, message 208 and response 209 could each comprise a series of TCP messages that can include a TCP SYN, SYN ACK, ACK, ACK w/data, FIN ACK, etc.

According to an exemplary embodiment, module 101 sends the same sensor data in multiple copies of the same UDP packet. Each of the multiple copies of the same UDP packet can also optionally be formatted according to the UDP Lite protocol. As one example, wireless module sends three identical copies of the UDP or UDP Lite packet that include the same sensor data. The benefit of sending three copies of UDP Lite include (i) the RF signals 201 received by the base station 103 could include bit errors, which could result in a regular (RFC 768) UDP packet being dropped, since a bit error could result in a UDP checksum mismatch, as received and processed by wireless network 102. Note that the use of checksums is mandatory in IPv6, and thus checksums cannot be fully disabled in IPv6. With UDP Lite packets transmitted by wireless module 101, where the mandatory checksum for IPv6 can cover the packet header, wireless network 102 can forward all packets received, potentially including bit errors, to server 105 over the Internet 107.

Server 105 can receive the multiple copies of the UDP or UDP Lite packets, which could include bit errors received, and server 105 could compare or combine the multiple copies or each individual UDP Lite packet in order to remove bit errors. Note that UDP Lite is not required, and wireless module 101 could send the message 208 using a single UDP packet, or multiple copies of a regular UDP (i.e. non UDP Lite) packet. However, using UDP Lite with multiple packets sent can provide benefits such as if the sensor data is encrypted in the packet, then a single bit error would normally break the receiver's ability to decipher the data using a cryptographic key, unless the encrypted data was channel coded and the channel coding could recover from the bit error in order to present an error-free input of the encrypted data to a deciphering algorithm.

Further, between periods of sleep when a wireless module 101 becomes active and transmits RF signals 201, module 101, which may also comprise a wireless module 101, could send the sensor data in a single UDP Lite packet where the packet includes channel coding, which can also be referred to forward error correction. Forward error correction could also be implemented by sending multiple copies of the same UDP packet. Note that since large segments of message 208 could include encrypted or hashed data, those segments may not be appropriate for compression since the data is often similar to random strings which are not readily compressed. Channel coding techniques for the data in message 208 could include block codes and convolution codes. Block codes could include Reed-Solomon, Golay, BCH, Hamming, and turbo codes. According to a preferred exemplary embodiment, data within message 208 is sent as a UDP Lite packet using a turbo code to correct multiple bit errors within a packet or datagram sent by module 101 and received by server 105.

In system 100 illustrated in FIG. 2, server 105 can use IP:port 207 to receive the packet from wireless module 101 and sent from source IP:port 204 to IP:port 207, and the packet could comprise a message 208 that may include the data from a sensor associated with module 101 or monitored unit 119. As contemplated herein, a message 208 illustrated in FIG. 2 does not need to include sensor data and other data could be transmitted or sent, such as a server instruction 414 (described in FIG. 4 below), or other data pertaining to module 101 or a monitored unit 119. Note that server 105 can use IP:port 207 to receive a plurality of messages 208 from a plurality of wireless modules 101. Server 105 preferably listens for UDP packets on IP:port 207 or monitors IP:port 207, although TCP packets could be supported as well. If server 105 receives multiple copies of the same UDP packet from module 101, server 105 preferably includes a timer. The timer can start when the first packet in the series of packets comprising a message 208 is received, and packets received outside the expiration of the timer would be discarded. In this manner, server 105 would be protected from replay attacks, even though module 101 may send multiple copies of the same packet in order to implement forward error correction. The timer used by a server 105 to drop duplicate packets received outside the timer window could be a relatively short value such as less than 5 seconds.

After receiving the message 208 and processing the message according to the techniques described below such as in FIG. 4, server 105 can send a response 209. Since module 101 may belong to a wireless network 102 which includes a firewall 104, the source IP:port of the message 208 received by server 105 could be different from the source IP:port 204 utilized by wireless module 101. The source IP:port in message 208 could be changed if firewall 104 performs network address translation (NAT), as one example. Server 105 may not readily know if a NAT translation has been performed on the message 208. Alternatively, firewall 104 may not perform NAT, but could still block data from the Internet 107 which does not properly match the firewall rules. As one example, firewall 104 could be a symmetric firewall (but without NAT functionality), where only packets from IP:port 207 to IP:port 204 are allowed to pass the firewall after message 208 has been sent by module 101.

In either case, where firewall 104 may or may not perform NAT routing, server 105 preferably sends the response 209 from the server IP:port 207 to the source IP:port it receives in message 208. According to a preferred exemplary embodiment, response 209 is a UDP packet sent from server 105 with (i) a source IP:port 207 and (ii) a destination IP:port equal to the source IP:port received in message 208, as illustrated in packet 209*a*. The example use of source and destination IP:ports in message 208 and response 209 are also illustrated in FIG. 6*a* below. In this manner, the UDP packet can traverse a firewall 104, if firewall 104 is present. If firewall 104 is present and performs NAT routing, then firewall 104 can receive the response 209 and change the destination IP address and port within response 209 to equal IP:port 204.

According to exemplary preferred embodiments, module 101 may also obtain power from a land-line source, such as a traditional 120 volt wall socket, or possibly power over Ethernet, and other non-transient power sources could be utilized as well. In this case, module 101 may remain persistently connected to the Internet through either a wireless network 102 or a wired connection such as Ethernet. In other words, module 101 may omit entering periods of sleep or dormancy where inbound packets from the Internet would not be received due to the sleep state of module 101. Consequently in an exemplary embodiment, module 101 which does not sleep for periods longer than a minute may preferably periodically send a firewall port binding packet 211 from IP:port 204 to IP:port 207 in order to keep ports and addresses within a firewall 104 and/or firewall 124 open to communications between module 101 and server 105. Firewall port binding packet 211 can comprise a packet that is sent periodically using a timer interval that is shorter than the port-binding timeout period 117 on a firewall 104 and firewall 124.

Continuing with this exemplary embodiment where module 101 does not sleep for periods longer than approximately one minute, if UDP is utilized for message 208 and response 209, then a small UDP packet comprising firewall port binding packet 211 can be sent periodically such as every 45 seconds. If TCP is utilized for message 208 and response 209, then a small TCP packet comprising firewall port binding packet 211 can be sent periodically such as every 4 minutes. Other possibilities for the timing of sending firewall port binding packet 211 are possible as well. By sending firewall port binding packet 211 periodically, server 105 (*i*) can send module 101 a response 209, which could include a module instruction 502 as explained in FIG. 5*a*, at (ii) time intervals between message 208 and response 209 that are longer than the firewall port binding timeout values 117 of firewall 104 and/or firewall 124. Without firewall port binding packet 211, if (A) a response 209 sent from server 105 at an exemplary 180 seconds after receiving message 208, such as after a firewall port binding timeout value 117 of firewall 104 of an exemplary 60 seconds, then (B) response 209 would be dropped by firewall 104 and the response 209 would not be received by module 101.

FIG. 3

Figure 3:
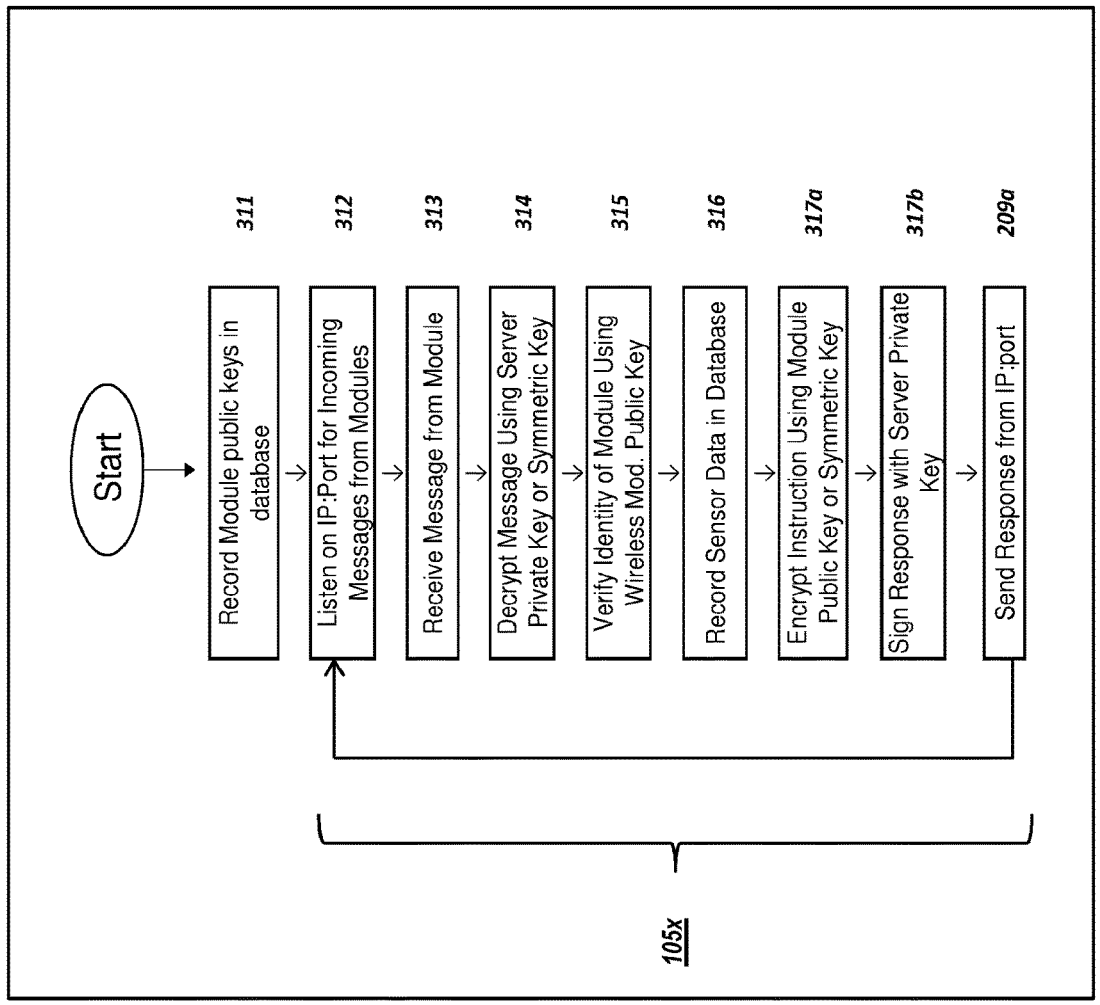
FIG. 3 is a flow chart illustrating exemplary steps for a server to receive a message from a module, in accordance with exemplary embodiments.

FIG. 3 is a flow chart illustrating exemplary steps for a server to receive a message from a module, in accordance with exemplary embodiments. As illustrated in FIG. 3, FIG. 3 can include steps used by a module controller 105*x* in a server 105 as illustrated in FIG. 1*c*. The processes and operations, including steps for module controller 105*x*, described below with respect to all of the logic flow diagrams may include the manipulation of signals by a processor and the maintenance of these signals within data structures resident in one or more memory storage devices. For the purposes of this discussion, a process can be generally conceived to be a sequence of computer-executed steps leading to a desired result.

These steps usually require physical manipulations of physical quantities. Usually, though not necessarily, these quantities take the form of electrical, magnetic, or optical signals capable of being stored, transferred, combined, compared, or otherwise manipulated. It is convention for those skilled in the art to refer to representations of these signals as bits, bytes, words, information, elements, symbols, characters, numbers, points, data, entries, objects, images, files, or the like. It should be kept in mind, however, that these and similar terms are associated with appropriate physical quantities for computer operations, and that these terms are merely conventional labels applied to physical quantities that exist within and during operation of the computer.

It should also be understood that manipulations within the computer are often referred to in terms such as listing, creating, adding, calculating, comparing, moving, receiving, determining, configuring, identifying, populating, loading, performing, executing, storing etc. that are often associated with manual operations performed by a human operator. The operations described herein can be machine operations performed in conjunction with various input provided by a human operator or user that interacts with the computer.

In addition, it should be understood that the programs, processes, methods, etc. described herein are not related or limited to any particular computer or apparatus. Rather, various types of general purpose machines may be used with the following process in accordance with the teachings described herein.

The present invention may comprise a computer program or hardware or a combination thereof which embodies the functions described herein and illustrated in the appended flow charts. However, it should be apparent that there could be many different ways of implementing the invention in computer programming or hardware design, and the invention should not be construed as limited to any one set of computer program instructions.

Further, a skilled programmer would be able to write such a computer program or identify the appropriate hardware circuits to implement the disclosed invention without difficulty based on the flow charts and associated description in the application text, for example. Therefore, disclosure of a particular set of program code instructions or detailed hardware devices is not considered necessary for an adequate understanding of how to make and use the invention. The inventive functionality of the claimed computer implemented processes will be explained in more detail in the following description in conjunction with the remaining Figures illustrating other process flows.

Further, certain steps in the processes or process flow described in all of the logic flow diagrams below must naturally precede others for the present invention to function as described. However, the present invention is not limited to the order of the steps described if such order or sequence does not alter the functionality of the present invention. That is, it is recognized that some steps may be performed before, after, or in parallel other steps without departing from the scope and spirit of the present invention.

The processes, operations, and steps performed by the hardware and software described in this document usually include the manipulation of signals by a CPU or remote server and the maintenance of these signals within data structures resident in one or more of the local or remote memory storage devices. Such data structures impose a physical organization upon the collection of data stored within a memory storage device and represent specific electrical or magnetic elements. These symbolic representations are the means used by those skilled in the art of computer programming and computer construction to most effectively convey teachings and discoveries to others skilled in the art.

At step 311, the server 105 can record a module public key 111, or a plurality of module keys 111 in a module database 105k. The module public key 111 could be received in a message 208 according to steps 516 and 517, including authenticating the message 208, as depicted and described in connection with FIG. 5b below. Module public key 111 could also be recorded at step 311 before module 101 connects to the Internet 107 the very first time, and in this case module public key 111 could be recorded in server 105 by M2M service provider 108 or module provider 109. At step 312, the server 105 can open a TCP/UDP socket associated with an IP:port number 207 and listen or monitor for incoming message from modules. At step 313, server 105 can receive a message 208 sent by module 101, using the IP:port number 207. Although not illustrated in FIG. 3, upon the first communication from module 101 by server 105 where the communication could include step 313, according to an exemplary embodiment, module 101 can also send a certificate 122 to server 105, where certificate 122 would normally include module public key 111 and module identity 110. Server 105 could utilize a certificate 122 to verify a module identity 110, as described in FIG. 4 below at step 412.

An exemplary format of message 208 is depicted and described in connection with FIG. 6a below, and other possibilities for a message 208 exist as well. Although not illustrated in FIG. 3, after receiving message 208, server 105 may also process any channel coding present in message 208 in order to eliminate any bit errors received. The channel coding could be included in a message 208 that utilizes the UDP Lite protocol. At step 314, server 105 can decrypt a message 208 using a cryptographic algorithm 141 and one of (i) server private key 105c, or (ii) a symmetric key 127. Additional details regarding step 314 are depicted and described in connection with FIG. 4 below. At step 315, server 105 can verify that message 208 was sent by module 101 using a module identity 110, module public key 111, and a cryptographic algorithm 141. Additional details regarding step 315 are depicted and described in connection with FIG. 4 below. Note that step 315 can take place before step 314 if the module identity 110 and/or a digital signature is not encrypted within message 208 (i.e. a sensor measurement in message 208 could be encrypted but a module identity 110 or digital signature may not be encrypted). Step 315 may optionally be omitted, if a symmetric key 127 is used to cipher data within message 208, such that a module digital signature from module 101 was previously verified when the symmetric key 127 was implemented.

Figure 7:
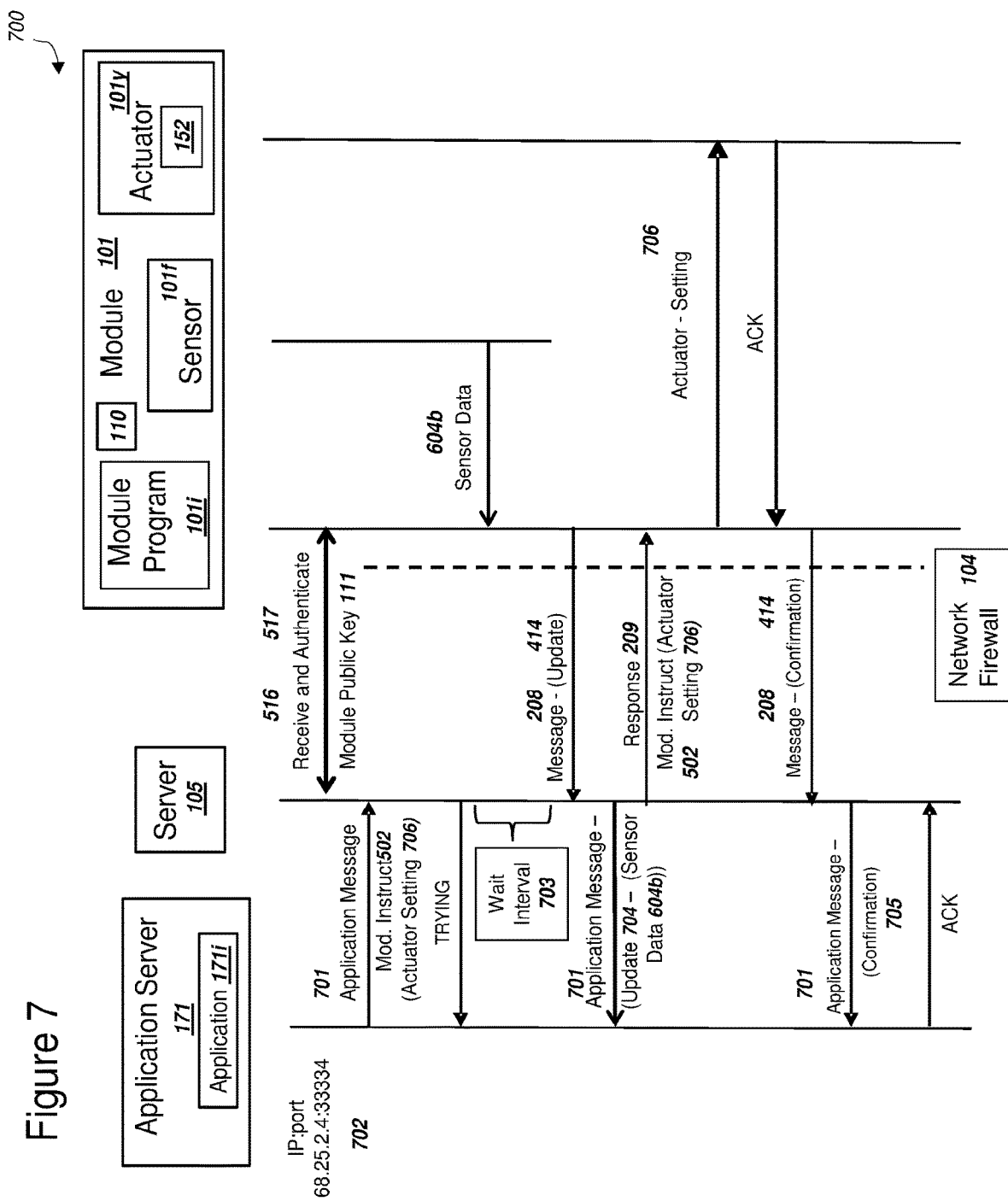
FIG. 7 is a simplified message flow diagram illustrating an exemplary system with exemplary data transferred between a module and an application using a server, in accordance with exemplary embodiments.
Figure 8:
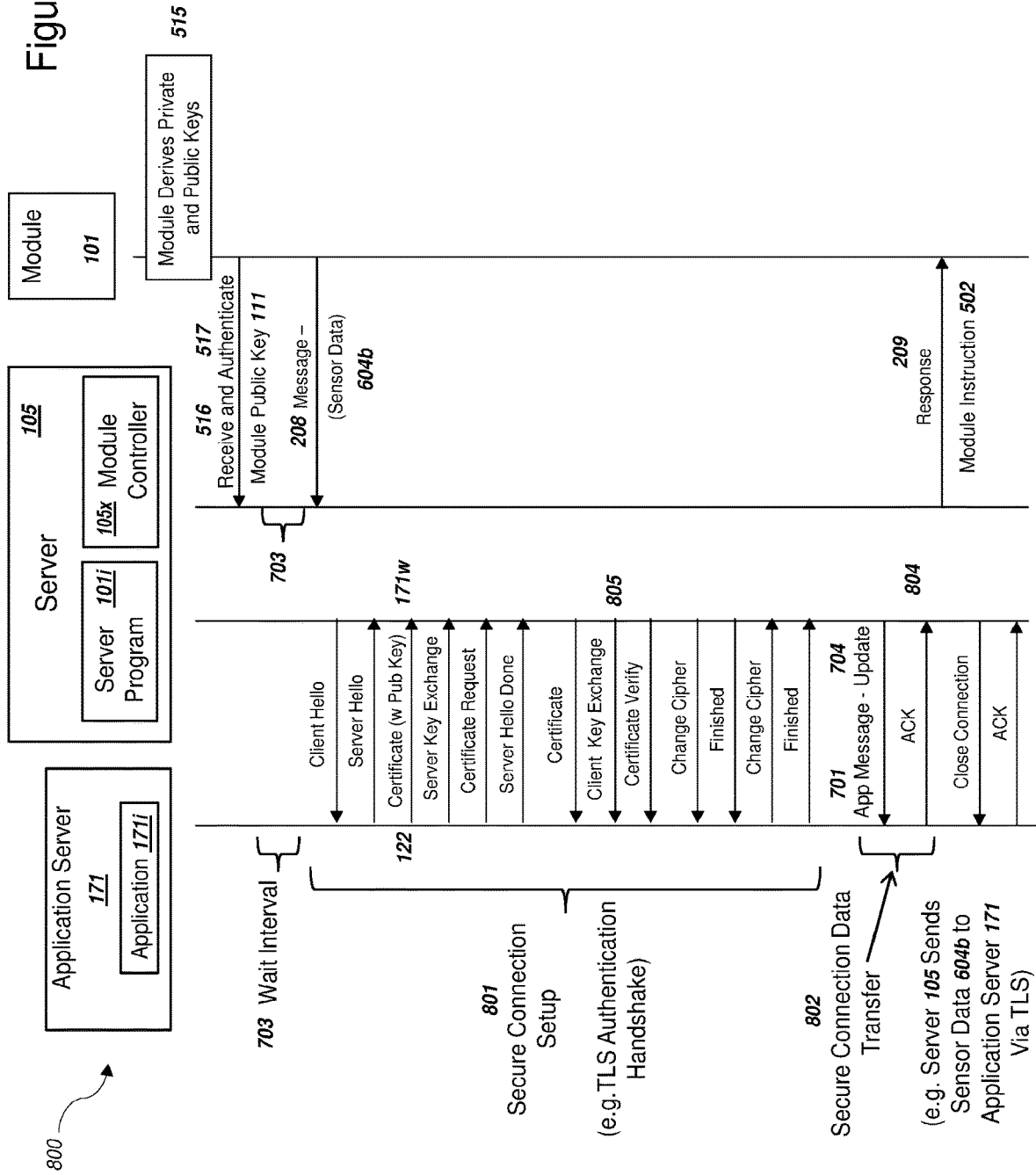
FIG. 8 is a simplified message flow diagram illustrating an exemplary system with exemplary data transferred between a module and an application using a server, in accordance with exemplary embodiments.
Figure 9:
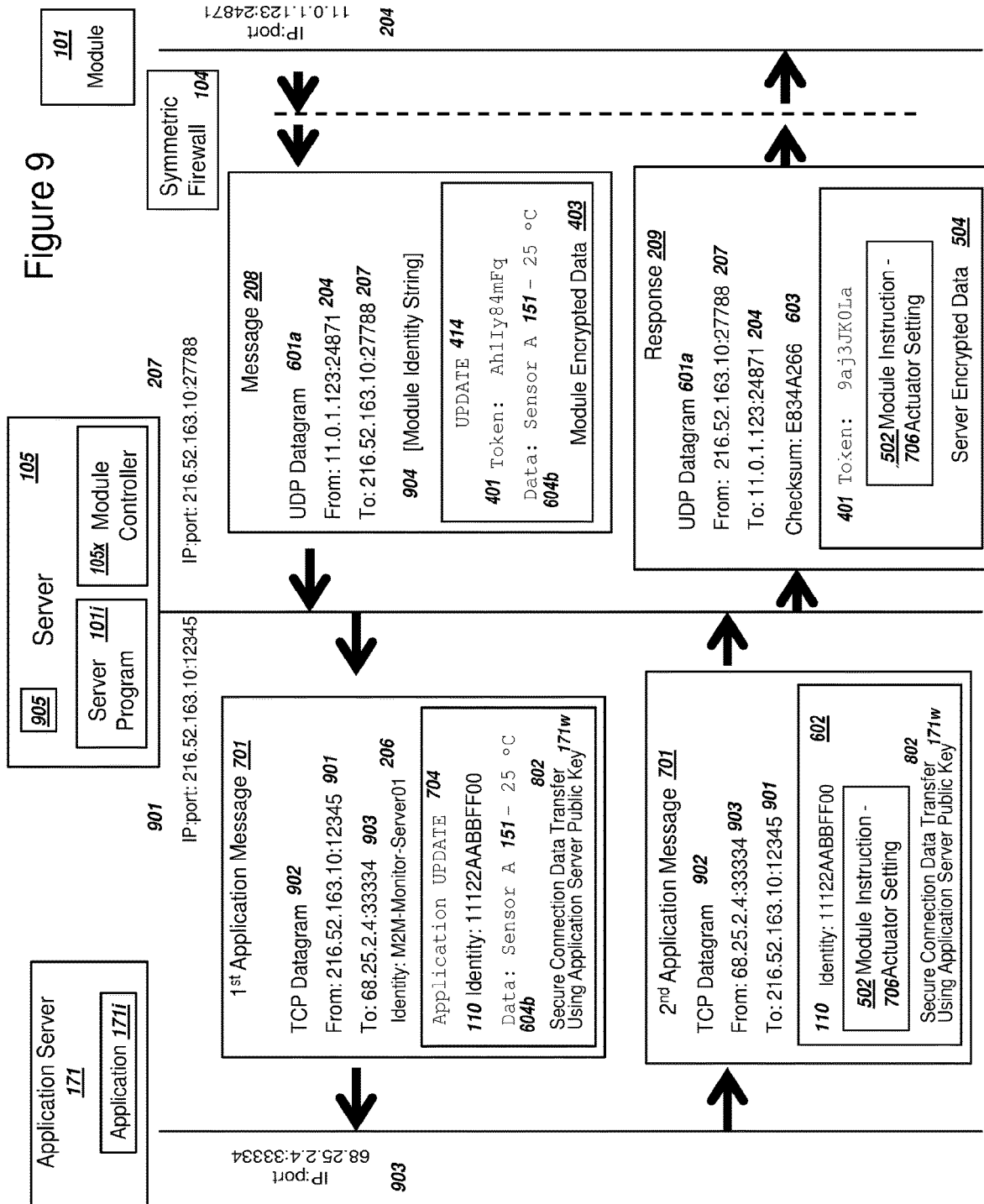
FIG. 9 is a simplified message flow diagram illustrating exemplary data transferred between (i) a server and an application and between (ii) a server and a module, in accordance with exemplary embodiments.

After verifying the identity of module 101 in step 315, at step 316 server 105 can record sensor data or sensor measurements within message 208 in a module database 105k, if message 208 has a sensor measurement. Note that message 208 may not have a sensor measurement, and in this case step 316 can be skipped, or message 208 may also include other data besides a sensor measurement. Sensor data recorded in module database 105k can be made available for subsequent processing by server 105 or other servers or applications associated with an M2M service provider 108 in order to manage the function and operation of module 101 or monitored unit 119. As illustrated in FIG. 7 through FIG. 9, received sensor data could also be forwarded by server 105 to an application server 171. Although not illustrated in FIG. 3, in an exemplary embodiment at step 316 server 105 could alternatively forward the sensor data to application 171i instead of recording the data in module database 105k.

After receiving message 208, server 105 can process a response 209 at step 317a. Step 317a can comprise encrypting an instruction, where the instruction could include an acknowledgement of the message received, a command or setting for an actuator, and/or another control message for module 101. Server 105 can utilize a module public key 111 and cryptographic algorithms 141 in order to encrypt the instruction. Step 317b can comprise creating a digital signature for the response 209 using the server private key 105c and cryptographic algorithms 141.

Additional details regarding steps 317a and 317b are depicted and described in connection with FIG. 5a below. Note that step 317a and/or step 317b may optionally be omitted, such that response 209 is transmitted without encryption and/or a signature, and security could be obtained through other means, such as through firewalls 104 and 124, or using a secured network link between module 101 and server 105, such as setting up a virtual private network (VPN) or SSH tunnel between the two endpoints. These alternative means for security at the network layer would likely require additional bandwidth and power consumption for a module 101 and thus may not be adequately efficient. As one example, if module 101 is a wireless module that sleeps for relatively long periods such as every hour (and obtains a new IP address for every wake period), setting up a new VPN between module 101 and server 105 in order to receive send a message from module 101 may not be practical due to the extra drain on a battery 101k for re-establishing the VPN. Or, only portions of steps 317a and 317b could be used, such that a response 209 (or a message 208 received in step 313) is not encrypted but a digital signature is used in the response 209 (or message 208).

After completing steps 317a and 317b, at step 209a, server 105 can send response 209 from (a) the source port utilized to receive message 208 to (b) a destination IP:port. The destination IP:port can comprise the source IP:port in message 208 as received by server 105, and the destination IP:port can represent the external interface of a firewall 104. In other words, server 105 may send response 209 from server IP:port 207 to the source IP:port received in message 208, which could represent the source IP:port on a wireless network firewall 104, wherein the source IP:port on the wireless network firewall 104 contains the firewall IP address 210. The wireless network firewall 104 could forward the response 209 to module IP:port 204. As contemplated herein, server 105 can send response 209 as soon as practical after receiving message 208, and in any case response 209 should be sent before the expiration of a firewall port binding timeout value 117 associated with firewall 104. According to a preferred exemplary embodiment, response 209 is sent by server 105 within 1 second of receiving message 208. After completing step 209a as illustrated in FIG. 3b, server 105 can return to step 312 and listen for or monitor for additional incoming messages 208 from modules 101.

FIG. 4

Figure 4:
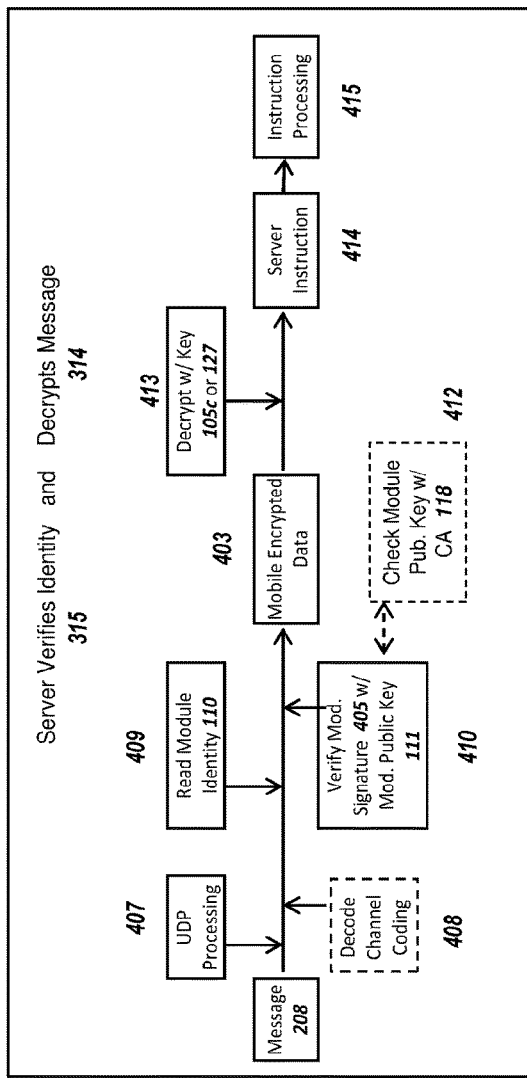
FIG. 4 a is a flow chart illustrating exemplary steps for a server to process a message, including verifying a module's identity and decrypting data, in accordance with exemplary embodiments.

FIG. 4 is a flow chart illustrating exemplary steps for a server to process a message, including verifying a module's identity and decrypting data, in accordance with exemplary embodiments. The steps illustrated in FIG. 4 may comprise step 315 and step 316 illustrated in FIG. 3 above. Server 105 can receive message 208 using IP:port 207, as illustrated in FIG. 2. Message 208 can be formatted according to the UDP protocol or UDP Lite protocol, although other possibilities exist as well without departing from the scope of the present invention At step 407, server 105 can process the packet using the appropriate transport layer protocol, such as UDP. In this step 407, the body of the packet comprising message 208 can be extracted, and a checksum, if any, can be calculated to verify the integrity. Note that if the UDP Lite protocol is utilized, the checksum may optionally only apply to the packet header. At step 408, server 105 can remove channel coding, if present in message 208. Channel coding techniques utilized in step 408 could include block codes and convolution codes, and can use the same channel coding algorithms used in channel coding algorithms implemented by module 101, depicted and described in connection with FIG. 5a below. By processing channel coding in step 408, server 105 can correct potential bit errors received in message 208, although channel coding 408 may be optionally omitted. As noted above, the use of channel coding 408 can be preferred in an embodiment, since any bit errors received within module encrypted data 403 in message 208 could break (i) a cryptographic algorithms 141 used by server 105 at subsequent steps 413, and/or (ii) the verification of module digital signature 405 at step 410 below.

At step 409, the server 105 can read and record the module identity 110, if module 110 is included in message 208 as external to module encrypted data 403 as illustrated in an exemplary message 208 in FIG. 6a below. Although not illustrated in FIG. 4, server 105 can select a module public key 111 for module 101 by querying a module database 105k with module identity 110. Module identity 110 could comprise a string or session identifier, whereby server 105 could derive or track a module identity 110 from one message 208 to the next message 208 using the string or session identifier. By including module identity 110 in a message 208, but external to module encrypted data 403 such as illustrated in FIG. 6a below, a server 105 can utilize module identity 110 in order to select a server private key 105c or symmetric key 127 for decrypting module encrypted data 403. According to an exemplary embodiment, a plurality of server private keys 105c could be utilized, where a first private key 105c is used with a first set of modules 101 and a second private key 105c is used with a second set of modules 101. The first and second private keys 105c could use or be associated with different sets of parameters 126. By reading the module identity 110 outside of module encrypted data 403, the module identity 110 can be read before decryption, in order to identify which of the first or second set server private keys 105c that a module 101 sending message 208 is associated with, and thus server 105 can subsequently select the first or second set of server private keys 105c to use when decrypting module encrypted data 403.

Alternatively according to an exemplary embodiment, if server 105 operates in a distributed environment (such as comprising multiple sub-servers 105w as illustrated in FIG. 1f), an unencrypted module identity 110, including a possibly a session identifier for module identity 110 within a message 208, can be utilized by a message preprocessor 105y to select the appropriate sub-server 105w to process the message 208. Server 105 using message preprocessor 105y could forward the message 208 to the correct sub-server 105w. At step 410, server 105 can validate and verify the module identity 110 using the module digital signature 405 inserted by module 101 in message 208. As described in FIG. 4a above, module digital signature 405 can comprise a secure hash signature or tag, where module 101 generated the hash signature using the module private key 112 and digital signature algorithms 141d. As one example, server 105 can utilize the module public key 111 recorded in memory 105e to securely validate the module digital signature 405 receive in a message 208.

The module digital signature 405 can be verified according to public key infrastructure (PKI) standards such as the National Institute of Standards (NIST) "FIPS 186-4: Digital Signature Standard", or IETF RFC 6979 titled "Deterministic Usage of the Digital Signature Algorithm (DSA) and Elliptic Curve Digital Signature Algorithm (ECDSA)". Other PKI standards or proprietary techniques for securely verifying a module digital signature 405 may be utilized as well. If message 208 comprises an initial communication from module 101, at step 412 server 105 can verify that module public key 111 is associated with module identity 110 using a module certificate 122, where certificate 122 includes a signature 123 from a certificate authority 118, as illustrated in FIG. 1h. Server 105 could receive certificate 122 before module 101 sends message 208, or server 105 could query module 101 or another server for certificate 122 after receiving message 208. Server 105 could use digital signature algorithms 141d to compare a secure hash calculated using (i) a first certificate 122 and/or public key from module 101 and (ii) a second certificate and/or public key from certificate authority 118 or another server, in order to confirm that module public key 111 is associated with module identity 110, where module identity 110 was read from message 208 in step 409. The secure hash could also be calculated using module public key 111 and a public key from certificate authority 118, and other possibilities using PKI exist as well for server 105 to confirm module public key 111 is associated with module identity 110 at step 412.

Steps 409 and 410 are not required to utilize the efficient techniques described herein, and may optionally be omitted. As one example, security could be maintained at the network layer through the use of wireless network firewall 104 and server network firewall 124, such that only an inbound message 208 to server 105 could be received by server 105 after security methods are applied at the network layer or application layer. Note that if (A) module encrypted data 403 includes module identity 110 and/or module digital signature 405, then (B) steps 409 and/or 410 may also take place after step 413, where server 105 (i) first decrypts module encrypted data 403 and can then (ii) verify module identity 110 by performing steps 409 and 410 after step 413. If module encrypted data 403 utilizes a symmetric cipher 141b, then a module identity 110 can preferably be external to module encrypted data 403 so that server 105 can select the appropriate symmetric key 127 used by module 101 in order to decipher module encrypted data 403 (since a plurality of modules 101 may communicate with server 105 concurrently).

After verifying module digital signature 405 in step 410, server 105 can record an authenticated module encrypted data 403 from module 101 received in message 208. At step 413, server 105 can decrypt module encrypted data 403 using cryptographic algorithms 141 and either (i) server private key 105c as a decryption key with asymmetric ciphering 141a or (ii) symmetric key 127 with symmetric ciphering 141b. A symmetric key 127 may be stored in a module database 105k, as noted in FIG. 1f above. If a symmetric key 127 is used at step 413, the symmetric key 127 could be (i) sent by server 105 in a response 209 or (ii) received by server 105 in a prior message 208, before the message 208 illustrated in FIG. 4 was received by server 105.

With an asymmetric ciphering 141a scheme used in a module encrypted data 403 and by cryptographic algorithms 141 at step 413, server 105 can decrypt module encrypted data 403 using (i) server private key 105c and (ii) RSA algorithms 153, elliptic curve cryptography (ECC) algorithms 154, or other algorithms for public key cryptography. The use and application of RSA algorithms 153 and cryptography are described within IETF RFC 3447, among other published standards. The use and application of ECC cryptography and algorithms are described within IETF RFC 6637, among other published standards. ECC algorithms 154 may be preferred in order to maintain high security with small key lengths, compared to RSA, in order to minimize the message lengths, radio frequency spectrum utilization, and processing power required by module 101. Thus, the use of ECC algorithms within a decryption algorithm at step 413 may help conserve the life of a battery 101k of module 101 while maintaining the objective of securing system 100. Note that module encrypted data 403 may also include a security token 401 (not shown in FIG. 4, but shown in FIG. 5a), which could comprise a random string, and thus each module encrypted data 403 received by server 105 in message 208 may be reasonably considered unique and thus robust against replay attacks.

With a symmetric ciphering 141b scheme used in a module encrypted data 403 and by cryptographic algorithms 141 at step 413, server 105 can decrypt module encrypted data 403 using (i) symmetric key 127 and (ii) a symmetric cipher 141b such as AES 155, Triple DES, or similar secure symmetric ciphers. As one example, by using ECC cryptography and ECIES, server 105 could decrypt module encrypted data at step 413 by using the steps outlined in FIG. 3, titled "ECIES Encryption Functional Diagram" in "A Survey of the Elliptic Curve Integrated Encryption Scheme" by Martinez et al in the Journal of Computer Science and Engineering, Volume 2, August 2010, page 11, (herein incorporated by reference). Other possibilities exist as well without departing from the scope of the present invention. Server 105 can utilize step 413 illustrated in FIG. 4 to extract the plaintext, or decrypted data within module encrypted data 403.

After decrypting module encrypted data 403, server 105 can read the resulting data within message 208, which could comprise a server instruction 414. The server instruction 414 can represent the purpose of the message 208 for server 105. Server instruction 414 could comprise a plurality of different procedures for server 105, such as an "update" with sensor data, a "query" for data or instructions from server 105 or M2M service provide 108, a "notification" of state or condition at module 101 such as an alarm or error, a "configuration request" where module 101 seeks configuration parameters, a "software request" where module 101 request updated software or routines, a "registration" message where module 101 periodically registers with server 105, etc. Thus, server instruction 414 can comprise the purpose module 101 sends message 208. In addition, server instruction 414 could comprise a "confirmation", where module 101 sends a "confirmation" in a second message 208 after receipt of a response 209, where response 209 could include a module instruction 502 (below), and the "confirmation" in this second message 208 could signal server 105 that the module instruction 502 had been properly executed. As contemplated herein, the term "Message (update)" can comprise a message 208 that includes a server instruction 414 of "update", and the term "Message (confirmation)" can comprise a message 208 that includes a server instruction 414 of "confirmation", etc.

As examples for server instruction 414, an "update" could be used to periodically notify server 105 of regular, periodic sensor data 305 acquired by a sensor 101f. An "update" for server instruction 414 may also comprise a periodic report regarding monitored unit 119 or information regarding a state, condition, or level for an actuator 101y. A "query" for server instruction 414 could comprise module 101 querying server 105 for data from a module database 105k, where the data could be associated with monitored unit 119, wireless network 102, an element within module 101 such as an actuator setting. A "notification" for server instruction 414 could comprise module 101 notifying server 105 that an alarm or error condition has occurred, such as a sensor measurement exceeds a threshold value or another error condition such as loss of contact with monitored unit 119. A "configuration request" for server instruction 414 could comprise module 101 requesting server 105 for configuration parameters or a configuration file. Other possibilities for server instruction 414 exist without departing from the scope of the present invention.

At step 415, server 105 can process the server instruction 414. If server instruction 414 comprises an "update", then sensor data, or other data in server instruction 414 including potentially a new symmetric key 127 generated by module 101, could be recorded in module database 105k, Other applications may subsequently access the sensor data for generating reports or making decisions regarding monitored unit 119. If server instruction 414 comprises a "query", then server 105 could execute the query at step 415. If server instruction 414 comprises a "notification" of an alarm, then step 415 could initiate procedures for alarm notification to 3rd parties or alarm resolution. Other possibilities for processing a server instruction 414 at step 415 exist without departing from the scope of the present invention.

FIG. 5a

Figure 5A:
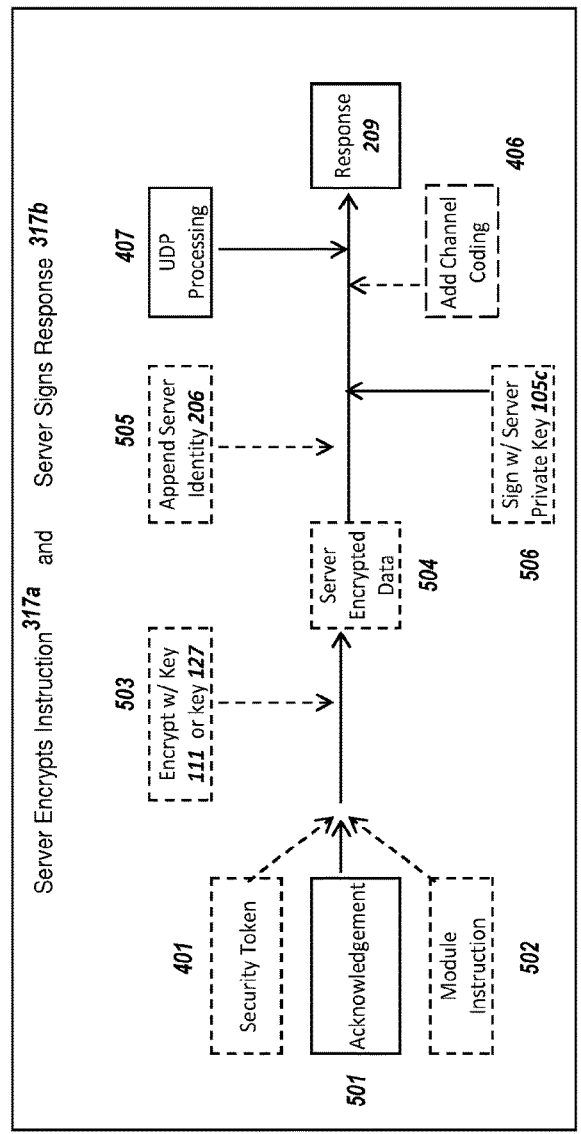
FIG. 5a is a flow chart illustrating exemplary steps for a server to process a response for a module, including sending and signing an module instruction, in accordance with exemplary embodiments.

FIG. 5a is a flow chart illustrating exemplary steps for a server to process a response for a module, including sending and signing a module instruction, in accordance with exemplary embodiments. The steps illustrated in FIG. 5a may comprise step 317a and step 317b illustrated in FIG. 3 above. Since message 208 and response 209 may traverse the public Internet 107, a module 101 and a server 105 may prefer to take additional steps to sending plaintext in packets in order to maintain security of a system 100. Server 105 can process a response 209 to a message 208 from module 101 using a module public key 111 and a server private key 105c, according to a preferred exemplary embodiment. If a symmetric cipher 141b is utilized within cryptographic algorithms 141, then server 105 may also utilize a symmetric key 127 to encrypt data within a response 209. Note that the security methods described herein are optional, and message 208 and response 208 can be sent without any or all of the additional security steps described herein, but the use of these security steps may be preferred.

After receiving message 208 as illustrated in FIG. 2, server 105 can prepare an acknowledgement 501. The acknowledgement 501 can be a simple text, binary, or hexadecimal string to confirm that message 208 has been received and/or processed by server 105. Since message 208 may be transmitted via a UDP or UDP Lite packet, module 101 may preferably utilize a reply message from server 105 containing acknowledgement 501, in order to confirm message 208 has been received by server 105. Alternatively, if TCP is used to transmit message 208, an acknowledgement 501 may be used at the application layer of the Open Systems Interconnection (OSI) model, wherein a simple TCP ACK message may operate at the lower transport layer than the application layer. UDP may be preferred over TCP in order to reduce processing resources for module 101 and server 105, especially considering the relatively small and comparably infrequent messages sent between a module 101 and a server 105 (when compared to web browsing and considering module 101 may have a battery 101k that may preferably last for weeks or longer without recharging). In processing a response 209, server 105 may optionally add a security token 401, which could be a random number 128a, or a randomly generated text, binary, or hexadecimal string. Security token 401 could be a random number 128a or string that is included in response 209 in order to make each response 209 unique and thus avoid any replay attacks when response 209 traverses Internet 107. Note that a message 208 may also preferably include a security token 401.

In other words, the use of security token 401 can ensure to a high level of certainty that each response 209 will be different and thus the data within response 209 would not be sent more than once. Note that security token 401 may be generated by module 101 in message 208, and in this case server 105 can use the same security token received in message 208. Security token 401 can alternatively be generated by server 105 and different than any security token 401 received in message 208. As one example, server 105 could use a first security token 401 received in message 208 to process a second security token 401, where the second security token 401 is generated using (i) a pre-agreed algorithm between module 101 and server 105 and (ii) the first security token 401 as input into the pre-agreed algorithm. Security token 401 illustrated in FIG. 5a can be derived or processed by using message 208 in accordance with preferred exemplary embodiments.

Server 105 may also optionally add a module instruction 502 when preparing a response 209. The module instruction 502 could be a string that contains instructions or configuration parameters for module 101, such as an order to change state, parameters regarding the monitoring of monitored unit 119, server names or addresses, radio frequency parameters, wireless network 102 authentication parameters or keys, keys for communication with server 105 or M2M service provider 108, etc. Module instruction 502 may also comprise an instruction to change the state of actuator 101y, a timer value, a sensor threshold value, the threshold for an alarm state, and information for display at a user interface 101j, an instruction to sleep, etc. Module instruction 502 may further comprise an updated module private key 112, and updated server public key 114, or the address or name of a new server 105 added to M2M service provider 108. According to an exemplary preferred embodiment, a module instruction 502 could comprise a "key generation" instruction, where module 101 generates a new pair of a module private key 112 and a module public key 111, utilizing the exemplary steps and procedures illustrated in FIG. 5b below. The "key generation" 608 module instruction 502 (illustrated in FIG. 6a below) could be used to create new keys for a new purpose (such as connecting to a new wireless network 102 or communicating with a new server 105), while the existing keys used to communicate with server 105 could remain operable or be deprecated at a later time. Alternatively, an existing module public key 111 could be deprecated or become invalid once server 105 sends a "key generation" module instruction 502.

In order to control module 101, server 105 would normally need to include module instruction 502 in the response 209 only after receiving message 208, since the server 105 would normally not be able to send messages to a module 101 at arbitrary times, such as before a message 208 has been received by the server 105. The reasons include (i) the module may normally be in a sleep or dormant state, in order to conserve battery life or power consumption, where an unsolicited incoming Internet packet from server 105 would not be received by module 101, and (ii) a wireless network 102 (or equivalent wired network that a wired module 101 could connect with) may frequently include a firewall 104. Firewall 104 could prevent packets from the Internet 107 from reaching module 101 unless module 101 had previously first sent a packet to server 105 within a firewall port-binding timeout period 117 of firewall 104. The port-binding timeout period of a firewall 104 may be an exemplary period such as 20-60 seconds for UDP packets and several minutes for TCP packets. Note that module instruction 502 may optionally be omitted, such that (b) some response 209 messages may include module instruction 502, and (b) other response 209 messages may omit module instruction 502, but include an acknowledgement 501 to message 208. Also note that according to an exemplary embodiment described herein, the use of optional strings or steps can be depicted in FIGS. 4 and 5a through the use of dashed lines for the various elements illustrated.

Server 105 may then use as input the acknowledgement 501, security token 401, and module instruction 502, including optional data and parameters 126, into cryptographic algorithms 141 at step 503. The cryptographic algorithms 141 at step 503 can utilize either (i) module public key 111 as an encryption key if asymmetric ciphering 141a is utilized, or (ii) a shared symmetric key 127 if a symmetric cipher 141b is utilized, such as AES 155 ciphering. The output of cryptographic algorithms 141 at step 503, using acknowledgement 501, security token 401, and module instruction 502, plus optional data and parameters 126, as input, can be server encrypted data 504, as illustrated in FIG. 5a. Server encrypted data 504 could be a string or number, including a text, binary, or hexadecimal string or series of numbers or bits, and other possibilities for the formal of server encrypted data 504 exist as well, including a file, without departing from the scope of the present invention. By using module public key 111 and/or symmetric key 127 in the cryptographic algorithms 141 at step 503, server encrypted data 504 may only be reasonably decrypted by module 101 using module private key 112 and/or symmetric key 127. Thus the response 209 transmitted across an Internet 107 may be reasonably considered secure and only reasonably decrypted by module 101.

Server 105 can then process server encrypted data 504 by appending or including server identity 206. Note that server identity 206 can be appended or included after the operation of step 503, since the server identity 206 may optionally be openly readable within a response 209 transmitted or sent to module 101. As one example, server identity 206 could comprise IP address 106 as a source IP address in response 209, which would be openly readable on the Internet 107 since a valid packet must have a source and destination IP address. Additional details on an exemplary structure of response 209 are illustrated in FIG. 6a below. By including server identity 206 after encryption at step 503, the module can read the server identity 206 and verify a digital signature within response 209 without having to first decrypt data within response 209 using the module private key 112 or symmetric key 127. Note that server identity 206 could alternatively be included within server encrypted data 504, such that step 505 takes place before step 504. In other words, including server identity 206 external to a server encrypted data 504 can be used by module 101 to select the proper server public key 114 when verifying a digital signature in response 209.

Server 105 can then process a server digital signature 506 using the server private key 105c. The server digital signature 506 can be processed according to public key infrastructure (PKI) standards such as the National Institute of Standards (NIST) "FIPS 186-4: Digital Signature Standard" (which is hereby incorporated herein by reference), or IETF RFC 6979 titled "Deterministic Usage of the Digital Signature Algorithm (DSA) and Elliptic Curve Digital Signature Algorithm (ECDSA)" (which is hereby incorporated herein by reference). The use of a server digital signature 506 can be processed according to the description of a digital signature according to the Wikipedia entry for "Digital Signature" as of Sep. 9, 2013, which is incorporated by reference herein in its entirety. Also note that other uses of a digital signature as contemplated within the present invention may refer to the above three references and related standard techniques for processing and creating digital signatures. Other PKI standards or proprietary methods for securely generating a server digital signature 506 may be utilized as well.

According to a preferred exemplary embodiment, ECC algorithms for generating server digital signature 506 may be utilized in order to minimize the key length compared to RSA algorithms. Server digital signature 506 may comprise a secure hash signature using a hash algorithm such as secure hash algorithm 1 (SHA-1), or subsequent standards such as SHA-2 and SHA-3, and other possibilities exist as well. Server digital signature 506 is illustrated in FIG. 5a as being processed after server encrypted data 504, but server digital signature 506 may also optionally be included in server encrypted data 504. Step 506 may also take place before step 505.

Also note that server digital signature 506 may preferably be included in a response 209 before module 101 begins either (i) utilizing a symmetric key 127 shown in step 413 to encrypt a module encrypted data 403, or (ii) accept or process a module instruction 502. After including server digital signature 506 in a first response 209 that uses asymmetric ciphering 141a, server 105 may omit server digital signature 506 in a second subsequent response. The second subsequent response could be a case where (i) server encrypted data 504 utilizes a symmetric key 127 for ciphering (where server 105 received the symmetric key 127 in a message 208 that utilized asymmetric ciphering 141a as illustrated in FIG. 4 above) and (ii) expiration time 133 of symmetric key 127 has not transpired.

Although energy may be conserved for a module 101 utilizing the exemplary steps illustrated in FIG. 5a and elsewhere herein, a high level of security is desirable for many "machine-to-machine" applications. A module 101 may be utilized for industrial applications or health monitoring, where the receipt of unauthorized module instructions 502 from 3rd parties could results in damages or losses. Without proper security that can include the steps illustrated in FIG. 5a, response 209 could include a module instruction 502, and module 101 could potentially receive commands or instructions from sources other than server 105, such as hackers.

FIG. 5b

Figure 5B:
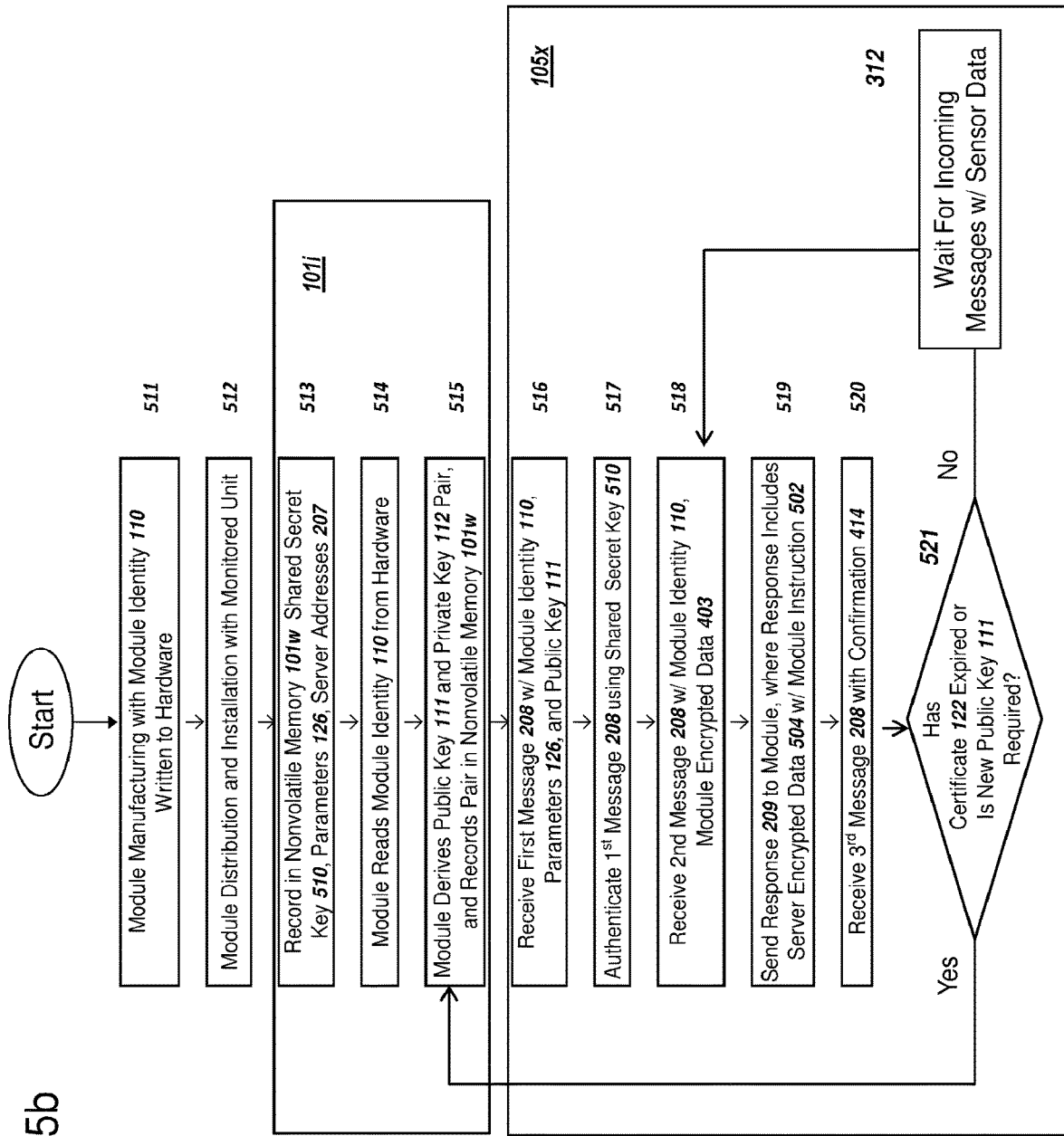
FIG. 5b is a flow chart illustrating exemplary steps for a server to communicate with a module that has derived a public key and private key, in accordance with exemplary embodiments.

FIG. 5b is a flow chart illustrating exemplary steps for a server to communicate with a module that has derived a public key and private key, in accordance with exemplary embodiments. In order to utilize communications secured with PKI techniques such as private keys, public keys, certificates, and identities, a module 101 may preferably obtain or generate these keys and utilize a module identity 110 and/or a certificate 122 in a secure manner. Given that a plurality of modules 101 may be deployed in potentially remote places, without frequent contact with end users or technicians, the use of secure PKI techniques for a module 101 can create a significant set of challenges for the generation of module public key 111 and module private key 112, as well as properly and securely obtaining a certificate 122 with an module identity 110. Using conventional technology, significant challenges and costs can be incurred when (i) module 101 has already been deployed, such as collecting data from a monitored unit 119, and (ii) module 101 needs to utilize a new set of module private key 112 and module public key 111.

Exemplary embodiments that include derivation or processing of a new module private key 112 and module public key 111 may utilize the particular steps and procedures contemplated herein, in order to minimize any potential human intervention (with related costs) while continuing to maintain or also enhance security, compared either (i) externally generating module private key 112, and/or (ii) continuing to use the same module private key 112 for the lifetime of module 101. Over a long period of operating time for a module 101, such as several years or longer, there may be many reasons module 101 may need a new pair of PKI keys, such as (i) expiration of a certificate 122, or the certificate 122 of a parent signature authority, (ii) the transfer of ownership or control of module 101, where the prior ownership could have direct or indirect access to the module private key 112, (iii) supporting a new server 105 that has different security requirements or a different set of parameters 126 (longer keys, different ECC curves, different cryptographic algorithms 141, etc.), and/or (iv) revocation of a public key in a chain of signatures 123 associated with a certificate 122. In the case of (ii) above, new ownership of module 101 may require a module 101 to utilize a new module private key 112 since the old ownership may have access to an old module private key 122. In the case of (iii) above, a new server 105 may require a pair of public/private keys incompatible with a prior set of public/private keys utilized by module 101 and/or a certificate 122 for module 101.

Other possibilities exist as well for reasons why a module 101 and/or server 105 may prefer for a module 101 to utilize a new module public key 111 and new module private key 112. In an exemplary embodiment, module 101 may generate a new public/private key periodically in order to enhance the security of a system 100. A benefit of a system 100 supporting periodic generation of keys by module 101 is that the key length can be shortened in order to obtain a similar level of security, and the processing power and energy consumption, possibly from a battery 105k, can be reduced through the use of shorter key lengths. In other words, over time such as several months or years, the use of a plurality of different pairs of public/private keys for module 101 with shorter key lengths can be both more secure and energy efficient than using a single pair of public/private keys with a longer key length for the lifetime of module 101. Shorter key lengths may also be more compatible with processing power constraints of a module 101. Thus, in exemplary embodiments, module 101 and/or server 105 may prefer for module 101 to periodically generate new public and private keys.

The general approach adopted by most mobile phone networks over the past two decades has been founded upon the use of a pre-shared secret key recorded in SIM cards, such as the Ki pre-shared secret key in 2G and 3G networks. That approach may work for mobile phones, where the SIMs can often be easily replaced, but the use of a pre-shared secret key in a SIM may not be suitable for a module 101 and M2M service provider 108 for many circumstances. As one example, significant costs may be incurred by swapping out a SIM card for already deployed modules 101, especially if they are in remote locations or continually moving such as a tracking device on a container, pallet, truck, or automobile. In an exemplary embodiment, a module 101 may preferably record multiple pairs of public/private keys 111/112 for various and different functions, such as connecting to different servers 105, connecting to different wireless networks 102, etc. As contemplated herein, recording more than one public/private key 111/112 can comprise module 101 recording a plurality of pairs of module public keys 111 and module private keys 112. In exemplary embodiments, one pair comprising a first module public key 111 and a first module private key 112 can be identified or selected from a different pair comprising a second module public key 111 and a second module private key 112 using a module public key identity 111a.

The number of pairs of public/private keys useful to a module 101 concurrently could be several, such as an exemplary three or more actively used public/private keys, although other possibilities exist as well. Manually trying to change or add a new SIM card each time a new security key is required may not be efficient or feasible. Or in another exemplary embodiment, the multiple pairs of private and public keys could be used in sequence, such that module 101 with server 105 utilizes a single module public key 111 and module private key 112 at any given point in time. In the case where module 101 (i) uses more than one private key 112 and more than one public key 111 and (ii) derives at least one module private key 112 and one public key 111 during the lifetime of module 101, this case may be considered module 101 using a plurality of module private keys 112 and using a plurality of module public keys 111. In the case where module 101 derives or generates more than one module private key 112 and module public key 111 during the lifetime of module 101, this case may be considered module 101 deriving a plurality of module private keys 112 and module public keys 111, or also deriving a plurality of pairs of module public keys 111 and module private keys 112. The various pairs in the plurality may use different sets of parameters 126 or the same set of parameters 126. The plurality of module public keys 111 and module private keys 112 can be processed by a CPU 101b with key pair generation algorithms 141e and a random number generator 128. The random number generator 128 can use input from a sensor 101f, a radio 101z, and/or temporary random seed file.

In exemplary embodiments, module 101 can use a module public key 111 for sending a module encrypted data 403 or receiving a server encrypted data 504 by either (i) sending the module public key 111 to a server 105 in order to allow the module encrypted data 403 to be decrypted (such as using a step 413) or the server encrypted data 504 to be encrypted (such as using a step 503), or (ii) inputting the module public key 111 into a key derivation function 141f in order to derive or process a derived shared secret key 129b, which could be used with a symmetric key 127. Other possibilities exist as well for module 101 to use its own public key 111 with cryptographic algorithms for communicating with a server 105.

FIG. 5b illustrates exemplary steps that can be performed with module 101, including using a module program 101i, for generating, deriving, and/or updating a module public key 111 and module private key 112. The steps illustrated in FIG. 5b include both (i) an "initial" or "startup" case where module 101 has not previously derived keys (or keys not internally derived may not have been loaded), and (ii) a subsequent or "follow on" time where module 101 can generate or derive keys after keys were initially obtained or derived. Note that efficient and secure methods and systems contemplated herein, including in FIG. 5b, may also be utilized with a regular consumer mobile phone, or smartphone, as a module 101. Mobile phones as module 101 can benefit from (i) deriving a module public key 111 and a module private key 112, (ii) sending module encrypted data 403 in a message 208 using the derived keys, and (iii) receiving a server encrypted data 504 in a response 209 also using the derived keys. In the exemplary embodiment where module 101 comprises a mobile phone, then sensor 101f may comprise a microphone and actuator 101y may comprise a speaker, and other possibilities exist as well to those of ordinary skill in the art for module 101 to comprise a mobile phone.

At step 511, during manufacturing of module 101, including manufacturing of subcomponents such as a circuit board, assembly of hardware components illustrated in FIG. 1b, etc., a module identity 110 could be written into the hardware, and could comprise a serial number, International Mobile Equipment Identity (IMEI) number, Ethernet MAC address, or a similar persistent identification for a module 101. An IEMI number may be used with a mobile phone as module 101, in a preferred embodiment. For security purposes, the module identity 110 may preferably be written into a read-only location, such as a readable location on a system bus 101*d*, which could also comprise a ROM 101*c*. Recording and utilizing module identity 110 is also depicted and described in connection with FIG. 1*e*, FIG. 2, and elsewhere herein. Alternatively, module identity 110 could be recorded in a non-volatile memory such as a flash memory 101*w*.

At step 512, module 101 can be distributed to end users and also installed with a monitored unit 119. If module 101 is a mobile phone, then monitored unit 119 could be a person that carries the mobile phone. Also note that a monitored unit 119 could be omitted, and a module 101 could use the techniques contemplated herein. At step 513, a shared secret key 510, parameters 126, and a server address 207 can be recorded in a nonvolatile memory 101*w*. Parameters 126 may comprise settings for a cryptographic algorithms 141 as illustrated in FIG. 1*g*, including (i) key lengths, (ii) algorithms to utilize for key generation or ciphering, such as selecting RSA algorithms 153 or ECC algorithms 154, (iii) a specific secure hash algorithm 141*c* to utilize, such as SHA-256 or SHA-3, (iv) an expiration date of the module public key 111, (v) a maximum time value for an expiration time 133 associated with a symmetric key 127, (vi) a ECC parameters 137 or an ECC standard curve 138 as parameters 126 in FIG. 1*h*, (vii) the specification of or values for a padding scheme for use with a digital signature algorithms 141*d*, and/or similar or related values for using cryptographic algorithms 141*d*. Although not illustrated in FIG. 5*b*, at step 512 a configuration file could also be loaded into non-volatile memory, where the configuration file includes a plurality of fields specifying the operation of module 101. The shared secret key 510, parameters 126, and server address 207 could be included in a configuration file.

Continuing at step 513, server identity 206 could be utilized in place of or in addition to server address 207, and in this case module 101 can later perform a DNS or DNSSEC lookup using server identity 206 in order to obtain server address 207 for use in a message 208, such as the destination address. Shared secret key 510 and server address 207 (or server identity 206) could also be recorded in a ROM 101*c* at step 513. Step 513 may also be performed concurrently with step 511 or step 512. According to an exemplary embodiment, a manufacturer may perform step 513 and in this case step 513 could take place concurrently with step 511. In another embodiment, a distributor of module 101 could perform step 513 and in this case step 513 could take place concurrently with step 512. Alternatively, step 513 may be performed by a technician or end user after manufacturing and distribution and before module 101 begins collecting sensor data with a monitored unit. Other possibilities exist as well for the sequence of steps 511 through 513 illustrated in FIG. 5*b* without departing from the scope of the present invention.

Note that step 513 may take place multiple times during the lifetime of a module 101, and in this case (a) the first time step 513 is conducted, step 513 could be conducted concurrent with steps 511 or 512, and (b) a subsequent time step 513 is conducted, step 513 could be conducted after the receipt of a response 209, where the response 209 includes a second shared secret key 510, server address 207, and also potentially a new module identity 110. In other words, although not illustrated in FIG. 5*b*, a module 101 could return to step 513 from later steps upon the equivalent of a "factory reset", or similar command where flash memory 101*w* and other nonvolatile memory would be cleared. In an exemplary embodiment where step 513 takes place a second time may potentially be the transfer of ownership or control of module 101, or a another embodiment where step 513 takes place a second time could be the upload of new firmware that is incompatible with a previous configuration file. In any case, shared secret key 510 can preferably be uniquely associated with module 101 (i.e. any given shared secret key 510 may belong only to an individual module 101).

Shared secret key 510 may comprise a pre-shared secret key 129*a*, as described in FIG. 1*e*. If module 101 has already derived a module private key 112 and module public key 111 (such as when step 513 is being conducted at a second or additional time as contemplated in the previous paragraph), then shared secret key 510 may comprise (i) a key received in a server encrypted data 504 including possibly a symmetric key 127, or (ii) a derived shared secret key 129*b*. Derived shared secret key 129*b* could be obtained from using a key derivation function 141*f* and module public key 111 and server public key 114, using a module public key 111 that has already been derived or used by module 101 (such as if at least one module private key 112 and module public key 111 had already been used or derived before step 513).

As contemplated herein in an exemplary embodiment, an first module private key 112 and first module public key 111 could be derived outside module 101 and loaded into a nonvolatile memory such as flash memory 101*w* at a prior time before step 513, and the shared secret key 510 could be received by module 101 using the first module private key 112 and module public key 111 (such as receiving the shared secret key 510 in a server encrypted data 504 using the first module private key 112 which had been loaded). Step 513 could then comprise a later time after the server encrypted data 504 has been received that includes the shared secret key 510, where module 101 may (i) prefer to begin utilizing keys that module 101 internally derives using cryptographic algorithms 141 instead of (ii) continuing to use the first module public key 111 and module private key 112 that were derived outside of the module 101, such as possibly loaded into a nonvolatile memory from an external source.

In the embodiment where shared secret key 510 has not been received by module 101 in a server encrypted data 504, shared secret key 510 could be obtained and loaded by a distributor, installer, or end user into a nonvolatile memory such as flash memory 101*w* in the form of a pre-shared secret key 129*a*, where pre-shared secret key 129*a* was obtained using a module identity 110 and pre-shared secret key code 134 as depicted and described in connection with FIG. 1*e* above. Module 101 could also utilize a first pre-shared secret key 129*a*, including a first pre-shared secret key 129*a* entered by potentially a distributor, installer, or end-user described in FIG. 1*e*, to derive shared secret key 510. Other possibilities exist as well for shared secret key 510, and shared secret key 510 can be useful for the proper identification and/or authentication of module 101 upon module 101's generation of a private key 112 and public key 111, as described below including step 517. If module 101 is a mobile phone, as contemplated herein, shared secret key 510 could be loaded by a distributor or company selling or servicing the mobile phone, or shared secret key 510 could be obtained by the end user or subscriber accessing a web page associated with a mobile operator for a wireless network 102 associated with the mobile phone and/or SIM card.

Also note that as contemplated herein, an initial module private key 112 and initial module public key 111 could be recorded into nonvolatile memory at step 513. For example, a manufacturer, distributor, installer, technician, or end-user could load the initial module private key and initial module public key 111, where the initial module public key 111 would be utilized to authenticate at step 517 a subsequent set of public/private keys derived by module 101 at step 515. In this case, the initial module public key 111 and/or initial module private key 112 described in the previous two sentences could comprise the shared secret key 510. One reason the initial module private key 112 with the initial module public key 111 would comprise a shared secret key 510 may be that (i) the initial module private key 112 and initial module public key 111 together have been "shared" in the sense that the initial module private key 112 has been located outside module 101 and in possession of an entity such as the manufacturer, distributor, installer, technician, or end-user in order to load the initial module private key into a nonvolatile memory such as flash memory 101w (and initial module public key 111 is subsequently shared with server 105), (ii) the initial module private key 112 and initial module public key 111 can be used to authenticate a subsequent message 208 containing a public key internally derived by the module at step 517 below, and (iii) the initial module private key 112 would remain "secret" in the sense that it is not publicly shared (i.e. an initial or "loaded" module private key 112 could preferably kept confidential and thus part of a "shared secret key"). Thus, FIG. 5b also contemplates an embodiment where shared secret key 510 at step 513 comprises an initial public/private key pair for module 101 that is not internally derived by module 101, including keys derived at step 515.

Note that the contemplation of the use of shared secret key 510 as a pre-shared secret key 129a within the present invention may be different than the use of a pre-shared secret key within a SIM card as commonly supported by wireless networks 102 with mobile phones in 2013. Specifically, as depicted and described in connection with FIG. 1e and elsewhere herein, the shared secret key 510, either (i) comprising a pre-shared secret key 129a or (ii) derived from a pre-shared secret key 129a, may be moved by CPU 101b into a volatile memory such as RAM 101e, with subsequent access by cryptographic algorithms 141. In contrast, the pre-shared secret key within a SIM card for mobile phones is usually designed to prevent movement of the pre-shared secret key within a SIM into RAM 101e.

If a SIM card is present within module 101, and the SIM card contains a pre-shared secret key, such as Ki, then as contemplated herein, shared secret key 510 may be derived using the SIM card and Ki. As one example, module 101 could (i) utilize a RAND message, potentially received from a 3G or 4G mobile network such as wireless network 102, and (ii) input the RAND into the SIM card and receive a response RES (or SRES), and utilize the string in RES to process or derive a shared secret key 510. Response RES could also comprise a shared secret key 510. Server 105 could also submit the same RAND associated with the SIM card and Ki to wireless network 102, and receive the same RES as obtained by module 101. By both module 101 and server 105 having the same RES value, they can follow a pre-agreed series of steps to use the same RES in order to derive a commonly shared secret key 510 (or the shared RES could comprise a shared secret key 510). In one embodiment where module 101 includes a SIM card for a wireless network 102, such as a 4G LTE network, module 101 and server 105 could both utilize a key derivation function 141f, using the same RES as input, in order to derive the same shared secret key 510.

At step 514, module 101 can read module identity 110 using a read-only address. Module 101 can read module identity 110 directly from read-only hardware address by using system bus 101d, including from a ROM 101c, or module 101 can read module identity 110 from a nonvolatile memory such as a flash memory 101w. Thus, the read-only address could comprise an address accessible on system bus 101d that is designated read-only for a period of time. The module identity 110 could be recorded into a flash memory 101w by module 110 after a prior read of module identity 110 from a read-only address. In this case (module 101 taking the step described in the previous sentence), reading module identity 110 from the nonvolatile memory at step 514 can also comprise module 101 reading module identity 110 using a read-only address. Thus, although module 101 may read module identity 110 from a flash memory 101w, if (a) module 101 initially utilized a read-only address to record the module identity 110 into the flash memory 101w, then (b) reading module identity 110 from the flash memory 101w could comprise using a read-only address to read module identity 110. Other possibilities exist as well, such as the address that includes module identity 110 in either (i) a nonvolatile memory such as a ROM 101c or (ii) an address accessible on system bus 101d, could be designated for a period of time as available for a read-only operation. Step 514 could also take place after step 515 below.

At Step 515, module 101 can derive module private key 112 and a corresponding module public key 111 using (i) random number generator 128, (ii) parameters 126, (iii) cryptographic algorithms 141, and/or (iv) a key pair generation algorithm 141e. Module 101 at step 515 and elsewhere in the present invention can be a mobile phone such as a smartphone. Private key 112 and corresponding module public key 111 can be derived according to a wide range of parameters 126, and can utilize different algorithms for different pairs of keys, such as RSA 153 or ECC 154. Key derivation at step 515 could generate keys of various lengths, such as 2048 bits with RSA 153 or 283 bits with ECC 154, and other possibilities exist as well. If using ECC 154 to derive a pair of keys for module 101, step 515 could also accommodate the use of different elliptic curves for compatibility with server 105, such as the use of odd-characteristic curves, Koblitz curves, and making sure the derived keys by module 101 use a compatible or identical elliptic curve or defined elliptic curve equation as server 105, etc. Module 101 can use ECC parameters 137 or an ECC standard curve 138 in a parameters 126 to derive module private key 112 and/or module public key 111.

Deriving keys in step 515 could also comprise using values such as constants or variables in a parameters 126 to define an elliptic curve equation for use with an ECC algorithm 154. The values or constants to define an equation for an elliptic curve could be input into a key pair generation algorithms 141e in the form of ECC parameters 137 or an ECC standard curve 138. In an exemplary embodiment, where a parameters 126 does not include constants and variables for defining an elliptic curve equation, a key pair generation algorithms 141e could use pre-defined elliptic curves with ECC algorithms 154 such as standardized, named curves in ECC standard curve 138 including exemplary values such as sect283k1, sect283r1, sect409k1, sect409r1, etc. Exemplary, standardized named curves, as opposed to module 101 and server 105 using an internally generated elliptic curve equation using parameters 126, are also identified as example curves in IETF RFC 5480, titled "Elliptic Curve Cryptography Subject Public Key Information". Thus, module 101 could use either standardized elliptic curves, or a separate defined elliptic curve equation as specified in a parameters 126.

The curve for module 101 to utilize in deriving module public key 111 and module private key 112 at step 515 could be specified in parameters 126. Consequently, the parameters of keys generated by module 101 at step 515 (including key length or algorithms utilized) may be selected based upon the requirements of the application and can be included in a parameters 126. When deriving keys at step 515, module 101 may also preferably utilize data from sensor 101f, radio 101z, a bus 101d, a physical interface 101a, memory 101e, and/or a clock in order to generate a seed 129 for random number generator 128, or random number generator 128 could utilize these inputs directly. A random number 128a can be input into key pair generation algorithm 141e in order to derive the module public key 111 and module private key 112. Note that with ECC algorithms 154, a module private key 112 can be a random number 128a in one embodiment, and the module public key 111 can be derived with a key pair generation algorithms 141e using the module private key 112 comprising the random number 128a.

Upon key derivation at step 515, module private key 112 and module public key 111 can be recorded in a nonvolatile memory 101w. Module private key 112 is preferably not transmitted or sent outside module 101. Note that module 101's internal derivation, or processing or creation, of module private key 112 and corresponding module public key 111 can have many benefits. First, module private key 112 does not need to be recorded in any other location than within module 101, and thus may also be considered not shared. Recording module private key 112 only within module 101 avoids potential security risks of (i) storing or recording module private key 112 in other locations, such as with module provider 109, M2M service provider 108, or an installer or end user of module 101, and (ii) transferring module private key 112 to and/or from these other locations. One security risk from storage of module private key 112 outside module 101 is that unauthorized 3rd parties may gain access to the module private key 112.

Also note that over a potential lifetime of a decade or more of operation of module 101, each time a new module private key 112 may be required (for various potential reasons outlined above), the external recording and/or transferring of module private key 112 incurs a potential security risk. Security risks can be compounded if the external location records private keys 112 for a plurality of modules 101. Also, by internally generating private key 112 at step 515, module 101 can overcome significant limitations and costs requiring the distribution of a pre-shared secret key Ki in the form of a SIM card or similar physical distribution of a pre-shared secret key, after module 101 begins operations. In comparison, the use of a shared secret key 510 in the present invention does not require physical distribution of a new shared secret key 510 after module 101 begins operations. Module 101's key derivation could be triggered by either (i) a bootloader program 125, where the bootloader program 125 determines that memory within module 101 does not contain a module private key 112, or (ii) via a module instruction 502 such as a "key generation" command in a response 209 from a server, and other possibilities exist as well.

Note that module 101's generation of keys after deployment and installation may create challenges for authentication of a new module public key 111 with module identity 110, since module 101 may be connecting to server 105 or M2M service provider 108 via the Internet 107. After module 101 creates new module public key 111 and module private key 112 at step 515, at step 516 server 105 can receive a message 208 with the module identity 110, the new module public key 111, and parameters 126. Parameters 126 in message 208 at step 516 can represent the parameters 126 used to generate the module public key 111. The sub-steps for a server 105 to receive a message 208 are also depicted and described in connection with FIG. 2 above. Parameters 126 within a message 208 can comprise descriptive values for new module public key 111. Note that at step 516, server 105 does not need to receive new module public key 111 in the form of a certificate 122 (although it could be in the form of a certificate 122). New module public key 111 could be received by server 105 within a string or field within a body 602 of a TCP/UDP packet 601a, illustrated in FIG. 6b below. As depicted in step 516 shown in FIG. 6b below, message 208 can also optionally include a module public key identity 111a, which can be recorded in module database 105k along with module identity 110 and module public key 111a.

According to an exemplary embodiment, a first source (IP:port) number received in a first message 208 at step 516 can be different than a second source IP:port number in a second message 208 at step 518 below, wherein a response 209 send in step 519 below can preferably be sent to the second source IP:port number received in the second message 208 at step 518 in order to traverse a firewall 104 (as depicted and described in connection with packet 209a in FIG. 2). In other words, the proper destination IP:port for a response 209 to a module 101 can change over time, such as the proper destination IP:port changing due to the use of sleep states by module 101 and/or function of a firewall 104. Consequently, according to an exemplary embodiment, a response 209 can utilize a destination IP:port number equal to the source IP:port number received in the last message 208 from module 101 received by server 105.

At step 517, server 105 can authenticate the message 208 received in step 516 using the shared secret key 510 described in step 513. Server 105 could record the shared secret key 510. If step 517 occurs for the first time in a lifetime of module 101, then shared secret key 510 could comprise a pre-shared secret key 129a recorded by server 105 in a module database 105k illustrated in FIG. 1f. If step 517 occurs at subsequent time, then server 105 could have sent shared secret key 510 in a server encrypted data 504 and recorded shared secret key 510 in a module database 105k for later use (such as at step 517). Server 105 can authenticate the message 208 according to message digest, or using the shared secret key 510 as a symmetric key 127 within a symmetric ciphering algorithm 141b, where the successful encryption and decryption of data within message 208 using the shared secret key 510 on both ends could be confirmation that message 208 is authenticated, since both parties would only be able to mutually encrypt and decrypt by sharing the same shared secret key 510.

Other possibilities exist as well for server 105 to use a shared secret key 510 in order to authenticate a message 208 that contains a new module public key 111 (where module 101 contains a new module private key 112). In one embodiment, message 208 in step 516 could include a module digital signature 405, where the module 101 used the shared secret key 510 as a private key to generate the module digital signature 405. After receiving authenticated new module public key 111 in steps 516 and 517, according to a preferred exemplary embodiment, server 105 can preferably only accept and process (A) either incoming (i) a symmetric keys 127 ciphered with a asymmetric ciphering algorithm 141a, and/or (ii) incoming server instructions 414, when (B) the next or a subsequent incoming message 208 from module 101 using module identity 110 also includes a valid module digital signature 405 verified by using the new module public key 111, received at step 516.

According to an exemplary embodiment, shared secret key 510 can be associated with a module public key identity 111a, and shared secret key 510 can be used to authenticate a particular value for a module public key identity 111a. In this embodiment, (i) a message 208 with module public key 111 and a first module public key identity 111a may be authenticated using a shared secret key 510, but (ii) a second message with module public key 111 and a second module public key identity 111a may not be authenticated using the same shared secret key 510. Thus, in accordance with an exemplary embodiment, shared secret key 510 can be used for both (i) a single time for authenticating a module public key 111, and (ii) authenticating a module public key 111 with a particular value for the module public key identity 111a. Note that module public key identity 111a can be particularly useful with key revocation, such that a key revocation could specify a particular module public key identity 111a (associated with a particular module public key 111) to be revoked, but other module public keys 111 with different module public key identities 111a could remain valid and not revoked.

Although not illustrated in FIG. 5b, server 105 could operate with a certificate authority 118 in order to utilize a new module public key 111, as described in this paragraph. At step 516, new module public key 111 could be received by server 105 in the form of a uniform resource locator (URL) or domain name for download of a certificate 122 corresponding to the new module public key 111. If new module public key 111 is included in a certificate 122 in this embodiment of step 517 (or a URL to the certificate 122), then module 101 could send server 105 a URL or address on the Internet 107 where server 105 could download the new module public key 111, such as if module 101 had a certificate authority 118 sign the new module public key 111. In this case, (i) the certificate authority 118 (or a separate server than server 105) could perform the steps of 516 and 516 before server 105 conducts step 518 below, and (ii) certificate authority 118 would need some confirmation module 101 using module identity 110 was the correct owner of new module public key 111. Certificate authority 118 could authenticate module 101 using the shared secret key 510 (instead of server 105 authenticating module 101 directly with the shared secret key 510). Other possibilities exist as well for module 101 to utilize shared secret key 510 to authenticate a module public key 111 that has been derived by module 101.

After steps 516 and 517, server 105 can update a module database 105k using the module identity 110 to insert or update the new module public key 111, and parameters 126 associated with new module public key 111. Server 105 may communicate with a plurality of modules 101, and thus could utilize a module database 105k in order to record the new module public key 111 and parameters 126 with the module identity 110. In one embodiment, the module identity 110 could preferably operate as an index within a table of module database 105k in order to speed reads and writes from the table used with module public key 111, parameters 126, and also selecting a symmetric key 127 for a symmetric ciphering algorithm 141b in later messages. As described in FIG. 1g, parameters 126 can include data useful for the operation of cryptographic algorithms 141 and module public key 111. According to a preferred exemplary embodiment, some modules 101 in a system 100 could utilize a first elliptic curve, such as using a first set of ECC parameters 137 or first ECC standard curve 138 within a parameters 126, and other modules 101 could utilize a second and different elliptic curve within a parameters 126, such as a second set of ECC parameters 137 or second ECC standard curve 138.

After updating the new module public key 111, in step 518 of FIG. 5b, server 105 could receive a second message 208, and the second message 208 can include a module identity 110 and module encrypted data 403. Although not illustrated in FIG. 5b, the second message 208 could also include a module digital signature 405, wherein the module digital signature is created with the new module public key 111 received in step 516. Server 105 could then utilize the steps illustrated in FIG. 4 in order to process the incoming message 208 with the new module public key 111, including using the module identity 110 received in the second message 208 to select the new module public key 111 and subsequently verify a module digital signature 405 using the new module public key 111 and digital signature algorithm 141d. Also as discussed in FIG. 4 in connection with processing a received message 208, server 105 could decrypt the module encrypted data 403 in the second message 208 by using server private key 105c. In one embodiment, the second message 208 as illustrated in FIG. 5b, which could be the next message after authenticating module public key 111 in step 517, could include a symmetric key 127.

The module encrypted data 403 in step 518 could include a symmetric key 127 for utilization with a symmetric cipher 141b. Module 101 could also send sensor data in a module encrypted data 403 at step 518. Or, at step 518 the second message 208 could be a signal for server 105 to use a key derivation function 141f with the server public key 114 and the new module public key 111 (received at step 516) to create a new derived shared key 129b for use with symmetric ciphering algorithms 141b in subsequent messages 208. If the second message 208 in step 518 comprises a signal for server 105 to derive a new derived shared key 129b, then this second message 208 could then optionally leave off module encrypted data 403 and/or a module digital signature 405. The successful use of a new derived shared key 129b (using the new module public key 111 and existing server public key 114) with symmetric ciphering algorithms 141b at subsequent steps by both module 101 and server 105 can indicate to each the communications are mutually authenticated. Second message 208 could also include a server instruction 414, and other possibilities exist as well without departing from the scope of the present invention.

At step 519, server 105 can send a response 209 to module 101, where the response 209 includes server encrypted data 504 and a module instruction 502. Server 105 could take the steps to create and send response 209 as depicted and described in connection with FIG. 5a. Response 209 could be formatted according to the exemplary response 209 illustrated in FIG. 6a. The module instruction 502 could be an acknowledgement 501 that the second message 208 sent in step 518 was received by server 105. At step 520, server 105 can receive a third message 208 with a confirmation 414 to server 105. Confirmation 414 can be used to signal proper execution of module instruction 502, if module instruction 502 comprised an instruction other than an "ACK" or acknowledgement 501. If module instruction 502 in step 519 was an acknowledgement 501 from server 105, then the confirmation 414 may omitted and in this case step 520 could be skipped.

At step 521 server 101 can determine or evaluate if a new module public key 111 and/or certificate 122 are required for continued operation. One reason for the need of new keys could be the expiration of a certificate 122 for module 101, or the desire to utilize a different set of parameters 126 such as a longer key length for increase security or the use of a different ECC parameters 137 or a different ECC standard curve 138 with cryptographic algorithms 141. As described elsewhere herein, many other possibilities exist for reasons why module 101 and/or server 105 can prefer for module 101 to utilize a new module public key 111 and new module private key 112. Either server 105 or module 101 may determine that the use of a new module public key 111 and new module private key 112 may be preferred at step 521. If module 101 determines that the use of a new module public key 111 and new module private key 112 is preferred or desirable, module 101 could send server 105 a signal that new keys will be generated either before step 521 or at step 521.

Upon determining new keys are desirable at step 521, then server 105 could instruct module 101 to derive new private and public keys by returning to step 515. Although not illustrated in FIG. 5b, upon determining "yes" at step 521, server 105 could send a module instruction 502 of "new key generation" and also a new set of parameters 126 to utilize with the new module private key 112 and module public key 111. In accordance with exemplary embodiments, module instruction 502, including the "new key generation" instruction and set of parameters 126, can be sent in a response 209 both (i) after module 101 wakes from a sleep or dormant state and sends a message 208 after waking from the sleep or dormant state, and (ii) before the expiration of a firewall port binding timeout value 117 after receiving the message 208. If server 105 determines that new keys are not required or desirable at step 521, server 105 can then proceed to step 312 and wait for additional incoming messages 208 from module 101 or other modules. Step 312 is also depicted and described in connection with FIG. 3.

FIG. 6a

FIG. 6a is a simplified message flow diagram illustrating an exemplary message received by a server, and an exemplary response sent from the server, in accordance with exemplary embodiments. FIG. 6a illustrates exemplary details within message 208 received by server 105 and also response 209 sent by server 105. Message 208 may comprise a TCP/UDP packet 601a sent from module 101 source IP:port 204 to server 105 destination IP:port 207. According to an exemplary embodiment, UDP or UDP Lite formatting for TCP/UDP packet 601a may be preferred. Source IP:port 204 and destination IP:port 207 in message 208 may be included within a header in TCP/UDP packet 601a. Although a single message 208, response 209, module 101, and server 105 are shown in FIG. 6a, system 100 as illustrated in FIG. 2 may comprise a plurality of each of these elements. As contemplated herein, the term "datagram" may also refer to a "packet", such that referring to an element as datagram 601a can be equivalent to referring to packet 601a.

TCP/UDP packet 601a may include a body 602, which can represent the data payload of TCP/UDP packet 601a. The data payload of message 208 can optionally include channel coding 406 as described in FIG. 4 above, if the transport protocol for TCP/UDP packet 601a supports the transmission of bit errors in the body 602 (as opposed to entirely dropping the packet), such as with the UDP Lite protocol. Support for the transmission of bit errors in body 602 by wireless network 102 would be preferred over entirely discarding a packet, since the programs such as module controller 105x could include support for and utilization of channel coding 406. Without UDP Lite formatting, message 208 can alternatively sent by module 101 as a UDP datagram, such as if wireless network 102 (or a wired connection) does not support the UDP Lite protocol. Note that in this case (no support for the transmission of bit errors in a body 602), wireless network 102 and nodes within Internet 107 would preferably include channel coding on the data link layers of the OSI stack in order to maintain robustness to bit errors at the physical layers of various hops along the path between module 101 and server 105.

Note that if (A) message 208 comprises (i) regular UDP or TCP formatting (i.e. not UDP Lite or similar variations) within an IPv6 network, or (ii) a UDP or TCP format within an IPv4 network with a 603 enabled, then (B) channel coding 406 may optionally be omitted. Checksum 603 can comprise a value to for an integrity check of a packet 601a, and the calculation and use of checksum 603 is defined in IETF standards for TCP and UDP packets. In accordance with a preferred exemplary embodiment, including the use of IPv6 for Internet 107 and a UDP datagram for message 208 and response 209, a checksum 603 sent by module 101 in a message 208 does not equal a checksum 603 in the message 208 received by server 105.

The body 602 can include a module identity 110, module encrypted data 403, and channel coding 406. Although not illustrated in FIG. 6a, body 602 could also include a module digital signature 405, as illustrated in FIG. 6 of U.S. patent application Ser. No. 14/039,401. Module identity 110 is illustrated in FIG. 6a as external to module encrypted data 403, although module identity 110 may optionally only be included in module encrypted data 403, and in this case module identity 110 would not be external to module encrypted data 403 in a body 602. By including module identity 110 as external to module encrypted data 403, server 105 can use the unencrypted module identity 110 in order to select either (i) the appropriate module public key 111 to verify module digital signature 405 if an asymmetric cipher 141a is used within cryptographic algorithms 141, or (ii) the appropriate symmetric key 127 within cryptographic algorithms 141 to decrypt the module encrypted data 403. Module public key 111 and symmetric key 127 may preferably be recorded in a database 105d, such that server 105 can access a plurality of public keys using module identity 110 in body 602 for a plurality of modules 101.

Thus, by including module identity 110 external to module encrypted data 403, server 105 can utilize the module identity 110 to query a database 105d and select the appropriate module public key 111 or symmetric key 127. As noted previously, module identity 110 could comprise a string or number that is uniquely associated with module identity 110, such as a session identity, as opposed to being a module identity 110 that is read from hardware in module 101 such as an IMEI number, Ethernet MAC address, etc. Module identity 110 is illustrated in FIG. 6a as a session identity that is a different representation of module identity 110 of a serial number such as in FIG. 2, but in both cases the values can comprise a module identity 110 since the values can be uniquely associated with module 101 at any point in time.

According to an exemplary embodiment where asymmetric ciphering 141a of module encrypted data 403 is utilized, such as (i) the first message 208 sent by module 101 and (ii) where a symmetric key 127 had not been previously exchanged, module identity 110 can be (a) within module encrypted data and (b) not external to module encrypted data 403. In this case, server 105 can utilize server private key 105c to, in sequence, decrypt module encrypted data 403, extract module identity 110 from the decrypted module encrypted data 403, and then used the module identity 110 to select module public key 111 from module database 105k in order to verify a module digital signature 405. Note that if a module identity 110 is in body 602 and external to module encrypted data 403, then module identity 110 could be obfuscated or otherwise ciphered according to a pre-agreed algorithm with server 105, such that server 105 can utilize the obfuscated or ciphered module identity 110 to select a module public key 111 from module database 105k. The value of "[Module Identity String]" shown in FIG. 6a could comprise an obfuscated module identity 110. According to an exemplary embodiment where (i) symmetric ciphering of module encrypted data 403 is utilized, such as after a first message 208 had already been sent by module 101 and a symmetric key 127 had previously been exchanged, then (ii) module identity 110 can be external to module encrypted data 403 and in body 602 in order for server 105 to utilize module identity 110 and select symmetric key 127 from a module database 105k, thereby enabling server 105 to decrypt the module encrypted data 403 using the selected symmetric key 127.

The module digital signature 405 can be calculated using the steps and algorithms described in FIG. 4 above. Module digital signature 405 can be a secure hash string or number, and can be calculated using module private key 112 and digital signature algorithms 141d. Server 105 can verify module digital signature 405 using module public key 111 according to the standard techniques for verifying digital signatures using PKI as described at step 410 in FIG. 4. Note that module digital signature 405 can be useful for server 105 to maintain security, since server public key 114 may be shared and potentially other nodes besides module 101 could attempt to send in encrypted data using server public key 114.

In addition, the module digital signature 405 may optionally be omitted from body 602 after module 101 has previously sent symmetric key 127 in a previous message 208 to the message 208 illustrated in FIG. 6a. In other words, in a series of messages 208, module 101 can preferably change from (i) using asymmetric ciphering 141a with an initial message 208 that includes symmetric key 127 in a module encrypted data 403 (where the initial message 208 also includes module digital signature 405 and module identity 110) to (ii) using symmetric ciphering 141b with subsequent messages 208 without module digital signature 405 in the series (where the subsequent messages 208 can include an obfuscated module identity 110 external to module encrypted data 403 for server 105 to select the appropriate symmetric key 127). The series of messages 208 could begin when the initial message 208 is sent by module 101 and end when expiration time 133 of symmetric key 127 has transpired, and subsequently a new series of messages 208 could begin where the first message 208 in the new series of messages changes back to asymmetric ciphering 141a with initial message 208 that includes symmetric key 127 in a module encrypted data 403 (where the initial message 208 also includes a new module digital signature 405). Other possibilities exist as well without departing from the scope of the present invention.

Using a message 208 with a module digital signature 405 can be both more efficient and overall more secure than digest authentication (such as the digest authentication described in IETF RFC 2069), although using digest-based authentication may be alternatively used. First, the use of a module digital signature 405 requires only a single packet for message 208 and a single packet for response 209 for secure communication between module 101 and server 105. The alternative digest-based authentication would normally require at least 4 packets comprising: (i) message 208, (ii) a challenge to message 208 from server 105 with a security token 401, (iii) a second message from module 101 with a hashed string generated using (i) the challenge, (ii) cryptographic algorithms 141, and (iii) the module private key 112, and then (iv) an acknowledgement from server 105. The additional messages with digest-based authentication would thereby drain battery life faster or utilize more energy compared to using module digital signature 405.

Second, the use of module digital signature 405 allows a system 100 to be more highly secured since (i) server 105 may need to be connected to the Public Internet 107 and receive packets from a wide range of IP addresses that are not known before messages 208 arrive, and (ii) by using module digital signature 405, server 105 can then preferably not respond to incoming packets and messages without first receiving a properly signed module digital signature 405 (where the module identity 110 associated with module digital signature 405 could also be verified using a certificate 122 and a certificate authority public key 131). By server 105 remaining silent to all packets except packets with a properly signed module digital signature 405, system 100 can thereby remain more secure. In other words, according to preferred exemplary embodiments, server 105 does not send a response 209 to a first message 208 in a series of messages 208 that does not include a validated module digital signature 405 (where the validated module digital signature 405 includes a verified module identity 110), thereby increasing security. Once at least one module digital signature 405 has been received by server 105, then server 105 could use a symmetric key 127 to verify a module identity until a timer expiration 133 for the symmetric key 127. Server 105 could receive a symmetric key using the message 208 illustrated in FIG. 6 of U.S. patent application Ser. No. 14/039,401, and other possibilities exist as well for securely sending and receiving a symmetric key 127.

Module encrypted data 403 can be processed using the steps and algorithms described in FIG. 4. Note that module encrypted data 403 as illustrated in FIG. 6a is shown in a plaintext form for ease of illustration, but actual module encrypted data 403 within body 602 of a packet 601a could be transmitted as binary, hexadecimal, Base64 binary-to-text encoding, or other encoding rules. Note that encryption by module 101 may optionally be omitted, and the server instruction 414 with corresponding data could be included within a message 208 without encryption, such as if security could be maintained at the network level. As one example in this case without encryption, server instruction 414 could be included in body 602 as plaintext. The encryption and/or security could be applied through other means, such as a secure tunnel between module 101 and server 105, although setting up and maintaining a secure tunnel and similar or other means of security may require more processing and bandwidth resources than the efficient techniques described herein.

Module encrypted data 403 can include a server instruction 414, a server identity 206, a module identity 110, a security token 401, a timestamp 604a, and a sensor measurement 604b. The server instruction 414 can represent the purpose of the message 208 for server 105, and FIG. 6a illustrates an "update" for server instruction 414. An update for server instruction 414 could be used to periodically notify server 105 of regular, periodic sensor measurements 604b acquired by a sensor 101f. An update for server instruction 414 may also comprise a periodic report regarding monitored unit 119, and a server instruction 414 is described in FIG. 4. Other server instructions 414 besides an "update" may be included in a module encrypted data 403 within a body 602. The "update" illustrated in message 208 in FIG. 6*a* can also include a new symmetric key 127, and the module encrypted data 403 illustrated in FIG. 6*a* may comprise the use of either an asymmetric ciphering 141*a* with public/private keys, or (ii) symmetric ciphering 141*b* with a symmetric key 127.

An initial transmission or negotiation of a symmetric key 127 may preferably utilize asymmetric ciphering 141*a* and the use of a public key as an encryption key and a private key as a decryption key. Subsequent transmission of a new symmetric key 127 may utilize either (i) a symmetric cipher 141*b* with a previously negotiated but still valid symmetric key 127 (i.e. expiration time 133 has not transpired), or (ii) asymmetric ciphering 141*a*. If the data within instruction 414 is longer than the maximum data length supported by a selected asymmetric ciphering algorithm 141*a* and the public/private key pair, then module encrypted data 403 within message 208 can be broken up into several sections, such that the data within each section is less than the maximum data length supported by the asymmetric ciphering algorithm 141*a* and key length.

Server identity 206 within module encrypted data 403 can be useful for properly identifying that server 105 is the proper recipient and final destination of message 208. Server identity 206 can be useful if a plurality of servers 105 is utilized by an M2M service provider 108 with potentially hundreds of thousands or millions of modules 101. In this case, with a plurality of servers 105, server private key 105*c* may represent a private key that is shared among a plurality of servers 105, since otherwise server 105 may not be able to decrypt module encrypted data 403 if each server 105 in the plurality of servers 105 did not share the common server private key 105*c*. Continuing in this example of a plurality of servers 105, a server identity 206 may represent a server that associated with M2M service provider 108 but not the recipient of message 208. In this case, (i) a first server 105 could receive message 208 and decrypt message 208 using a common server private key 105*c* or symmetric key 127, and (ii) the first server 105 can forward message 208 to the second server 105 (not shown) with server identity 206. In this case, the first server 105 can forward message 208 to the second server (not shown) without the encryption applied to module encrypted data 403, since (i) the second server 105 may not have access to the server private key 105*c* and/or symmetric key 127, or (ii) the first server 105 could have already decrypted the module encrypted data 403 in order to read server identity 206 within module encrypted data 403.

Module identity 110 within module encrypted data 403 can represent the identity of module 110, and could represent a serial number read by module 101 from a read-only hardware address. Module identity 110 is described in FIG. 1*c* and can represent a unique identifier of module 101. Module identity 110 outside module encrypted data 403 can represent a string or number that is different than a serial number that can be used by module 101 within a module encrypted data 403. Security token 401 within module encrypted data 403 can represent a random string in order to make message 208 reasonably unique and thus system 100 in FIG. 2 robust against replay attacks. If module encrypted data 403 includes symmetric key 127, then security token 401 could optionally be omitted since symmetric key 127 can also function as a security token 401. Security token 401 is described in FIG. 5*a*. Timestamp 604*a* can represent a time value that module 101 sends message 208 or a time value that module 101 acquired sensor data 604*b*. Sensor data 604*b* is described with the description of a sensor 101*f* in FIG. 1*e*, and sensor data 604*b* can represents data module 101 acquires using sensor 101*f*. Sensor data 604*b* within message 208 may be stored by server 105 in a module database 105*k*, or potentially forwarded to another server (not shown) for additional processing. Sensor data 604*b* can comprise a wide range of values for a sensor 101*f* besides the exemplary value of a temperature reading shown in FIG. 6*a*, including raw sensor data, compressed sensor data, and processed or averaged sensor data. The specific sensor data 604*b* shown in FIG. 6*a* is illustrated to be exemplary and not limiting for sending and receiving sensor data. Sensor data 604*b* may also be referred to as a sensor measurement 604*b*.

Although not illustrated in FIG. 6*a*, body 602 or module encrypted data 403 may also include an (i) identity of monitored unit 119, which may be associated with sensor data 604*b*, and/or (ii) a sensor identity 151 associated with sensor data 604*b*, such that data from potentially multiple sensors 101*f* could be properly identified and recorded. As one example, module 101 could collect sensor data for a plurality of monitored units 119, and in this case message 208 would preferably include an identity of monitored unit 119 associated with the sensor data 604*b*. Or, a sensor 101*f* could have a sensor identity 151, and message 208 could include the sensor identity 151 with the corresponding sensor data 604*b* (also illustrated in FIG. 7 of U.S. patent application Ser. No. 14/039,401). As described above, message 208 could also include a symmetric key 127, as illustrated in FIG. 6 of U.S. patent application Ser. No. 14/039,401.

Note that if (A) module encrypted data 403 exceeds an acceptable length for input or output into asymmetric ciphering algorithms 141*a*, such as data within a module encrypted data 403 comprising an exemplary 3000 bits but only a 2048 bit key length is utilized in an exemplary module private key 112 processed with an RSA algorithm 153, then (B) module encrypted data 403 within body 602 could comprise multiple separate sub-sections for module encrypted data 403. In this case, each sub-section could comprise data less than the maximum acceptable length for encryption, and the sub-sections could be combined in order to form a module encrypted data 403 within body 602.

FIG. 6*a* also illustrates exemplary details within response 209 sent by server 105. Response 209 may comprise a TCP/UDP packet 601*b* sent from server 105 IP:port 207 the IP address 210 and port number 605, where IP address 210 represents the external IP address of wireless network firewall 104 and port number 605 is the source port in message 208 as received by server 105 (i.e. the source port in message 208 after traversing the firewall 104 illustrated in FIG. 6*a*). Thus, IP:port with IP address 210 and port number 605 may be different than IP:port 204 in response 209, since the presence of a wireless network firewall 104 may perform NAT routing, which could change the source IP address and source port number from IP:port 204 to IP address 210 and port number 605 in message 208, as received by server 105. The use of wireless network firewall 104 in wireless network 102 may require that response 209 be sent from IP:port 207 to IP address 210 and port number 605 in order to be properly processed by firewall 104 and forwarded to module 101 at IP:port 204. Source IP:port 207 and destination IP address 210 and port number 605 in response 209 may be included within a header in TCP/UDP packet 601*b*. TCP/UDP packet 601*b* could comprise a regular UDP packet, a UDP Lite packet, or a TCP datagram, or similar protocols supported by an Internet 107. TCP/UDP packet 601*a* and TCP/UDP packet 601*b* can preferably utilize the same protocol.

As noted previously, the use of checksums may be mandatory in IPv6 networks, and thus a response 209 comprising a packet 601b can include a checksum value 603 (illustrated in message 208 but not response 209) for the header. The use of firewalls such as firewall 104 can change the header values in a packet 601b. In accordance with a preferred exemplary embodiment, a first checksum value 603 within a response 209 sent by server 105 can be different and/or not equal to a second checksum value 603 within the response 209 received by module 101. Likewise, in an exemplary embodiment, a first checksum value 603 within a message 208 sent by a module 101 can be different and/or not equal to a second checksum value 603 within the message 208 received by server 105.

A UDP, TCP, or UDP Lite datagram as a TCP/UDP packet 601b within response 209 may include a body 606. Body 606 may comprise the payload or data within a UDP, TCP, or UDP Lite packet. Body 606 can include a server identity 206, a server digital signature 506, server encrypted data 504, and channel coding 406. Server identity 206 is illustrated in FIG. 6a as external to server encrypted data 504 within body 606, but server identity 206 may optionally be included in server encrypted data 504 instead. Module 101 may communicate with a plurality of servers 105, and server identity 206 as external to server encrypted data 504 can allow module 101 to select the appropriate symmetric key 127 to utilize for decrypting server encrypted data 504 (since each of the multiple servers 105 that module 101 communicates with may utilize a different symmetric key 127).

Also note that the server identity 206 can be similar to module identity 110, such that multiple different values for server identity 206 could be utilized in a system 100, but each of the different values could preferably be uniquely associated with server 105. As one example, server identity 206, outside server encrypted data 504 as illustrated in FIG. 6a, may comprise a session identity or session identifier, as opposed to a different server identity 206 that could comprise a hardware serial number or domain name for server 105. Thus, server identity 206 outside a server encrypted data 504 may be a different string or representation than server identity 206 within server encrypted data 504, but both strings/numbers used for server identity 206 in response 209 could be associated with server 105.

Server digital signature 506 in body 606 can comprise a secure hash signature of a subset of body 606, where the subset of body 606 can comprise server encrypted data 504, and/or server identity 206 as illustrated in FIG. 6a. In other words, processing the secure hash signature can omit (i) server digital signature 506 itself and (ii) channel coding 406 as input into the cryptographic algorithms 141 used to process or verify server digital signature 506. In this manner, module 101 can utilize server digital signature 506 to authenticate that response 209 was sent by server 105. Channel coding 406 in body 606 is also depicted and described in connection with FIG. 5a above.

Body 606 may include server encrypted data 504. Server encrypted data 504 is depicted and described in connection with FIG. 5a above. Server encrypted data 504 may include an acknowledgement 501, wherein acknowledgement 501 can notify module 101 that message 208 has been received by server 105. As illustrated in FIG. 6a, server encrypted data 504 may optionally also include a module instruction 502 for module 101. The module instruction 502 could be a string that contains instructions or configuration parameters for module 101, such as an order to change state, parameters regarding the monitoring of monitored unit 119, server names or addresses, radio frequency parameters, timer values, settings for actuator 101y, etc. A module instruction 502 is depicted and described in connection with FIG. 5a above. The exemplary module instruction 502 illustrated in FIG. 6a comprises a "key generation" 608 instruction for module 101 derive a new set of keys. The use of a "key generation" 608 instruction was also depicted and described in connection with FIG. 5b above. Other possibilities for a module instruction 502 within a response 209 are possible as well without departing from the scope of the present invention. Although not depicted in FIG. 6a or FIG. 2, if response 209 includes a module instruction 502, according to an exemplary embodiment, module 101 can preferably send a second message 208 to server 105, where the second message 208 includes a confirmation that module instruction 502 was successfully executed or implemented by module 101. This confirmation could be included in a server instruction 414 for server 105 within a second message 208.

Also, although a server encrypted data 504 may preferably be included within a body 606, body 606 may optionally omit server encrypted data 504 and include data from server 105 that is not encrypted, such as plaintext. As one example in this case, acknowledgement 501 could be included in body 606 as plaintext. In addition, although a server digital signature 506 is not illustrated in FIG. 6a, a server digital signature 506 could be included in body 606 and external to server encrypted data 504. In an exemplary embodiment, the inclusion of a server digital signature 506 in a response 209 is illustrated in FIG. 6 of U.S. patent application Ser. No. 14/039,401. The server digital signature 506 may (i) optionally be omitted as well, or (ii) included within server encrypted data 504.

Also, although not illustrated in FIG. 6a, server encrypted data 504 could include a symmetric key 127 for module 101 to utilize with symmetric ciphering 141b in cryptographic algorithms 141 for processing a module encrypted data 403 in subsequent messages 208 and/or responses 209. If server encrypted data 504 includes a symmetric key 127, then server 105 preferably can utilize an asymmetric ciphering 141a with cryptographic algorithms 141 to process the server encrypted data 504 containing the symmetric key 127. An example for the previous sentence could be if message 208 was received without a symmetric key 127 and server 105 can issue the symmetric key 127. As contemplated herein, more than one symmetric key 127 may be used concurrently in a system 100, such as a first symmetric key 127 utilized in symmetric ciphering 141b for a message 208, and a second symmetric key 127 utilized in symmetric ciphering 141b for a response 209. Other possibilities exist as well without departing from the scope of the present invention.

Server encrypted data 504 in a response 209 may include a security token 401. Security token 401 may be a random string and may also be generated by either server 105 or module 101. If security token 401 is generated by module 101, then security token 401 may be included in message 208 and also utilized by server 105 in response 209, as illustrated in FIG. 6. By including security token 401 in acknowledgement 501, system 100 can be made robust to replay attacks since each response 209 can be reasonably unique for each response 209 sent by server 105.

FIG. 6b

Figure 6B:
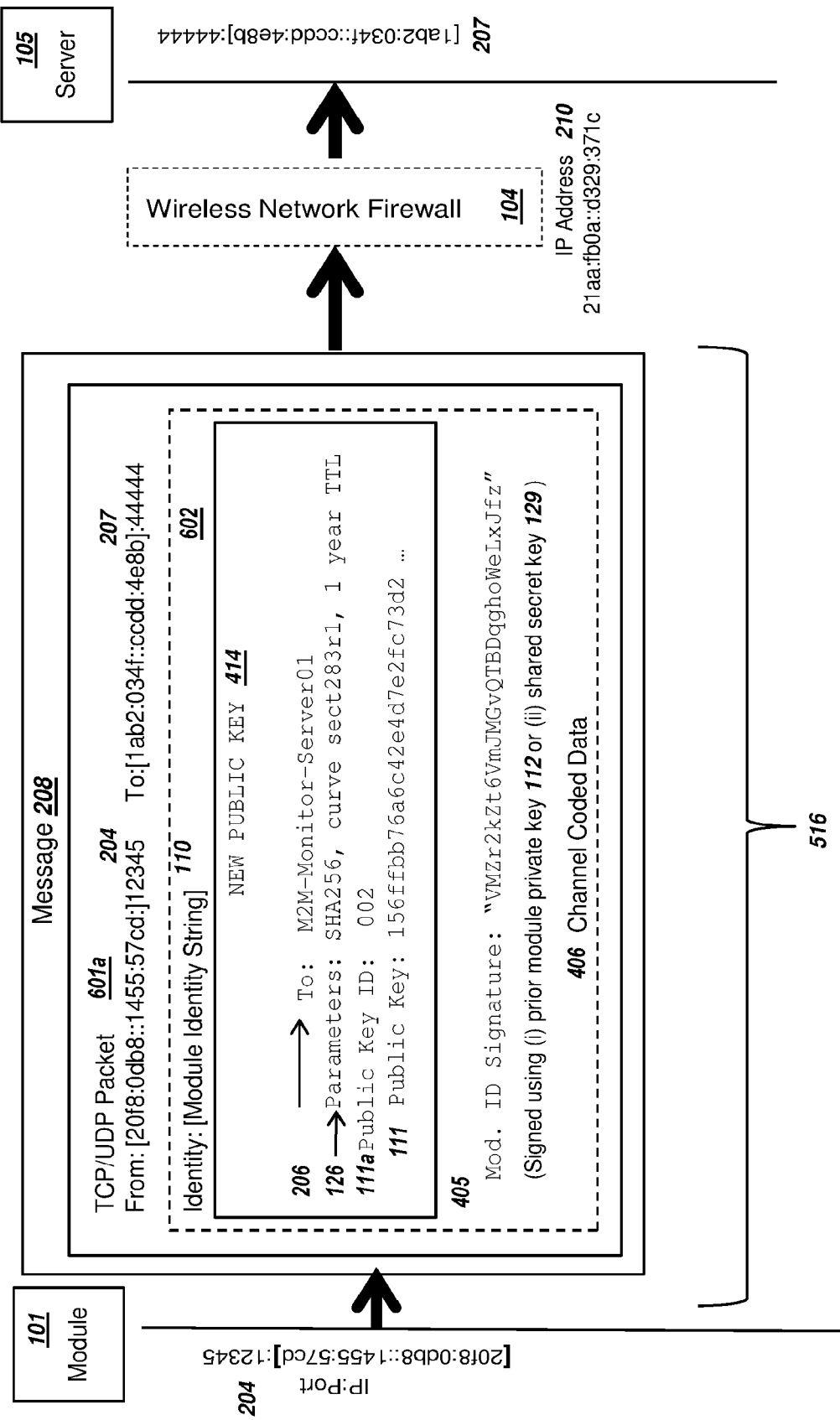
FIG. 6b is a simplified message flow diagram illustrating an exemplary message received by a server, wherein the message includes a derived module public key, in accordance with exemplary embodiments.

FIG. 6b is a simplified message flow diagram illustrating an exemplary message received by a server, wherein the message includes a derived module public key, in accordance with exemplary embodiments. As discussed in FIG. 5b, there can be cases where module 101 derives a new module public key 111 and new module private key 112. On example would be the initial creation of the key pairs by module 101, and many other examples could exist as well. FIG. 6b can illustrate an exemplary format and contents of a message 208 for steps 516 and 517 of FIG. 5b. This exemplary message 208 can also help to illustrate the significant differences from conventional technology and improvements for efficient and secure communications by utilizing embodiments contemplated herein.

A message 208 illustrated in FIG. 6b using steps 516 and 517 can include (i) sending new module public key 111, a module public key identity 111a, a module identity 110, a server instruction 414, and a set of parameters 126 associated with the new module public key 111 and/or cryptographic algorithms 141 for using the new module public key 111. Exemplary parameters 126 illustrated in FIG. 11 include (i) a secure hash algorithm 141c to utilize in signatures, which could comprise the SHA 256 algorithm as shown (which may also be known as the SHA-2 algorithm), (ii) a selected elliptic curve for use with ECC algorithms 154 or a modulus to use with RSA algorithms 153, and (iii) a time-to-live value for the public key, such as the illustrated "time to live" value of 1 year shown in FIG. 6b. The time value for the validity of new module public key 111 could alternatively be specified in a set expiration date. Other values associated with cryptographic algorithms 141 could be included in parameters 126 as well, and the illustrated values are intended to be exemplary instead of limiting. Other possibilities for data with a message 208 illustrated in FIG. 6b include a parameters 126 including a set of ECC parameters 126, or a specified secure hash algorithm 141c comprising SHA-3 or SHA-512.

Additional values or fields within a message 208 associated with communicating a new module public key 111 with server 105 could include a server instruction 414 of "new public key". This server instruction 414 could inform server 105 to utilize the new module public key 111 within the message 208. Module public key identity 111a can include a sequence number or identity for the new module public key 111, such that module 101 or server 105 can properly reference and/or select the key from a plurality of module public keys 111 that could be associated with module identity 110. Although module public key identity 111a is illustrated as a separate field in server instruction 414, module public key sequence number 111a could optionally be included in parameters 126, such that the value within parameters 126 specifies the current sequence number or module public key identity 111a for the new module public key 111 included in a message 208.

Figure 11:
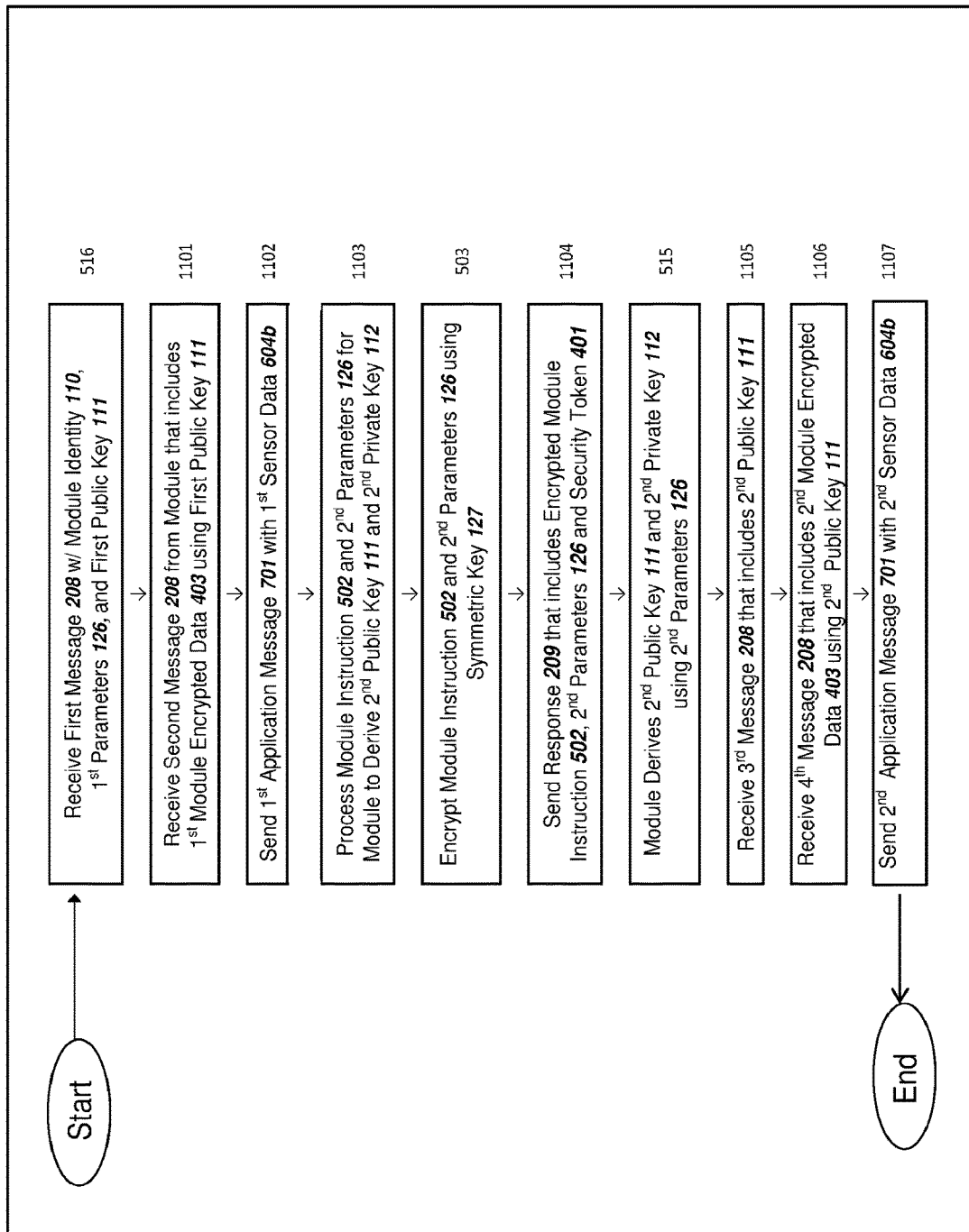
FIG. 11 is a flow chart illustrating exemplary steps for a server to communicate with an application and a module, in accordance with exemplary embodiments.

Other fields and features within a message 208 as illustrated in a FIG. 11 can be similar to the fields presented in FIGS. 6a. Since (a) FIG. 6a can also illustrate a first message 208 sent by a module 101 to a server 105, such as after keys are derived in a step 515, then (b) module 101 can read multiple values from RAM 101e or a nonvolatile memory 101w or 101c in order properly construct or format message 208. Each of (i) destination IP:port number 207, (ii) parameters 126, and (iii) shared secret key 510 can preferably be written into nonvolatile memory at step 512 of FIG. 5b, if message 208 in FIG. 6b represents the first message 208 sent by module 101. The source IP:port number 204 can represent a number assigned by an operating system 101h.

If message 208 in FIG. 6b comprises a subsequent time message 208 is received by server 105 (i.e. not a first time module 101 sends a module public key 111), such as after step 521 illustrated in FIG. 5b, then each of (i) destination IP:port number, (ii) parameters 126, and (iii) shared secret key 510 could be updated by server 105 using a module instruction 502 within a server encrypted data 504 before message 208 illustrated in FIG. 6a is received by server 105. In this manner, shared secret key 510 could change from (i) comprising a pre-shared secret key 129a (for a first message 208 after module key derivation) to (ii) comprising a shared secret key that is sent by server 105 within a server encrypted data 504 (for a subsequent message 208 after module key derivation).

After receiving message 208, server 105 can use the unencrypted module identity 110 illustrated in a body 602 of FIG. 6b to select the shared secret key 510 in order authenticate message 208. As described in step 517 of FIG. 5b, server 105 may preferably authenticate message 208 that includes module public key 111 in order to confirm that module public key 111 originated from physical module 101 with a hardware module identity 110 (as opposed to being an imposter submitting the module public key 111). The use of a channel coding 406 is described in connection with FIGS. 4 and 5a, and channel coding may optionally be omitted. If message 208 comprises a UDP Lite packet, then channel coding may optionally be applied within the body 602. If message 208 comprises a UDP packet, then channel coding may comprise sending the exact same UDP packet 601a multiple times, such as an exemplary 3 packets 601a sent at the same time.

Although not illustrated in FIG. 6b, in an exemplary embodiment module public key 111 could also be received in a message 208, where the module public key 111 and parameters 126 can be included in an encrypted format within a module encrypted data 403. As depicted and described in connection with steps 1001 and 1002 of FIG. 10, and also FIG. 11 of U.S. patent application Ser. No. 14/039,401, the security of a system 100 can be further increased by both (i) ciphering module public key 111 and parameters 126, and (ii) only sharing the module public key 111 in a confidential manner with server 105. If module 101 needed a module public key 111 for other purposes, such as obtaining a certificate, then a second, publicly disclosed module public key 111 could be utilized, where the second module public key 111 is different than a module public key 111 using parameters 126 that is sent to a server 105 in a module encrypted data 403.

FIG. 6b also illustrates an exemplary embodiment, where module public key 111 can be authenticated with server 105 using a module digital signature 405. If message 208 comprises a first time module 101 utilizes a step 516 and step 517, such that a module public key 111 has not previously been sent to server 105, then message 208 could include a module digital signature 405 using the shared secret key 510, which could comprise the pre-shared secret key 129a. If message 208 comprises a subsequent time module 101 utilizes a step 516 and step 517, such that a module public key 111 has previously been sent to server 105, then message 208 could include a module digital signature 405 using the previous module private key 112 (i.e. not the new module private key associated with the new module public key 111 in the message 208 shown in FIG. 6b). As noted in FIG. 5b, module digital signature 405 could be omitted, and message 208 with module public key 111 could be authenticated using a message digest algorithm and the shared secret key 129a.

FIG. 7

FIG. 7 is a simplified message flow diagram illustrating exemplary data transferred between a module and an application using a server, in accordance with exemplary embodiments. FIG. 7 includes a system 700 and illustrates an exemplary message 208 from a module 101 to a server 105 and also an exemplary application message 701 between an application 171*i* and server 105. Note that application message 701 could also be considered as transferred between, sent to, or received from server 105 and application server 171. System 700 can comprise a module 101, a server 105, and an application 171*i* operating on an application server 171, and these elements may communicate over a network such as the Internet 107. For example, application server 171 may utilize an IP:port number 702 for sending and receiving messages with server 105. The IP address within IP:port number 702 is illustrated as an IPv4 address, but an IPv6 address could be utilized as well, or other addressing schemes are possible. Message flows within a module 101 from a sensor 101*f* and to an actuator 101*y* are also included in a system 700 as illustrated in FIG. 7. Message flows within a module 101 could utilize a system bus 101*d*.

Although not illustrated in FIG. 7, before module 101 sends a module public key 111 to server 105, possibly by using step 516 as illustrated in FIG. 7, module 101 can derive the public and private keys using step 515 and a set of parameters 126. Alternatively, module 101 may have the module public key 111 and module private key 112 generated outside module 101 and loaded into a non-volatile memory 101*w*. Server 105 can utilize step 516 to receive a module public key 111 from module 101. Server 105 can utilize a step 517 and a shared secret key 510 to authenticate a message 208 that contains the module public key 111 from step 516. Authentication of module public key 111 may be preferred in order to ensure that the module public key 111 is properly associated with the correct physical module 101, and prevent an imposter, hacker, etc. from sending in a fake module public key 111 for module 101. After using step 517 to authenticate module public key 111, server 105 can record module public key 111 and associated module identity 110 (plus optionally a module public key identity 110*a*) in a module database 105*k*. Although not illustrated in FIG. 7, server 105 can also send an application message 701 to application 171*i* after successfully recording module public key 111.

Application 171*i* operating within an application server 171 can send an application message 701 to server 105, and server 105 can receive the application message 701. Application message 701 could include a module instruction 502, where the module instruction 502 could comprise an actuator setting 706. Although not illustrated in FIG. 7, module instruction 502 as transmitted or sent by application 171*i* or application server 171 could include a module identity 110 and/or an actuator identity 152. Actuator setting 706 could include a setting value and an actuator identity 152. As one exemplary embodiment, module 101 may have a plurality of actuators 101*y* that comprise thermostats. Actuator setting 706, where one actuator 101*y* had an actuator identity 152 of "Left", could comprise an exemplary string like "Left, 25.5", where module 101 would set the "left" thermostat/actuator 101*y* to 25.5 degrees C. The value "left" could also comprise the actuator identity 152. Other possibilities exist as well without departing from the scope of the present invention, and a thermostat, temperature settings, or actuator identities are not required to use the methods and systems contemplated herein. As discussed below in connection with FIG. 8, actuator setting 706 within an application message 701 could be received within a secure connection data transfer 802 from application server 171. Thus, in an exemplary embodiment, the actuator setting 706 may preferably not be plaintext as transmitted across a network such as the Internet 107 between server 105 and application server 171 in an application message 701.

A module instruction 502 (*i*) from an application 171*i* or application server 171, and (ii) within an application message 701 could include other exemplary values or instructions for a module 101, besides the exemplary actuator setting. According to exemplary embodiments, a module instruction 502 could comprise information for module 101 such as (i) sleep timers or instructions or values for a CPU wake controller 101*u*, (ii) server address 106 or server identity 206 for communicating with a server 105 (such as sending a different server address 106 for module 101 to utilize in future communications), (iii) a new or updated values for set of data reporting steps 101*x*, (iv) a new or updated module program 101*i*, (v) software or firmware for operating system 101*h* and device driver 101*g*, (vi) a calibration value for sensor 101*f* or actuator 101*y*, (vii) values for a set of parameters 126, (viii) software or settings for radio 101*z*, (ix) updated cryptographic algorithms 141, (x) a new module private key 112, (xi) a symmetric key 127, (xii) a pre-shared secret key value 129*a* for use in communicating with a wireless network 102 (where the pre-shared secret key value 129*a* can be the equivalent of a Ki value in a network supporting ETSI/3GPP standards), (xii) a value for a module identity 101, (xiii) a value to use in a channel coding 406, or (xiv) a security token 401 or settings for using security tokens. Other possibilities exist as well for a module instruction 502 without departing from the scope of the present invention. After receiving module instruction 502 in a response 209 from server 105, module 101 could record the data in module instruction 502 within a nonvolatile memory 101*w* or RAM 101*e*.

After receiving application message 701, server 105 can wait for wait interval 703. As depicted and described in connection with FIGS. 2 and 6*a*, firewall 104 may be present in a system 700 and/or system 100, which could block the transmission or sending of packets from server 105 to module 101 at arbitrary times. In addition, according to exemplary preferred embodiments, module 101 can enter periods of sleep or dormancy using a CPU wake controller 101*u* in order to conserve energy or the life of a battery 101*k*, if present. During periods of sleep or dormancy, module 101 may not be able to receive packets from server 105. Consequently, server 105 can preferably wait for the wait interval 703 as illustrated in FIG. 7, before sending response 209 which could include the module instruction 502. As illustrated in FIG. 7, the module instruction 502 could include an actuator setting 706, but module instruction 502 could include other data as well such as the exemplary module instructions 502 described in the previous paragraph.

According to exemplary embodiments, wait interval 703 can vary depending upon module 101 and monitored unit 119, and wait interval 703 could comprise a wide range of values. Module 101 could send a sensor data 604*b* or a report or a message 208 at exemplary reporting intervals such as every minute, 10 minutes, hour, 6 hours, daily, or longer. Wait interval 703 could be associated with the reporting interval, and the wait interval 703 would end when the next message 208 from module 101 is received. If server 105 supports a plurality of modules 101, wait interval 703 can be associated with the specific module 101 associated with the module instruction 502, possibly by using a module identity 110 in both a message 208 and an application message 701. In other words, server 105 can preferably wait for a message 208 from the specific module 101 associated with the module instruction 502 before sending the response 209 which could include the module instruction 502. Response 209 could be sent using the source and destination IP:port numbers depicted and described in connection with FIG. 2.

Upon the receipt of message 208 from module 101 with module identity 110, the wait interval 703 can end. As illustrated in FIG. 7, message 208 could include a server instruction 414. The server instruction 414 in the exemplary embodiment illustrated in FIG. 7 comprises an "update" server instruction 414, and could include a sensor measurement 604b. Sensor measurement 604b could be obtained by module 101 from sensor 101f before sending message 208, and possibly after module 101 wakes from a dormant state using a CPU wake controller 101u. Sensor measurement 604b could be collected by a module program 101i using a system bus 101d. As illustrated in FIG. 6a, a server instruction 414 with sensor data 604b could be within a module encrypted data 403 and received by server 105. Server 105 could utilize the steps illustrated in FIG. 4 to process the received message 208 at the end of wait interval 703. Sensor measurement 604b as used by module program 101i, server 105, application 171i, and/or application server 171 could represent a different string or number at each element, depending upon encoding rules or encoding schemes utilized by each element, but sensor measurement 604b at each location can represent data or a value collected by a sensor 101f.

After processing the received message 208 that could include sensor data 604b, server 105 can send application 171i operating on application server 171 an application message 701 that includes an update instruction 704, where update instruction 704 could include sensor data 604b, module identity 110, and sensor identity 151, if present. Update instruction 704 could include data other than sensor data 604, such as data pertaining to the state of module 101, including subcomponents illustrated in FIGS. 1b and 1e. Using update instruction 704 or a plurality of update instructions 704, application 171i can aggregate data to generate reports for presentation to user 183 or make decisions using service controller 171x. Based on data input in update instruction 704, application 171i could output module instruction 502 in an application message 701. Application 171i could record data received in update instruction 704 within an application database 171k.

After receiving message 208 with server instruction 414, server 105 can send a response 209 to module 101. Note that response 209 is illustrated in FIG. 7 as being sent after sending update instruction 704 to application server 171, but response 209 could also be sent to module 101 before sending update instruction 704 to application server 171. Response 209 can include module instruction 502, where module instruction 502 could comprise actuator setting 706, according to an exemplary embodiment. Module instruction 502 could also comprise other data for module 101 in other exemplary embodiments, as outlined above. Although not illustrated in FIG. 7, response 209 could include module instruction 502 within a server encrypted data 503 using the steps depicted and described in connection with FIG. 5a. Module instruction 502 could also include actuator identity 152 associated with actuator setting 706. Response 209 can be formatted as depicted and described in FIGS. 2 and 6a, such that response 209 can traverse a firewall 104 and be received by module 101 using IP address 204. Network firewall 104 is illustrated as a dashed line in FIG. 7, and may be optionally not be present. But, the use of network firewall 104 may be included in a system 100 and/or system 700 and network firewall 104 may be beyond the control of a module 101, server 105, module provider 109, M2M service provider 108, etc.

After receiving response 209 with the module instruction 502 and actuator setting 706, module 101 can process the response 209, which could also include server encrypted data 503. Module 101 could extract actuator setting 706 from the module instruction 502. Module instruction 502 could include an actuator identity 152. Module 101 can use a module program 101i to send the actuator setting 706 to the actuator 101y with actuator identity 152. Actuator setting 706 as sent by module program 101i may be in a different format or data structure than actuator setting 706 as sent by application 171i, but both sets of data can achieve the same objective of having an actuator 101y apply a setting. According to one exemplary embodiment, actuator setting 706 as sent by module program 101i could be an analog voltage along a system bus 101d, while actuator setting 706 as sent by application 171i could be a string or number. Or, actuator setting 706 as sent by module program 101i to actuator 101y could be a number in a different format than a number in actuator setting 706 sent by application 171i, application server 171, and/or server 105. Note that as contemplated herein, the term "actuator data" can include or comprise "actuator setting".

After applying actuator setting 706, actuator 101y can send an acknowledgement to module program 101i. Module program 101i can then send a second message 208 to server 105, where message 208 includes a server instruction 414 of "confirmation". The server instruction 414 of "confirmation" could be included in a module encrypted data 403 according to a preferred exemplary embodiment. Server 105 can receive the second message 208 with the module encrypted data 403 and decrypt the module encrypted data 403 using a step 413 to extract the server instruction 414 of "confirmation". The second message 208 may include the actuator identity 152 and/or also the module identity 110. Server 105 can send an application message 701 that includes a confirmation 705, where the confirmation can (i) inform application 171i that the actuator setting 706 sent to server 105 has been properly and/or successfully applied by module 101 and/or actuator 101y. Confirmation 705 could also include module identity 110 and/or actuator identity 152. Application 171i could then send an acknowledgement back to server 105 after receiving the confirmation 705.

According to preferred exemplary embodiments, actuator identity 152 is preferably globally unique, such that that including an actuator identity 152 in any packet would allow a server 105 or application 171i to lookup a module identity 110 and/or module 101 using the actuator identity 152 and a database such as module database 105k. Similarly, a sensor identity 151 may be globally unique, according to preferred exemplary embodiments such that a sensor identity 151 in any packet would allow a server 105 or application 171i to lookup a module identity 110 and/or module 101 using the sensor identity 151 and a database such as application database 171k.

FIG. 8

FIG. 8 is a simplified message flow diagram illustrating exemplary data transferred between a module and an application using a server, in accordance with exemplary embodiments. System 800 can include an application server 171, a server 105, and a module 101 in connected via a network. The network could comprise the Internet 107. Application server 171 could include an application 171i, where application 171i can include logic, algorithms, databases, user interfaces, and programs for managing a plurality of modules 101 with a plurality of users 183. Application server 171 and application 171i may be associated with an M2M service provider 108, and M2M service provider 108 could use application 171*i* to provide and manage a service with distributed modules 101 associated with a plurality of monitored units 119.

Module 101 can derive a public key 111 and a private key 112 using step 515. Module 101 can derive the public and private keys using step 515 and a set of parameters 126. Alternatively, module 101 may have the module public key 111 and module private key 112 generated outside module 101 and loaded into a non-volatile memory 101*w*. Server 105 can utilize step 516 to receive a module public key 111 from module 101. Server 105 can utilize a step 517 to authenticate a message 208 that contains the module public key 111 in step 516. Authentication of module public key 111 may be preferred in order to ensure that the module public key 111 is properly associated with the correct physical module 101 with a module identity 110, and prevent an imposter, hacker, etc. from sending in a fake module public key 111 for module 101. After using step 517 to authenticate module public key 111, server 105 can record module public key 111 in a module database 105*k*. Although not illustrated in FIG. 8, server 105 can also send an application message 701 to application 171*i* after successfully recording an authenticated module public key 111. Although not illustrated in FIG. 8, a module public key 111 received in step 516 may also include a module public key identity 111*a* in order to track which of a plurality of potential module public keys 111 for a module 101 may be used.

Also, server 105 is not required to receive module public key 111 from module 101 in order to utilize the methods and systems contemplated herein. Instead of receiving module public key 111 in a message 208 from module 101, server 105 could alternatively query another server such as application server 171 or a server associated with certificate authority 118 for either module public key 112 or a certificate 122 associated with module 101 using a module identity 110. In addition, server 105 could have a list or database table of module identities 110 and module public keys 111 loaded into a module database 105*k*.

After recording module public key 111 and module identity 110, possibly including a module public key identity 111*a*, server 105 can wait for wait interval 703. Wait interval 703 could represent the time between reports or messages 208 submitted by module 101, and wait interval 703 for an individual module 101 could comprise a wide range of values from several times a second to several days or longer, depending upon the application and/or monitored unit 119. The wait interval 703 can end when server 105 receives a message 208 from module 101 with a module identity 110.

Module controller 105*x* within server 105 can receive a message 208 that includes a server instruction 414 with sensor data 604*b*. The sensor data 604*b* and/or server instruction 414 could be included in a module encrypted data 403, where the module encrypted data 403 can use the module public key 111 submitted in step 516 above and derived by module 101 in step 515. According to one exemplary embodiment, module encrypted data 403 could be ciphered with a symmetric key 127 that is derived shared key 129*b* from a key derivation function 141*f* and module public key 111 received in step 516 (and also server public key 114). Module controller 105*x* can process message 208 using the steps depicted and described in connection with FIG. 4 in order to decrypt the module encrypted data 403 and obtain the plaintext server instruction 414 and plaintext sensor data 604*b*. Although sensor data 604*b* is illustrated as the server instruction 414 in FIG. 8, server instruction 414 could have other values such data associated with any of the components for module 101 illustrated in FIG. 1*b* and FIG. 1*e*. Server instruction 414 could be a "query" where module 101 queries for information from server 105 or application 171*i*, or server instruction 414 could be an alarm or error notification outside a regular reporting interval. Other possibilities for server instruction 414 exist without departing from the scope of the present invention. Server instruction 414 could also be a periodic "registration" message with no subsystem data for module 101, and a "registration" could be a message for server 105 indicating module 101 is awake and online with Internet 107.

Server 105 can establish a secure connection with application server 171 and application 171*i* using a secure connection setup 801 and a secure connection data transfer 802. Server 105 can utilize a server program 101*i* to manage the communication with application 171*i* and/or application server 171, while a module controller 105*x* can manage communication with a module 101. Alternatively, server program 101*i* and module controller 105*x* can be optionally combined or omitted, such that server 105 performs the actions illustrated in FIG. 8 for server programs 101*i* and module controller 105*x*. Likewise, server 105 and application 171 could be combined or operate on the same local area network (LAN) and thus not be connected via the Internet 107. If server 105 and application 171 are nodes within the same LAN or virtual private network (VPN), then the network connection can also be considered a secure connection (without using encryption between the nodes), since packets routed between the nodes may not need to traverse the Internet 107 and thus the network layer could provide security. Although secure connection setup 801 is illustrated in FIG. 8 as occurring after message 208 is received by server 105, secure connection setup 801 could take place before message 208 is received by server 105. Secure connection setup 801 could utilize a secure protocol such as TLS, IPSec, or VPN to establish a secure connection between server 105 and application 171*i* and/or application server 171, such that data transferred between the two nodes is encrypted and also not subject to replay attacks. As contemplated herein, a secure connection can comprise any of a TLS connection, an IPSec connection, a VPN connection, or a LAN connection between server 105 and application server 171 and/or application 171*i*, and other possibilities exist as well without departing from the scope of the present invention.

Other secure connections may be utilized as well, including a secure shell (SSH) tunnel, future versions of standard secure connections, or also a proprietary protocol for a secure connection. Secure connection setup 801 as illustrated in FIG. 8 may utilize a TLS protocol, such as TLS version 1.2. Secure connection setup 801 can include the transfer of a certificate 122 for application server 171, and also the transfer of an application public key 171*w*. Server 105 can utilize application public key 171*w* to encrypt data received from module 101 in a message 208, such as sensor data 604*b*. According to one exemplary embodiment, application message 701 could be ciphered with a symmetric key 127 that comprises a derived shared key 129*b* from (i) a key derivation function 141*f* (ii) application public key 171*w* and server public key 114.

The message flow in a secure connection setup 801 also illustrates one benefit of the present invention, where a message 208 can be securely transferred between module 101 and server 105 using a single UDP datagram, while secure connection setup 801 may require a plurality of TCP messages in both directions. In other words, using a secure connection setup 801 between module 101 and server 105 may not be energy efficient for module 101, while using secure connection setup 801 between server 105 and application server 171 can be efficient, since the data from a plurality of modules 101 can be shared over the secure connection setup 801. Also note that since module 101 may sleep for relatively long periods such as 30 minutes or longer, a new secure connection setup 801 would likely be required to support a firewall 104 after each period of sleep, and completing the process of a secure connection setup 801 each time module 101 wakes may not be energy or bandwidth efficient for a module 101.

After completing server connection setup 801, server 105 can use a secure connection data transfer 802 to send a first application message 701, where the first application message 701 could include update instruction 704 that includes sensor data 604b that server 105 received in a message 208. Data within the first application message 701 containing update instruction 704 could be ciphered according to the specifications of the secure connection, such as TLS or IPSec, and other possibilities exist as well. Note that server 105 can decrypt a module encrypted data 403 that includes sensor data 604b and subsequently encrypt the sensor data 604b according to the format required by secure connection setup 801 for transfer to application 171i using secure connection data transfer 802. Server 105 can use two different server public keys 114, recorded in the form of a certificate 122 in one embodiment, to with a first server public key 114 used decrypt module encrypted data 403 and a second server public key 114 used encrypt update instruction 704. Server public keys 114 can be used by server 105 in a key derivation function 141f to derive a shared public keys 129b used in a symmetric ciphering algorithm 141b for both secure connection data transfer 802 and module encrypted data 403 (with a different derived shared public key 129b with module 101 and application server 171, respectively).

In another embodiment, server 105 can use the same server public key 114 to both decrypt module encrypted data 403 and encrypt update instruction 704. Other possibilities exist as well for server 105 to use a server public key 114 to (i) encrypt update instruction 704, such as using an asymmetric ciphering algorithm 141a, and (ii) decrypt module encrypted data 403 without departing from the scope of the present invention. As illustrated in FIG. 8, server 105 can receive an acknowledgement 804 after sending the first application message 701, with update instruction 704 that includes sensor data 604b, where acknowledgement 804 can signal that application message 701 with update instruction 704 has been received by application 171i and/or application server 171. Although not illustrated in FIG. 8, the acknowledgement 804 could optionally include a module instruction 502 for module 101.

After receiving message 208, server 105 can then send a response 209. Response 209 could be sent before or after server 105 sends update instruction 704 to application 171i using secure connection data transfer 802. Response 209 can include a server encrypted data 504 that includes a module instruction 502. Module instruction 502 could be processed by server 105, or could be obtained by server 105 from application 171i in an application instruction 701. In other words, a secure connection data transfer 802 may be utilized by a server 105 and an application server 171 to send a second application message 701 to server 105, and be received by server 105, in addition to the sending the first application message 701 from server 105 to application server 171 that is illustrated in FIG. 8.

According to an exemplary preferred embodiment, server 105 waits for a response or acknowledgement 804 from application 171i to application message 701 before sending response 209 to module 101. One reason for waiting for a response or acknowledgement 804 from application 171i is that response or acknowledgement 804 from application 171i could include a module instruction 502, and the module instruction 502 may preferably be included in a response 209. Other possibilities exist as well without departing from the scope of the present invention.

FIG. 8 can also illustrate a benefit of an exemplary embodiment contemplated herein. According to an exemplary embodiment, (i) server 105 and application server 171 can utilize a first set of cryptographic algorithms 141 for sending and receiving data between server 105 and application server 171, such as with a secure connection data transfer 802, and (ii) server 105 and module 101 can utilize a second set of cryptographic algorithms 141 for sending and receiving data between server 105 and module 101, such as using the second set of cryptographic algorithms 141 for a module encrypted data 403 and/or server encrypted data 504. In an exemplary embodiment, server 105 and application server 171 can use RSA algorithms 153 in the first set of cryptographic algorithms 141, while server 105 and module 101 can use ECC algorithms 154 in the second set of cryptographic algorithms 141. As one example, server 105 can use an (i) RSA-based asymmetric ciphering algorithm 141b and first server public key 114 with the application server 171 to securely transfer a first symmetric key 127 with application server 171, and (ii) an ECC-based asymmetric ciphering algorithm 141b and second server public key 114 with the module 101 to securely transfer a second symmetric key 127 with a module 101.

Other possibilities exist as well for a server 105 to use a different cryptographic algorithms 141 or parameters 126 for each of application server 171 and module 101. (A) Server 105 and application server 171 could use a first set of parameters 126 for use with cryptographic algorithms 141 for an application message 701 with related server digital signatures, while (B) server 105 and module 101 could use a second set of parameters 126 for use with cryptographic algorithms 141 for a module encrypted data 403 and/or server encrypted data 504 and related digital signatures. In order to maximize security between servers such as server 105 and application server 171, the first set of parameters 126 could specify (i) a longer public and private key length, (ii) a shorter key expiration time 133, (iii) a longer secure hash algorithm (such as an exemplary 512 bits), (iv) a longer symmetric ciphering key 127 length (such as an exemplary 192 or 256 bits), (v) the use of or values for RSA algorithm 153 and a modulus, (vi) the use of Diffie Hellman key exchange or a first key exchange algorithm for a key derivation function 141f and key exchange, (vii) the use of or values for a second symmetric ciphering algorithm 141b for symmetric ciphering, (viii) the use of or values for an RSA digital signature algorithm or a second digital signature algorithm, and similar settings.

In accordance with a preferred exemplary embodiment, in order to minimize processing power and/or energy usage required for a module 101, the second set of parameters 126 could specify (i) a shorter public and private key length, (ii) a longer key expiration time 133, (iii) a shorter secure hash algorithm (such as an exemplary 256 bits), (iv) a shorter symmetric ciphering key 127 length (such as an exemplary 128 bits), and (v) the use of an ECC algorithm 154, (vi) the use of or values for an ECC standard curve 138 and/or ECC parameters 137, (vii) the use of or values for ECDH 159 or a second key exchange algorithm for key derivation and exchange, (vii) the use of or values for of a second symmetric ciphering algorithm 141*b* for symmetric ciphering, (viii) the use of or values for of ECDSA 158 or a second digital signature algorithm for digital signatures, and similar settings. In an embodiment, the first set of parameters 126 (which can be used by server 105 and application server 171) and the second set of parameters 126 (which can be used by server 105 and module 101) can both specify the use of elliptic curve cryptographic algorithms 141, but with different sets of parameters 126 such that the first set of parameters 126 is selected for server to server communications, and the second set of parameters 126 is selected for communications between a server 105 and a module 101. In another embodiment, the first set of parameters 126 and the second set of parameters 126 can both specify the use of RSA based cryptographic algorithms 141, but with different sets of parameters 126 such that the first set of parameters 126 is selected for server to server communications, and the second set of parameters 126 is selected for communications between a server 105 and a module 101.

In this manner, the use of cryptographic algorithms 141 between (i) server 105 and application server 171 and (ii) server 105 and module 101 can be optimized given different constraints for processing power and energy consumption for server 105, application server 171, and a module 101. In addition, an application server 171 may use cryptographic algorithms 141 and parameters 126 that may not be compatible with cryptographic algorithms 141 and parameters 126 used by a module 101, and server 105 can use cryptographic algorithms 141 and parameters 126 to enable a translation or conversion of encrypted data and digital signatures between a module 101 and an application server 171, thereby establishing connectivity between a module 101 and an application server 171 through a server 105. According to an exemplary embodiment, server 105 can function as a gateway between application server 171 and/or application 171*i* and a plurality of modules 101.

FIG. 9

FIG. 9 is a simplified message flow diagram illustrating exemplary data transferred between (i) a server and an application and between (ii) a server and a module, in accordance with exemplary embodiments. An application server 171, a server 105, and a module 101 can send and receive data illustrated in FIG. 9. Application server 171 can include application 171*i* and use an Internet Protocol address and port (IP:port) number 903 for sending and receiving data with server 105. Server 105 can include a server program 101*i* and a module controller 105*x*, where server program 101*i* can access a first server IP:port number 901 for communicating with application server 171, and module controller 105*x* can access a second server IP:port number 207 for communication with module 101. In accordance with a preferred exemplary embodiment, multiple modules 101 can send data to server IP:port number 207, and thus server 105 and/or a module controller 105*x* can use a single IP:port number 207 to communicate with a plurality of modules 101. In addition, server 105 could specify that one subset of modules 101 communicate with a first IP:port number 207, and a second subset of modules 101 communicate with a second IP:port number 207, etc. In another embodiment, server 105 could use multiple Internet Protocol addresses for sending and receiving data with a module 101, although a given module 101 can preferably send a message 208 to IP:port number 207 and receive a response 209 from the IP:port number 207, and a different module 101 could use a different value for IP:port number 207, including potentially a different IP address 106. Module 101 can utilize an IP:port number 204 for sending and receiving data with server 105.

As illustrated in FIG. 9, a symmetric firewall 104 could be included between module 101 and server 105, and the of IP addresses and port numbers in packets between server 105 and module 101 illustrated in FIG. 9 could also represent routing if a firewall 104 is present and functions as a symmetric firewall without NAT routing. In this case, firewall 104 may not perform network address translation on source and destination IP addresses, but rather filter packets based on pre-determined rules. For example, a firewall 104 that is a symmetric firewall could drop inbound packets from IP:port number 207 to module 101 unless module 101 had previously sent a packet to IP:port number 207 within a firewall port binding timeout value 117. Alternatively, a firewall 104 may be optionally omitted, and in this case the destination address in packets sent from server 105 to module 101 could include the IP address 202 of module 101, which is also the case illustrated in FIG. 9. In other words, FIG. 9 illustrates an exemplary routing of packets in the cases that (i) firewall 104 is a symmetric firewall, and (ii) firewall 104 is optionally not present.

Server 105 can receive a message 208 from a module 101. Server 105 can use a module controller 105*x* to receive the message, and module controller 105*x* could also be identified as a process operating on server 105 that binds to the port number in IP:port 207, which could include a port number 205. Message 208 could include module identity string 904, which could represent a temporary or transient string or number used by module 101 and server 105 to associate and identify message 208 with module identity 110. Module identity string 904 could also comprise a module identity 110. Server 105 can use module identity string 904 to select a symmetric key 127 in order to decrypt module encrypted data 403, since module identity string 904 may preferably be not encrypted. Server 105 and module 101 could use an algorithm within cryptographic algorithms 141 in order to process a module identity string 904, whereby the module identity string 904 can be converted between (i) a module identity 110 in a form such as a serial number or IMEI within module 101 and/or server 102, and (ii) a module identity string 904 in a message 208 that can traverse the Internet 107.

Message 208 as received by server 105 can also include a server instruction 414 within a module encrypted data 403, where the module encrypted data 403 could be ciphered using a symmetric key 127. The server instruction 414 illustrated in FIG. 9 can be an exemplary "update" instruction, where the "update" instruction can include a security token 401 and sensor data 604*b*. Sensor data 604*b* can include a sensor identity 151 and a sensor measurement. Server instruction 414 within a message 208 could include many other values besides an update, including a registration, a query, an alarm or error notification, configuration request, software request, confirmation, or other values also depicted and described in connection with a server instruction 414 in FIG. 4. Although message 208 is illustrated as a UDP datagram 601*a* in FIG. 9, message 208 could also be transmitted as a TCP datagram or other Internet transport protocols including Datagram Congestion Control Protocol (DCCP) and Stream Control Transmission Protocol (SCTP). A security token 401 can comprise a random number 128*a* processed by a random number generator 128 and can be preferably not reused and therefore can keep message 208 unique and not subject to replay attacks. Since a UDP protocol may be implemented for message 208, and the connectionless UDP protocol may require a module 101 to send retransmissions of a UDP datagram 601a for message 208, if module 101 does not receive a response 209 within a specified timer period.

According to an exemplary preferred embodiment, server 105 can include a timer 905, such that multiple UDP datagrams 601a received within the timer 905 period may be processed, but datagrams received outside the expiration of the timer 905 would be dropped. Note timer 905 can be particularly useful for security of a system 100 when module 101 may transmit multiple copies of UDP datagram 601a. Module 101 may transmit multiple copies of a UDP datagram 601a in order to implement forward error correction and compensate for any packet loss on the Internet 107 or possibly with wireless network 102. The UDP datagram 601a may also be sent as a UDP Lite datagram with channel coding 406. Server 105 can start timer 905 when the first UDP datagram 601a in message 208 is received, and discard UDP datagrams 601a for message 208 after the timer 905 expires, such as after an exemplary 2 seconds although other possibilities exist as well. In this manner (i) module 101 can securely send multiple copies of the same UDP datagram 601a in message 208, and (ii) server 105 can remain robust against replay attacks. Server 105 can also reset the timer 905 to a zero value upon sending response 209, and the timer value 905 could start again upon the receipt of a first UPD datagram 601a in the next message 208.

If the UDP Lite protocol is utilized for message 208 with multiple copies of UDP Lite datagram 601a received, then each UDP Lite datagram 601a could be different, depending on the presence of bit errors in the datagram, and thus server 105 can use timer 905 to collect the multiple copies of UDP Lite datagram 601a within the timer 905 period and process the multiple packets received, including combining the data across multiple packets, in order to eliminate bit errors within the datagrams and collect an error-free message 208.

After receiving message 208, server 105 use the steps outlined in FIG. 5a to process message 208 and read the plaintext server instruction 414, such as the sensor data 604b illustrated in FIG. 9. Other possibilities exist as well for sensor data 604b or values or information inside a server instruction 414. Server 105 can then send or transmit a first application message 701 to application server 171 that includes data received from the server instruction 414 from module 101 in message 208. The data received in the server instruction 414 from module 101 could be included by server 105 in an update instruction 704. An application 171i operating within application server 171 or associated with application server 171 could receive the first application message 701. The first application message 701 could be formatted according to a TCP datagram 902, although other possibilities exist as well including UDP.

In accordance with an exemplary preferred embodiment, the first application message 701 may include an update instruction 704 with sensor data 604b, although update instruction 704 could also contain or include other data pertaining to module 101 besides sensor data 604b, such as a state of a component with module 101, a state of a software routine, variable, or parameter associated with module 101. The first application message 701 sent from server 105 to application server 171 could be a datagram within a secure connection data transfer 802 as illustrated in FIG. 8. Sensor data 604b could be sent by server 105 using application server public key 171w, such as either (i) mutually deriving a common shared key 129b between server 105 and application 171i using a key derivation function 141f, where the shared key 129b could function as a symmetric key 127 with a symmetric ciphering algorithm 141b, or (ii) server 105 sending a symmetric key 127 to application server 171 using an asymmetric ciphering algorithm 141a and the application server public key 171w. Message 805 in FIG. 8 with the label of "Client Key Exchange" can comprise server 105 sending a symmetric key 127 (or value or parameter 126 for deriving symmetric key 127) to application server 171, where the symmetric key 127 can be used by server 105 to encrypt update instruction 704 illustrated in FIG. 9.

In accordance with an exemplary preferred embodiment, application message 701 may include (i) module identity 110 encrypted within secure connection data transfer 802 and also a server identity 206 that is not encrypted. In this manner, application server 171 can use server identity 206 to select a symmetric key 127 (possibly sent in message 805 as described in the paragraph above) in order to decrypt the encrypted data in update instruction 704. Although not illustrated in FIG. 9, in accordance with another exemplary embodiment, both a message 208 and the first application message 701 may also include a module digital signature 405. Server 105 can forward the module digital signature 405 received in a message 208 with sensor data 604b to the application server 171 in the first application message 701 illustrated in FIG. 9. The module digital signature 405 in a first application message 701 does not need to be encrypted. The application server 171 can verify the module digital signature 405 using step 411 of FIG. 4 (using a module public key 111). In this manner, application 171 can verify that module 101 originated the sensor data 604b, even though application server 171 received the application message 701 from server 105.

Application server 171 can receive the first application message 701 sent by server 105 and process the message. The message processing by application server 171 could use steps similar or equivalent to the steps utilized by server 105 illustrated in FIG. 4, in order to extract a plaintext application instruction 704. Although not illustrated in FIG. 9, application 171i could record data received within application instruction 704 and record the data in an application database 171k. Application 171i could use the data received in application instruction 704 or a plurality of application instructions 704 to generate reports, graphs, emails, or other user information for a user 183.

Upon processing the information within application instruction 704, application 171i or application server 171 could send a second application message 701 to server 105, as illustrated in FIG. 9. The second application message 701 could be sent using a secure connection data transfer 802, and could include a module instruction 502 and a module identity 110. The second application message 701 can use the IP:port number 903 as a source IP:port number for the second application message 701, where IP:port number 903 also represented a destination IP:port number for the first application message 701. The second application message 701 can use the IP:port number 901 as the destination IP:port number, where IP:port number 901 was the source port number in the first application message 701. The module instruction 502 within the second application message 701 can comprise could include an actuator setting 706. The module instruction 502 within the second application message 701 can comprise other data or module instructions 502 for a module 101 that do not include an actuator setting 706, such as the exemplary data depicted and described in connection with FIG. 5a.

Either server 105 or application server 171 could use the application server public key 171w to process the second application message 701. As one example, server 105 and/or application server 171 could use a key derivation function 141f to derive a key, where key derivation function 141f used application server public key 171w. The derived key could be used to encrypt and/or decrypt the module instruction 502 in the second application message 701. Other possibilities exists as well for the second application message 701 to use the application server public key 171w, such as server 105 sending a symmetric key 127 (used to encrypt and/or decrypt module instruction 502 in the second application message 701), where they symmetric key 127 was ciphered using the application server public key 171w.

Server 105 can received the second application message 701, and the message could be received using an IP:port number 901. Although an IPv4 address is shown in FIG. 9, and IPv6 address could be utilized as well. Server 105 could decrypt a body 602, that contains module identity 110 and a module instruction 502, using algorithms specified according to a secure connection data transfer 802. According to an exemplary embodiment, a secure connection data transfer 802 between a server 105 and an application server 171 could also comprise the steps for encrypting/decrypting and signing/verifying that are depicted and described in connection with FIG. 4 and FIG. 5a, and thus secure connection data transfer 802 could also optionally use the same steps and procedures between server 105 and application server 171 that are contemplated between server 105 and module 101. As one example, the application message 701 packets illustrated in FIG. 9 sent between server 105 and application 171 could be formatted to UDP and include a server encrypted data 504. As depicted and described in FIG. 8, a first set of parameters with cryptographic algorithms 141 could be used with an application message 701 and a second set of parameters 126 with cryptographic algorithms 141 could be used with server encrypted data 504 and/or module encrypted data 403.

After extracting a plaintext module instruction 502 and module identity 110 from a body 602 in the second application message 701, server 105 can take steps to process the data within a response 209 for module 101. Server 105 can record or query for information pertaining to module 101 using module identity 110 in a module database 105k. In accordance with exemplary embodiments, server 105 can use module identity 110 received in the second application message 701 to select (i) a symmetric key 127 used by module 101 for encrypting and/or decrypting a server encrypted data 504 that can include the module instruction 502, (ii) a destination IP:port number 204 for sending a response 209, (iii) a source IP:port number 207 for sending a response 209, (iv) a determination if a wait interval 703 is required before sending response 209, (v) a security token 401, and (vi) a set of parameters 126 for use with a cryptographic algorithms 141 in communications with module 101. In one embodiment, different modules 101 connected to server 105 may use different parameters 126, and server 105 can select the parameters 126 using (i) the module identity 110 received in the second application message and (ii) a module database 105k. Server 105 can also use module identity 110 received in the second application message 701 to select (vii) a transport protocol for a response 209, such as TCP, UDP, or UDP Light, and (viii) a channel coding 406 parameter such as a block code, turbo code, or forward error correction coding scheme. Server 105 can use module identity 110 received in application message 701 to format and/or send a response 209 to module 101.

According to a preferred exemplary embodiment, server 105 may receive an application message 701 with data for a module 101 at arbitrary times. Server 105 could also receive an application message 701 at a time when a first application message 701 with module identity 110 has not (i) previously been sent by server 105, (ii) or sent in a comparably long time such as a day or a week. As noted previously, server 105 may not be able to send a module instruction 502 to module 101 at arbitrary times, because of either (i) a sleep or dormant period for module 101, and/or (ii) the presence of a firewall 104. Thus, server 105 may need to (i) receive a message 208 from module 101 (such as upon waking after a sleep period after a firewall port binding timeout value 117 period since the last message 208) before (ii) sending a module instruction 502. Consequently, according to a preferred exemplary embodiment, server 105 can use module identity 110 received within an application message 701 to determine (i) if server 105 should wait until a wait interval 703 expires before sending response 209 (where the wait interval 703 can end upon receipt of a message 208 from a module 101 with the module identity 110 received in the application message 701) or (ii) if server 105 can send response 209 right away (such as a firewall port binding timeout period 117 has not expired), where response 209 includes the module instruction 502 received in the application message 701.

After (A) using module identity 110 received within application message 701 to select values within a response 209 and timing for sending a response 209, then (B) server 105 can send response 209 as illustrated in FIG. 9, where the specific response 209 in FIG. 9 is exemplary. Response 209 can include a server encrypted data 504. Server encrypted data 504 can include module instruction 502. The exemplary response 209 illustrated in FIG. 9 includes an actuator setting 706 within module instruction 502, but other possibilities exist as well. Note that the use of server encrypted data 504 is optional within a response 209, and server 105 could send module instruction 502 as plaintext. However, in this case of module instruction 502 being sent as plaintext, server 105 can preferably include a server digital signature 506 such that module 101 can verify the server digital signature 506 using the server public key 114 and confirm the module instruction 502 was transmitted by server 105. In accordance with exemplary preferred embodiments, (i) a message from module 101 to server 105 that does not include a module encrypted data 403 preferably includes a module digital signature 405, and (ii) a response 209, message sent back, datagram, or packet from server 105 to module 101 that does not include a server encrypted data 504 preferably includes a server digital signature 506. If data is not encrypted within a packet and the packet includes plaintext instructions such as a module instruction 502 or a server instruction 414, then, in accordance with preferred exemplary embodiments, the receiving node can preferably verify the identity of a sender using a digital signature included in the packet.

Response 209 sent from server 105 to module 101 could include a checksum 603. Since firewall 104 may comprise a symmetric firewall 104 (that may not perform network address translation routing), the destination address within IP:port 204 in response 209 illustrated in FIG. 9 may match the IP address 202 used by module 101. In this case, where the destination IP:port in response 209 includes IP address 202, a checksum 603 sent by server 105 can be equal to a checksum 603 received by module 101. In accordance with exemplary embodiments, response 209 is transmitted or sent by server 105 within a firewall port binding timeout value 117 after message 208 was received by server 105. In other words, if a firewall port binding timeout value 117 was equal to an exemplary 20 seconds for UDP packets, the response 209 illustrated in FIG. 9 would preferably be sent in less than 20 seconds after receiving the last message 208.

FIG. 10

Figure 10:
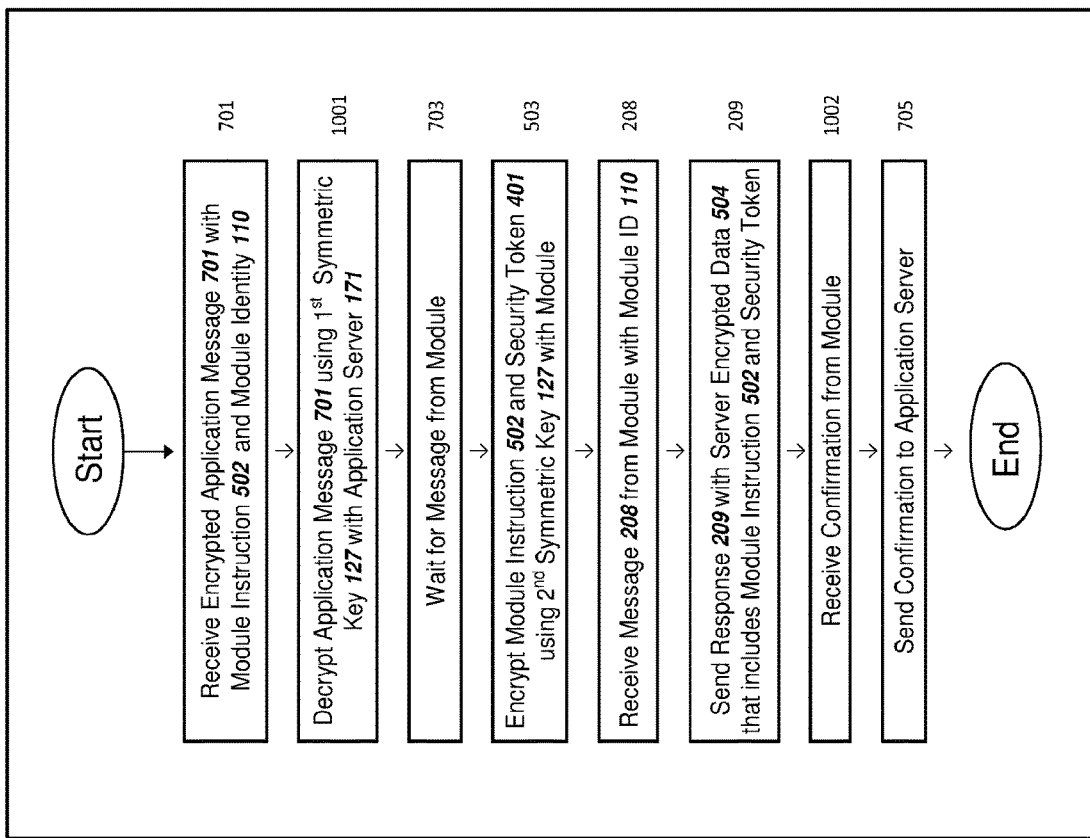
FIG. 10 is a flow chart illustrating exemplary steps for a server to receive a module instruction within an application message, and for the server to send the module instruction to a module, in accordance with exemplary embodiments.

FIG. 10 is a flow chart illustrating exemplary steps for a server to receive a module instruction within an application message, and for the server to send the module instruction to a module, in accordance with exemplary embodiments. Since an application 171i operating with an application server 171 may utilize a different set of protocols for communications than a module 101, server 105 can provide connectivity between module 101 and application 171i. As illustrated in FIG. 8 and FIG. 9 above, a server 105 can receive an application message 701 from an application server 171. The application server 171 and/or application 171i could be identified by the source IP address in an application message 701 received by server 105. Application message 701 could include encrypted data using a secure connection data transfer 802, where a body 602 within a packet could include a module instruction 502 and a module identity 110. As illustrated in system 199 in FIG. 1i, server 105 can support a network with a plurality of modules 101, and thus a module identity 110 within an application message 701 can be useful to (i) select the proper destination of module instruction 502, and (ii) other values for sending a response 209 to module 101 as depicted and described in connection with FIG. 9 above.

At step 1001, server 105 can preferably utilize the protocol for the secure connection data transfer 802 (such as TLS illustrated in FIG. 8) to extract the plaintext module instruction 502 and module identity 110. Server 105 could use a first symmetric key 127 with application server 171, such as (i) a first symmetric key 127 derived or transmitted with message 805 and (ii) a symmetric ciphering algorithm 141b. After extracting plaintext from application message 701, server 105 can record the data in a module database 105k, or simply store the data for further processing in a memory 101e. Although not depicted in FIG. 10, server 105 could use a message pre-processor 105y to send and receive data with application server 171, where the message pre-processor could comprise a program or library such as a TLS library, and IPSec library, an SSH library, etc.

Server 105 can then wait for a wait interval 703, where server 105 waits for an incoming message from module 101. Server 105 may need to wait for the wait interval 703 because the module may sleep or be dormant, and also a firewall 104 may block inbound packets or datagrams from server 105 to module 101 if module 101 had not previously sent a packet within a firewall port binding timeout value 117. After the wait interval 703, server 105 can use step 503 to encrypt module instruction 502 using a second symmetric key 127 and a security token 401, where the second symmetric key 127 is different than the first symmetric key 127. As illustrated in FIG. 5a, the output of step 503 can be a server encrypted data 504. Although step 503 is illustrated as after wait interval 703 in FIG. 10, step 503 could also take place either (i) before wait interval 503 or (ii) concurrently with wait interval 703.

According to exemplary embodiments, a first symmetric key 127 used by server 105 and application server 171 is different than a second symmetric key 127 used by module 101 and server 105. In addition, according to an exemplary embodiment, server 105 may use an RSA algorithm 153 for asymmetric ciphering 141a in packets with application server 171 and an ECC algorithm 154 for asymmetric ciphering 141a in packets with a module 101. Thus, according to an exemplary preferred embodiment, server 105 can utilize (i) a first certificate 122 with an RSA-based server public key 114 for use in communication with application server 171i and (ii) a second certificate 122 with an ECC-based server public key 114 for use in communication with a module 101. In an exemplary embodiment, the first symmetric key 127 is associated with a first symmetric ciphering algorithm 141b between server 105 and application server 171, and the second symmetric key 127 is associated with a second symmetric ciphering algorithm 141b between server 105 and module 101, and the first and second symmetric ciphering algorithms 141b are different. As depicted and described in connection with FIG. 8, the first and second symmetric ciphering algorithms 141b may use different parameters 126, such as a first set of parameters 126 with the first symmetric ciphering algorithms 141b and a second set of parameters 126 with the second symmetric ciphering algorithms 141b.

Server 105 can receive a message 208 from module 101, where the module identity 110 or module identity string 904 in message 208 could represent a number or string associated with the module identity 110 in application message 701. Note that the exact string, number, or digits in module identity 110 or module identity string 904 in message 208 does not need to match the exact string, number, or digits for module identity 110 in application message 701, and the two messages could use different encoding schemes or values for module identity 110. As one example, module identity 110 in application message 701 could represent a serial number for module 101, while module identity 110 in message 208 could represent a session identity. Other possibilities exist as well for a string or number within a module identity 110. Server 105 can preferably uniquely associate module identity 110 in an application message 701 with module identity 110 in a message 208.

After receiving message 208, server 105 can send the server encrypted data 504 processed in step 503 above within a response 209. A server encrypted data 504 within response 209 could include the module instruction 502, where module instruction 502 was received in the application message 701. Note that module instruction 502 within response 209 does not need to be the exact same string, number, or binary digits as module instruction 502 received by server 105 in application message 701. As one example, application message 701 and response 209 could use different coding schemes (such as ASN.1 for response 209, and plaintext for application message 701, although other possibilities exist as well). As illustrated in FIG. 10, module instruction 502 within an application message 701 can preferably represent an equivalent action for module 101 as a module instruction 502 within response 209. For example, module instruction 502 in both application message 701 and response 209 could instruct module 101 to (i) throw a switch, (ii) sleep for an interval, (iii) adjust a power level, and other possibilities exist as well. As described above in FIG. 9, the use of encryption within response 209 could optionally be omitted, but in this case response 209 may include a server digital signature 506 with module instruction 502.

After sending response 209, at step 1002 the server 105 may preferably receive a confirmation from module 101 that the module instruction 502 had been successfully received and/or successfully applied. The confirmation could be received in the format of a second message 208 from module 101 with a server instruction 414, where the server instruction 414 is a "confirmation". Other data regarding the execution of module instruction 502 by module 101 could be included in the confirmation at step 1002, such as a timestamp 604a when the module instruction 502 was executed.

After receiving the confirmation from the module 101, server 105 can preferably send a second application message 701 to an application server 171 and/or application 171*i* with a confirmation 705. The confirmation 705 could be sent using a secure connection data transfer 802. In accordance with exemplary embodiments, the application message 701 sent from server 105 to application server 171 in the form of a confirmation 705 can include the timestamp 604*a*.

In an exemplary embodiment, the reliable and secure transmission of timestamp 604*a* from module 101 to application server 171 through server 105 may be useful for proper management of a monitored unit 119. Due to any sleep or dormant states of module 101, plus periodic outages and recovery of wireless network 102, a first time value that module 101 executes module instruction 502 may be significantly different than a second time value that application server 171 sent the module instruction 502. Consequently, application server 171 may preferably receive a timestamp 604*a* sent by module 101 in an application message 701 from server 105, and the application message 701 could comprise a confirmation 705.

Although not illustrated in FIG. 10, server 105 could then continue listening on or monitoring (i) IP:port 901 for additional incoming application messages 901 from application server 171, and (ii) IP:port 207 for additional incoming messages 208 from a module 101. Although not illustrated in FIG. 10, module instruction 502 may optionally be encrypted such that server 105 may not be able to read plaintext within module instruction 502, and in this case step 1001 illustrated in FIG. 10 would be bypassed. For example, module instruction 502 may be encrypted with the module public key 111, and thus module instruction 502 may only reasonably be read by module 101. Even if module instruction 502 cannot be read in plaintext form by server 105 upon receiving application message 701, module identity 110 within application message 701 would preferably be in a form where server 105 can (i) process the module identity 110 into plaintext (as a minimum in order to route the message to module 101 among a plurality of modules 101), or (ii) simply read the module identity 110 from a body 602 in the application message 701.

In this embodiment where step 1001 is omitted in FIG. 10, the application server 171 can use a module public key 111 and an asymmetric ciphering algorithm 141*a* to encrypt the module instruction 502 shown in the body 602 of the application message 701 illustrated in FIG. 9. The application server 171 can also include a digital signature of the module instruction 502 using the application server private key 171*t* and a digital signature algorithms 141*d*. The encrypted module instruction 502, module identity 110, and digital signature can be sent to the server 105 in an application message 701 using the first step shown in FIG. 10. The application message 701 can also include an identity of the application server.

Continuing in this embodiment where step 1001 is omitted in FIG. 10, the server 105 can then use the waiting interval 703 until a message 208 is received from a module 101. In this case where step 1001 is omitted in FIG. 10, then step 503 can also be omitted since the module instruction 502 is already encrypted with the module public key 111 (by the application server 171). After skipping step 503 and receiving the message 208, the server 105 can then send the encrypted module instruction 502 and digital signature (signed by the application server 171) to the module 101 in a response 209, as shown in FIG. 10. The module 101 can read receive the response 209, read the identity of the application server, select a public key 171*w* of the application server 171, verify the digital signature of the module instruction 502, and decrypt the module instruction 502 using the module private key 112 and an asymmetric ciphering algorithms 141*a*. The module 101 can then apply the module instruction 502 and send a message 208 with a confirmation at step 1002. The confirmation at step 1002 can include a timestamp 604*b*, which the server 105 can send to the application server 171. In this manner, the module 101 may receive instructions from the application server 171*i* that are not encrypted by the server 105.

FIG. 11

FIG. 11 is a flow chart illustrating exemplary steps for a server to communicate with an application and a module, in accordance with exemplary embodiments. FIG. 11 includes a combination of different exemplary embodiments contemplated in the present invention, including (i) receiving a first module encrypted data 403 with a first sensor data 604*b* from a module 101 using a first public key 111, (ii) sending the first sensor data 604*b* in a first application message 701, (iii) sending a module instruction 502 for a module 101 to derive a new public and private key pair using a set of parameters 126, (iv) receiving a second module encrypted data 403 with a second sensor data 604*b* from module 101 using the second public key, and (iv) sending the second sensor data 604*b* in a second application message 701.

Server 105 can receive a first module public key 111 at step 516. The first module public key 111 can be in a message 208 that includes a module identity 110 and first parameters 126, where the parameters can provide values associated with the first module public key 111 such as an elliptic curve name or defining equation, a modulus for an RSA key, a time-to-live value, a certificate authority 118 name, etc. According to an exemplary embodiment, a set of parameters 126 can include a module public key identity 111*a*, in addition to other values. Server 105 can receive the first module public key 111 at step 516 in the form of a certificate 122, although a certificate 122 is not required. Although not illustrated in FIG. 11, module public key 111 could optionally be encrypted in a module encrypted data 403, as depicted and described in connection with Step 1001 of FIG. 10 in U.S. patent application Ser. No. 14/039,401. In addition, the submission of the first module public key 111 at step 516 could be authenticated using step 517 of FIG. 5*b* of the present invention. In this manner, server 105 can ensure that the first module public key 111 is properly associated with module identity 110 and/or module 101 (i.e. prevent an incorrect submission of the first module public key 111 or even the potential malicious submission of the first module public key 111). In accordance with a preferred exemplary embodiment, the first message 208 received at step 516 can also include a module public key identity 111*a*, so that server 105 can properly keep track of multiple different module public keys 111 used by a module 101 over time, such as module 101 periodically rotating public/private key pairs in order to enhance security.

At step 1101, server 105 can receive a second message 208 that includes a first module encrypted data 403, where the first module encrypted data 403 was processed by server 105 using the first module public key 111 and first set of parameters 126 received in step 516. In accordance with an exemplary preferred embodiment, server 105 can use the first module public key 111 to process the first module encrypted data 403 by (i) mutually deriving a common shared secret key 129*b* as a symmetric key 127 for use between server 105 and module 101 using a key derivation function 141*f* with the first module public key 111 as an input into the key derivation function 141*f*, and (ii) server 105 sending a symmetric key 127 to module 101 where (ii.a) the symmetric key 127 was ciphered using an asymmetric ciphering algorithm 141a and the first module public key 111 and (ii.b) the first module encrypted data 403 was ciphered using the symmetric key 127. Note that the second message 208 could be optionally sent without ciphering or encryption, and in this case the second message 208 could use the first module public key 111 to include a module digital signature 405 in the second message 208. The second message 208 can include a sensor data 604b or other server instruction 414. According to an exemplary embodiment, the second message 208 may also preferably include a module identity 110 or a module identity string 904 outside of the module encrypted data 403, so that server 105 can select the proper key in order to decrypt the module encrypted data 403.

At step 1102, server 105 can use an application message 701 to send the sensor data 604b from a sensor 101f with module 101 to an application server 171 and/or an application 171i. As illustrated in FIG. 8 and FIG. 9, the application message 701 can use a secure connection data transfer 802, and could comprise an update instruction 704. The application message 701 can include both a module identity 101 and a server identity 206, and the server identity 206 can be useful for application server 171 since the application server 171 could receive a plurality of application messages 701 from a plurality of servers 105, each using a different key for ciphering. Although not illustrated in FIG. 11, steps 1101 and 1102 could be completed in series multiple times before proceeding to step 1103, such as module 101 sending multiple messages 208 with sensor data 604b over several days or longer, and server 105 can correspondingly send the data to an application server 171.

At step 1103, server 105 can process a module instruction 502 for module 101 to derive a second module public key 111 and a second private key 112. Potential reasons for the use of a new public and private key by module 101 are described in connection with FIG. 5b and elsewhere herein, and could include the expiration the validity of a certificate 122 with the first module public key 111 among many possible reasons. Although server 105 is illustrated as processing the module instruction 502 at steps 1103, an application server 171 or another server associated with M2M service provider 108 or module provider 109 could send a signal to server 105 for module 101 to derive new keys, and server 105 could then send module 101 a module instruction 502 to derive new keys at step 1103. In an exemplary embodiment, any module instructions 502 originated outside server 105 in a system 100 illustrated in FIG. 1 may preferably be sent to server 105 before sending to module 101, since other servers besides server 105 in a system 100 illustrated in FIG. 1 would not normally be able to send a packet to module 101 due to the presence of firewall 104. In accordance with an exemplary preferred embodiment, (i) module 101 may only receive a module instruction 502 from a server 105, where server 105 had previously received a message 208, (ii) before module 101 receives the module instruction 502. Further, module 101 may only receive a module instruction 502 both (i) after sending a message 208 and (ii) before the expiration of a firewall port binding timeout value 117 after sending the message 208.

Server 105 can then use step 503 illustrated in FIG. 5a to encrypt (i) the module instruction 502 and (ii) the second parameters 126 in a server encrypted data 504, where the module instruction 502 comprises an instruction for module 101 to derive a new pair of keys. Server 105 can use a symmetric key 127 and a symmetric ciphering algorithm 141b to encrypt the module instruction 502 and second parameters 126. The symmetric key 127 used in step 503 illustrated in FIG. 11 could be processed using the first module public key 111, where server 105 had (i) verified the identity of module 101 using a module digital signature 405 using the first module public key 111, and then (ii) subsequently sent or received the symmetric key 127 with module 101 after the module digital signature 405 was verified using the first module public key 111. Alternatively, server 105 could have sent the symmetric key 127 to module 101 in a response 209 using an asymmetric ciphering algorithm 141a and the first module public key 111. Although not illustrated in FIG. 11, in a different but related embodiment to FIG. 11, step 506 can be substituted for step 503, such that module instruction 502 and/or second parameters 126 are not encrypted but rather a server digital signature 506 processed for inclusion in a response at step 1104 below.

At step 1104, server 105 can then send a response 209 that includes the module instruction 502 and second parameters 126, where the module instruction 502 could be included in a server encrypted data 504. The response 209 could be formatted according to the exemplary response 209 illustrated in FIG. 6a, where the response 209 can include a module instruction 502 for the module 101 to derive a new key pair. The response 209 could be to (i) the second message 208 received at step 1101, or (ii) a subsequent message 208 received by server 105 after the second message 208 received in step 1101 and not shown in FIG. 11. The response 209 at step 1104 can also include a second set of parameters 126 and a security token 401. As contemplated herein, the terms "parameters" and "set of parameters" may be considered equivalent. If response 209 at step 1104 does not include a server encrypted data 504, then response 209 at step 1104 may preferably include a server digital signature 506.

The second set of parameters 126 at step 1104 could be related to the first set of parameters 126 at step 516 illustrated in FIG. 11, or may be different. As one example, a second set of parameters 126 could include a different expiration date or time-to-live value for a new module public key 111. The second set of parameters 126 could include a new elliptic curve name or values for a defining equation, including a new elliptic curve for a cryptographic algorithms 141 to be utilized by module 101. Thus, according to a preferred exemplary embodiment, a set of parameters 126 sent to a module in a response 209 can include values for an elliptic curve defining equation. In this manner, module 101 and server 105 can utilize an elliptic curve for an ECC algorithms 154 that is different than an ECC standard curve 138. For example, module 101 and server 105 may prefer to use an elliptic curve for ECC algorithms 154 that is different than defined curves in standards such the list of curve names in section 5.1.1 of IETF RFC 4492 entitled "Elliptic Curve Cryptography (ECC) Cipher Suites for Transport Layer Security (TLS)", and other related curves such as defined curves published by NIST.

One benefit of utilizing a non-standard elliptic curve (where the curve can be defined using a ECC parameters 137 in a parameters 126) is that security can be increased, since attempts to break encryption with standard elliptic curves could not be readily applied to non-standard elliptic curves used in an ECC algorithm 154 (i.e. rainbow tables and the like generated for one elliptic curve would not normally be applicable for a sufficiently different elliptic curve). In accordance with a preferred exemplary embodiment, at step 1104 the second set of parameters 126, which can include values for a defining equation and/or ECC parameters 137, can be sent to a module 101 in a response 209, where the parameters 126 are within a server encrypted data 504. The security of a system 100 can be increased by keeping confidential the elliptic curve used in an ECC algorithm 154. By sending ECC parameters 137 (possibly within the second set of parameters 126) in a server encrypted data 504 in a response 209, where ECC parameters 137 include values for a different elliptic curve for module 101 to utilize in a cryptographic algorithms, the security of a system 100 can be further increased since the underlying elliptic curves used with public and private keys can change over time.

Module 101 can receive the response 209 sent in step 1104 with the module instruction 502 instructing module 101 to derive a new key pair using the second set of parameters 126. Note the second set of parameters 126 could be omitted in the response 209 sent in step 1104 and in this case module 101 can use the first set of parameters from step 516 illustrated in FIG. 11. Module 101 can decrypt the server encrypted data 504 in a response 209 using a symmetric key 127 and/or the first module public key 111 sent in the first message at step 516 shown in FIG. 11. At step 515, module 101 can derive the new key pair using the second set of parameters 126. As depicted and described in connection with FIG. 5b, module 101 can use the second set of parameters 126, cryptographic algorithms 141, a key pair generation algorithms 141e, and a random number generator 128 to derive a second module public key 111 and a second module private key 112. The random number generator 128 could use input from a sensor 101f, radio 101z, and other hardware in order to input "noisy" data into a seed 129 used by random number generator 128, including using a module random seed file 139.

At step 1105, server 105 can receive the second module public key 111 from module 101 in a third message 208. The third message 208 could include a module identity 110, and the second module public key 112 could be authenticated by server 105 using step 517 depicted and described in connection with FIG. 5b above. Note that the third message 208 may also preferably include a module public key identity 111a, so that server 105 can properly track and identify which of a plurality of module public keys 111 may be used. Module public key identity 111a and module public key 111 could be received by server 105 in the form of a certificate 122, although the use of a certificate 122 is not required. Server 105 can authenticate the second module public key 111 at step 1105 using the first module public key 111 received in step 516 in FIG. 11. In one embodiment, the second module public key 111 could be authenticated by server 105, where the third message included a module digital signature 405 that module 101 processed using the first module private key 112. Server 105 could use the first module public key 111 and the first set of parameters 126 received in (or used with) step 516 of FIG. 11 to verify the module digital signature 405. In this manner, the second module public key 111 could be authenticated with or after step 1105 by server 105.

Upon receiving and authenticating the second module public key 111, server 105 can record the second module public key 111 in a module database 105k or store the key in other memory. After recording the second module public key 111, at step 1106 server 105 can receive a fourth message 208 that includes (i) a module identity, and (ii) a second module encrypted data 403, where the second module encrypted data 403 may be encrypted using the second module public key 111 received at step 1105. The second module encrypted data 403 could include second sensor data 604b or other data as well. Server 105 can decrypt the second module encrypted data 403 in order to extract the plaintext sensor data 604b, or other data for a server 105 or application 171i, including a server instruction 414 different than an "update" message.

At step 1107, server 105 can then send a second application message 701 to an application server 171 and/or application 171i, were the second application message could include the sensor data 604 received in step 1105 and the module identity 110. Server 105 can utilize a secure connection data transfer 802 to send the sensor data 604b and the module identity 110 received in step 1106. In an exemplary embodiment, the keys used for a secure connection data transfer 802 at step 1107 could be the same as used in the secure connection data transfer 802 at step 1102. In this manner, server 105 can support a change in public and private keys for module 101, while no change in public and private keys are required for application server 171 and/or application 171i. Further, application 171i may require a valid certificate 122 for server 105, while server 105 may not require a certificate 122 for each module 101. Although not illustrated in FIG. 11, steps 1106 and 1107 could repeat in sequence as server 105 continues to receive additional messages 208 from module 101 over time, and server 105 could continue to update application server 171 and/or application 171i by sending additional application messages 701. Application 171i can use the plurality of sensor data 604b received in FIG. 11 to update an application database 171k and information presented to a user 183 though a web portal 171j.

CONCLUSION

Various exemplary embodiments have been described above. Those skilled in the art will understand, however, that changes and modifications may be made to those examples without departing from the scope of the claims.

What is claimed is:
1. A system comprising:
(A) a wireless network;
(B) a server for the wireless network; and
(C) a mobile device comprising:
(1) one or more processors; and,
(2) a non-transitory computer-readable memory operatively connected to the one or more processors, the non-transitory computer-readable memory including machine readable instructions that, when executed by the one or more processors cause the one or more processors to perform steps of:
(i) storing a server public key, a module identity, cryptographic algorithms, and a pre-shared secret key stored in memory, wherein the module identity comprises a permanent identifier for the mobile device and the cryptographic algorithms includes a symmetric ciphering algorithm;
(ii) deriving a module private key and a corresponding module public key associated with the mobile device using the cryptographic algorithms;
(iii) deriving a symmetric ciphering key using (i) an elliptic curve integrated encryption scheme with the server public key and the module private key and (ii) an American National Standards Institute standard X-9.63 key derivation function;
(iv) denerating module encrypted data using the symmetric ciphering key and the symmetric ciphering algorithm, wherein the module encrypted data includes the module identity;

(v) dending a message to the server for the wireless network, the message comprising the module encrypted data and the corresponding module public key, wherein the server mutually derives the symmetric ciphering key using at least the module public key, and wherein the wireless network selects the pre-shared secret key for the mobile device using the module identity; and (vi) authenticating the mobile device with the wireless network using a message digest with the pre-shared secret key.

2. The system of claim 1, wherein the message further comprises a module identity string, the module identity string comprising a temporary identification for the mobile device.

3. The system of claim 1, wherein the pre-shared secret key comprises a key K, wherein the mobile device and the wireless network mutually derive a response from (i) a random value and (ii) the key K, and wherein the mobile device receives the random value from the wireless network.

4. The system of claim 1, wherein the storing step (i) includes storing the pre-shared secret key within a subscriber identity module card, wherein the pre-shared secret key comprises a key K.

5. The system of claim 1, wherein the storing step (i) includes storing the pre-shared secret key before the mobile device communicates with the wireless network.

6. The system of claim 1, wherein the non-transitory computer-readable memory includes machine readable instructions that, when executed by the one or more processors cause the one or more processors to perform a step of storing parameters for the cryptographic algorithms, the parameters comprising a standard curve for elliptic curve cryptography, wherein the deriving step (ii) includes deriving the module public key and the module private key using the standard curve.

7. The system of claim 6, wherein the message further comprises the parameters for the cryptographic algorithms, and wherein the server mutually derives the symmetric ciphering key using at least the module public key and the parameters for the cryptographic algorithms.

8. The system of claim 1, wherein the mobile device receives the pre-shared secret key via a wireless 802.11 connection to a web portal after a user for the mobile device submits a pre-shared secret key code for the mobile device to the web portal.

9. The system of claim 1, wherein the deriving step (ii) includes:

(i) deriving the module private key from a random number generator; and, (ii) deriving the module public key from a key pair generation algorithm, wherein the module private key comprises a random number.

10. The system of claim 9, wherein the random number generator is configured to generate the random number from a seed value, and wherein the seed value comprises data from at least one of a sensor and a radio for the mobile device.

11. The system of claim 1, wherein the storing step (i) includes storing the server public key in a nonvolatile memory of the mobile device.

12. The system of claim 1, wherein the server comprises a plurality of computers, wherein the plurality of computers includes at least one sub-server and at least one database.

13. The system of claim 1, wherein the server comprises at least one virtualized server operating on at least one computer.

14. The system of claim 1, wherein the wireless network includes the server.

15. The system of claim 1, wherein the storing step (i) includes storing the module identity in a read-only nonvolatile memory address, wherein the mobile device designates the read-only nonvolatile memory address as read-only for a time interval.

16. The system of claim 1, wherein the wireless network comprises at least one base station communicating with a 3GPP wireless technology.

17. The system of claim 1, wherein the message comprises a single user datagram protocol packet.

18. The system of claim 1, wherein the symmetric ciphering algorithm comprises an Advanced Encryption Standard algorithm and has a length of 128 bits.

19. The system of claim 1, wherein the module identity comprises a number for an international mobile subscriber identity number.

20. The system of claim 1, wherein the mobile device comprises a smartphone.

* * * * *